United States Patent
Inomata et al.

(10) Patent No.: US 10,438,394 B2
(45) Date of Patent: Oct. 8, 2019

(54) INFORMATION PROCESSING METHOD, VIRTUAL SPACE DELIVERING SYSTEM AND APPARATUS THEREFOR

(71) Applicant: COLOPL, Inc., Tokyo (JP)

(72) Inventors: Atsushi Inomata, Kanagawa (JP); Toshiki Ando, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/908,899

(22) Filed: Mar. 1, 2018

(65) Prior Publication Data

US 2018/0322681 A1 Nov. 8, 2018

(30) Foreign Application Priority Data

Mar. 2, 2017 (JP) ................. 2017-039318
Sep. 26, 2017 (JP) ................. 2017-184868
Sep. 26, 2017 (JP) ................. 2017-184869

(51) Int. Cl.
*G06T 13/40* (2011.01)
*G06F 3/01* (2006.01)
(Continued)

(52) U.S. Cl.
CPC ............ *G06T 13/40* (2013.01); *A63F 13/211* (2014.09); *A63F 13/212* (2014.09); *A63F 13/25* (2014.09);
(Continued)

(58) Field of Classification Search
CPC .......... G06F 3/013; G06F 3/011; G06F 3/012; G06F 2203/011; G06F 3/015;
(Continued)

(56) References Cited

U.S. PATENT DOCUMENTS 8,019,875 B1 * 9/2011 Nielsen ............... G06Q 10/06
709/227
2008/0215995 A1 * 9/2008 Wolf .................. G06T 11/00
715/758
(Continued)

FOREIGN PATENT DOCUMENTS

JP 2014-86091 A 5/2014
JP 2015-46070 A 3/2015
(Continued)

OTHER PUBLICATIONS

Notice of Allowance in JP Application No. 2017-039318, dated Jul. 18, 2017, 5pp.

*Primary Examiner* — Sultana M Zalalee
(74) *Attorney, Agent, or Firm* — Hauptman Ham, LLP

(57) ABSTRACT

A method includes defining a virtual space. The virtual space includes a first avatar object and a second avatar object. The first avatar object being associated with a first user terminal. The first user terminal comprising a first head-mounted device (HMD) associated with a first user. The second avatar object being associated with a second user terminal. The second user terminal comprising a second HMD associated with a second user. The method includes defining a visual field in the virtual space in association with a motion of the second HMD. The method includes generating a visual-field image that corresponds to the visual field. The method includes displaying the visual-field image on the second HMD. The method includes receiving first information indicating that the first user is not wearing the first HMD. The method includes changing the visual-field image on the second HMD in response to the first information being received.

8 Claims, 29 Drawing Sheets

(51) Int. Cl.
  *A63F 13/25* (2014.01)
  *A63F 13/211* (2014.01)
  *A63F 13/35* (2014.01)
  *A63F 13/5255* (2014.01)
  *A63F 13/212* (2014.01)
(52) U.S. Cl.
  CPC .......... *A63F 13/35* (2014.09); *A63F 13/5255* (2014.09); *G06F 3/011* (2013.01); *G06F 3/012* (2013.01)
(58) Field of Classification Search
  CPC .. G06F 3/1454; G06F 3/04815; A63F 13/211; A63F 13/212; A63F 13/213; A63F 13/26; A63F 13/323; A63F 13/34; A63F 13/5255; A63F 13/537; A63F 13/56; A63F 13/58; A63F 13/12; A63F 13/35; A63F 13/60; A63F 2300/532; A63F 2300/535; A63F 2300/5553; A63F 2300/646; G02B 2027/0134; G02B 2027/0138; G02B 2027/014; G02B 2027/0187; G02B 27/0093; G02B 27/017; G02B 5/30; G06T 13/40; H04N 13/344; H04N 13/366; G06N 3/006
  See application file for complete search history.

(56) References Cited

U.S. PATENT DOCUMENTS

| | | | | |
|---|---|---|---|---|
| 2009/0063983 | A1* | 3/2009 | Amidon | G06N 3/006 715/733 |
| 2009/0187833 | A1* | 7/2009 | Cheng | G06Q 10/10 715/757 |
| 2009/0241126 | A1* | 9/2009 | Beggs, Jr. | G06F 3/011 719/318 |
| 2009/0300525 | A1* | 12/2009 | Jolliff | H04M 1/72544 715/764 |
| 2010/0281396 | A1 | 11/2010 | Scotto D'Apollonia et al. | |
| 2011/0289422 | A1* | 11/2011 | Spivack | G06Q 10/109 715/739 |
| 2011/0296324 | A1* | 12/2011 | Goossens | G06Q 10/10 715/763 |
| 2012/0019365 | A1* | 1/2012 | Tuikka | G06Q 30/02 340/10.1 |
| 2012/0262582 | A1* | 10/2012 | Kimchi | H04M 1/72569 348/159 |
| 2014/0118357 | A1 | 5/2014 | Covington | |
| 2014/0141888 | A1* | 5/2014 | Pavlish | G07F 17/3276 463/42 |
| 2015/0061824 | A1 | 3/2015 | Suzuki et al. | |
| 2015/0111643 | A1* | 4/2015 | Olofsson | A63F 13/335 463/31 |
| 2015/0163473 | A1* | 6/2015 | Osawa | H04N 13/221 348/53 |
| 2015/0310263 | A1* | 10/2015 | Zhang | G06K 9/00315 382/103 |
| 2016/0063989 | A1* | 3/2016 | Deleeuw | G10L 15/22 345/473 |
| 2016/0300387 | A1* | 10/2016 | Ziman | G06T 19/003 |
| 2017/0123744 | A1* | 5/2017 | Park | G06F 3/011 |
| 2017/0124834 | A1* | 5/2017 | Pedersoli | H04W 4/90 |
| 2017/0153863 | A1 | 6/2017 | Shiraishi | |
| 2017/0160812 | A1* | 6/2017 | Park | G06F 21/00 |

FOREIGN PATENT DOCUMENTS

JP  6017008 B1  10/2016
JP  2017-28390 A  2/2017

* cited by examiner

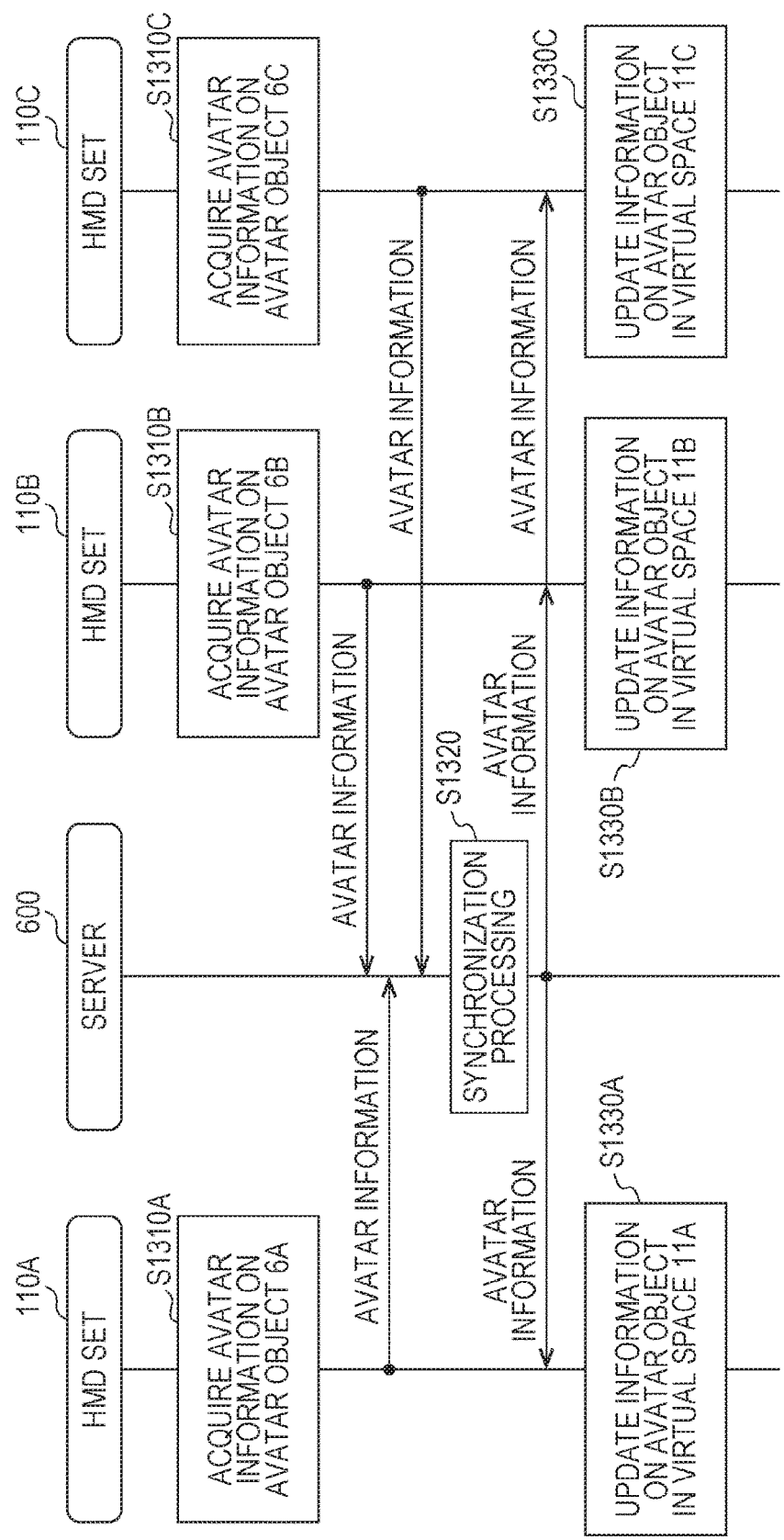

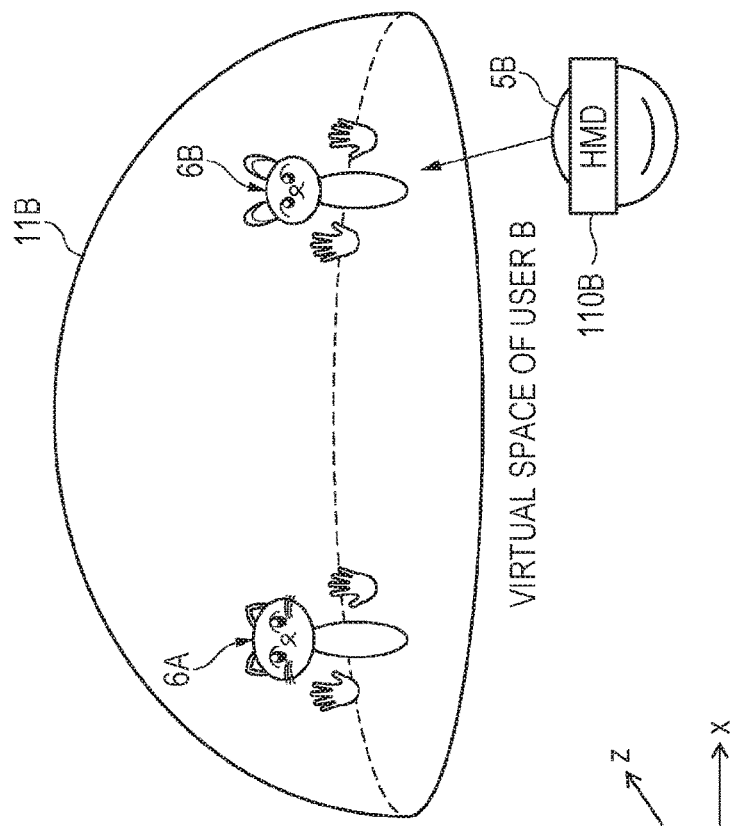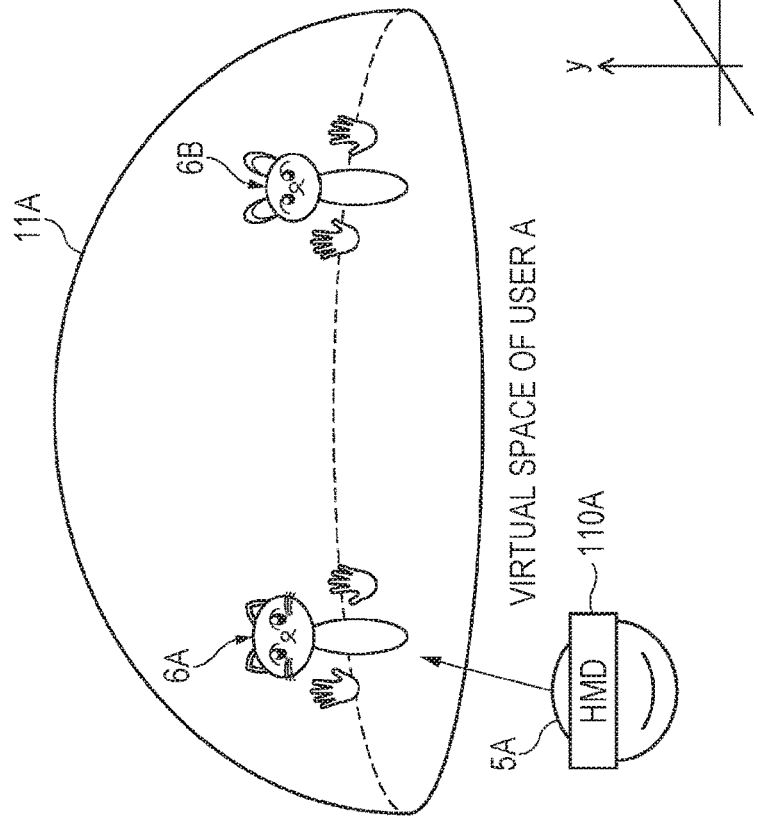

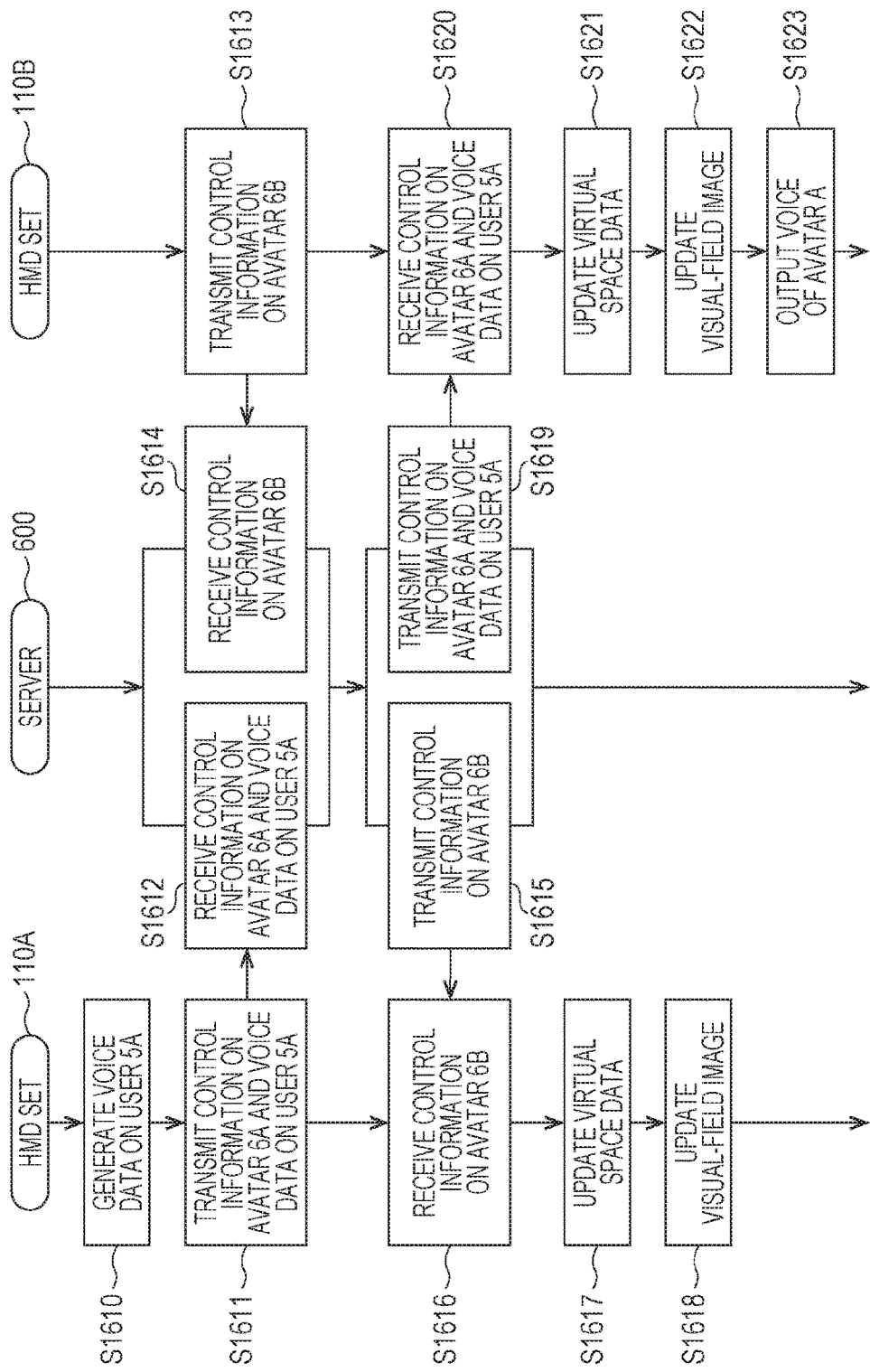

INFORMATION PROCESSING METHOD, VIRTUAL SPACE DELIVERING SYSTEM AND APPARATUS THEREFOR

RELATED APPLICATIONS

The present application claims priority to Japanese application Nos. 2017-039318, filed Mar. 2, 2017, 2017-184868 and 2017-184869, filed Sep. 26, 2017, the disclosures of which are hereby incorporated by reference herein in their entirety.

TECHNICAL FIELD

This disclosure relates to an information processing method, a virtual space delivering system and apparatus therefor.

BACKGROUND

The sharing of a virtual space by a plurality of users wearing a head mounted device (hereinafter simply referred to as "HMD") via a network is known. In this context, the virtual space includes a virtual reality (VR) space. For example, in Patent Document 1, there is described a technology of causing a plurality of users to share one VR space and controlling a motion (e.g., posture of avatar) of an avatar based on a motion (e.g., posture of user) of a user.

PATENT DOCUMENTS

[Patent Document 1] JP 6017008 B1

SUMMARY

According to at least one embodiment of this disclosure, there is provided a method including defining a virtual space, the virtual space including a first avatar and a second avatar, the first avatar being associated with a first user terminal, the first user terminal including a first head-mounted device (HMD) associated with a first user, the second avatar being associated with a second user terminal, the second user terminal including a second HMD associated with a second user. The method further includes defining a visual field in the virtual space in association with a motion of the second HMD. The method further includes generating a visual-field image that corresponds to the visual field. The method further includes displaying the visual-field image on the second HMD. The method further includes receiving first information indicating a fact that the first user is not wearing the first HMD. The method further includes presenting, to the second user, the fact that the first user is not wearing the first head-mounted device with the second user terminal in response to the first information being received.

BRIEF DESCRIPTION OF THE DRAWINGS

FIG. 13 A sequence diagram of processing to be executed by a system including an HMD interacting in a network according to at least one embodiment of this disclosure.

FIG. 15A A diagram of a virtual space to be provided to the user according to at least one embodiment of this disclosure.

FIG. 15B A diagram of a virtual space to be provided to a user according to at least one embodiment of this disclosure.

FIG. 16 A sequence diagram of processing of synchronizing a motion of each avatar among user terminals according to at least one embodiment of this disclosure.

DETAILED DESCRIPTION

Figure 1:
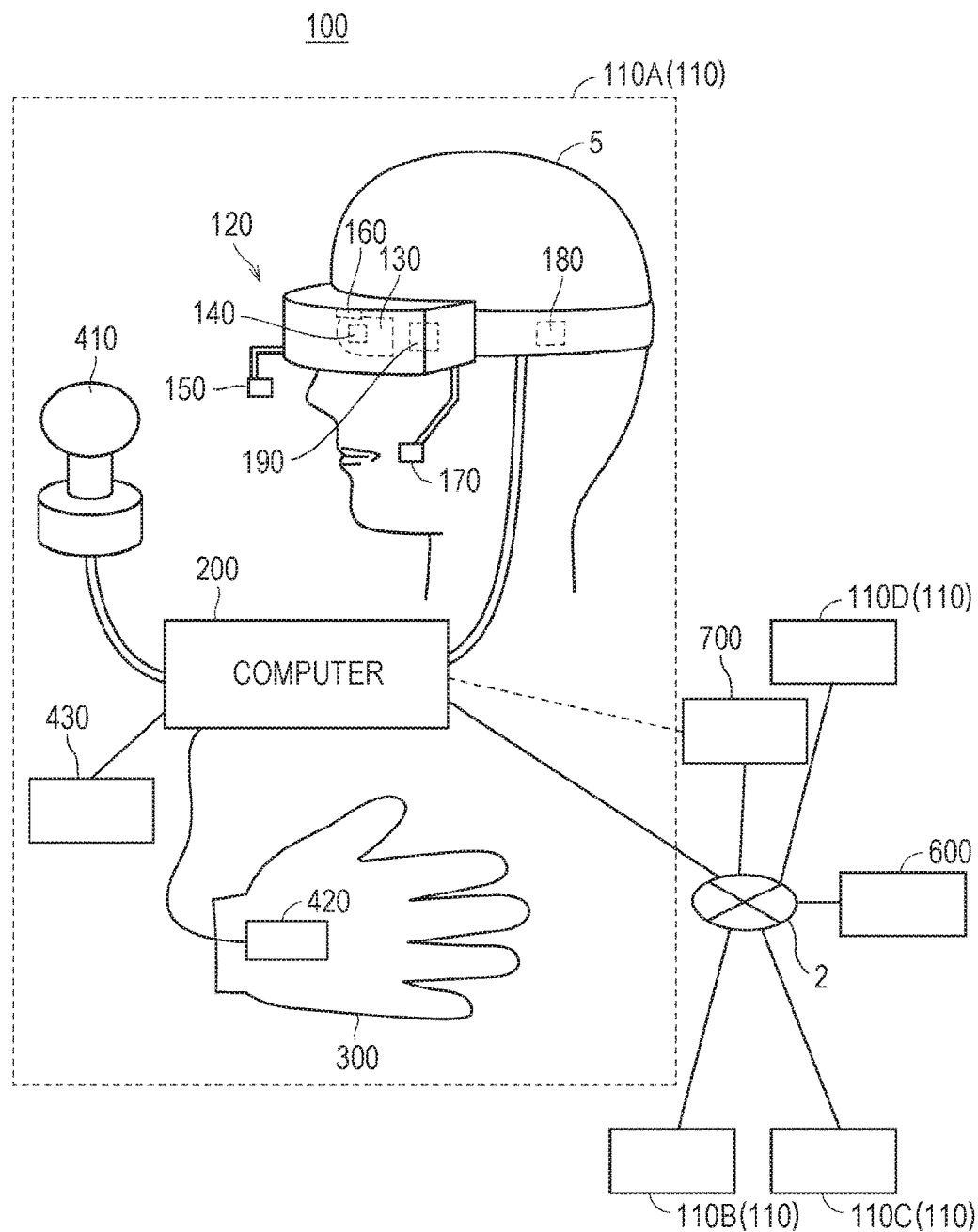
FIG. 1 A diagram of a system including a head-mounted device (HMD) according to at least one embodiment of this disclosure.

Description of at Least One Embodiment of this Disclosure

An outline of at least one embodiment of this disclosure is now described.

(1) An information processing method to be executed on a computer in a virtual space delivering system including: a first user terminal including a first head-mounted device to be worn on a head of a first user; and a second user terminal including a second head-mounted device to be worn on a head of a second user, the information processing method including: (a) generating virtual space data for defining a virtual space including a first avatar associated with the first user and a second avatar associated with the second user; (b) updating a visual-field image that is displayed on the second head-mounted device based on a motion of the second head-mounted device and the virtual space data; (d) presenting, to the second user, a fact that the first user is not wearing the first head-mounted device with the second user terminal in response to reception of unworn state information indicating the fact that the first user is not wearing the first head-mounted device.

According to the method described above, when the unworn state information indicating the fact that the first user is not wearing the first head-mounted device (hereinafter referred to as "first HMD") is received, the second user terminal presents to the second user the fact that the first user is not wearing the first HMD. In this manner, the second user can easily grasp the fact that the first user is not wearing the first HMD when the second user is communicating to/from the first user in the virtual space. Therefore, it is possible to provide the user with a rich virtual experience.

In particular, the second user may feel strange about the first user who does not exhibit any reaction when the second user does not grasp the fact that the first user is not wearing the first HMD. In this manner, it is possible to avoid a situation in which the second user feels strange about the first user who does not exhibit any reaction by allowing the second user to grasp the fact that the first user is not wearing the first HMD.

(2) The information processing method according to Item (1), in which the (d) presenting of the fact includes visualizing the fact that the first user is not wearing the first head-mounted device on a field-of-view image displayed on the second head-mounted device when receiving the unworn state information.

According to the method described above, when the unworn state information indicating the fact that the first user is not wearing the first head-mounted device (first HMD) is received, information indicating the fact that the first user is not wearing the first HMD is visualized in the field-of-view image displayed on the second head-mounted device (second HMD). In this manner, the second user can easily grasp the fact that the first user is not wearing the first HMD by visually recognizing, through the second HMD, the information indicating the fact that the first user is not wearing the first HMD when communicating to/from the first user in the virtual space.

(3) The information processing method according to Item (1) or (2), further including (e) updating a facial expression of the first avatar based on received face information representing a facial expression of the first avatar, in which the (d) presenting of the fact includes visualizing the first avatar whose facial expression is set to a first mode on a field-of-view image displayed on the second head-mounted device when receiving the unworn state information.

According to the method described above, when the unworn state information indicating the fact that the first user is not wearing the first head-mounted device (first HMD) is received, the first avatar whose facial expression is set to the first mode is visualized on the field-of-view image displayed on the second head-mounted device (second HMD). In this manner, the second user can easily grasp the fact that the first user is not wearing the first HMD by visually recognizing the fact that the facial expression of the first avatar is a predetermined facial expression when communicating to/from the first user in the virtual space.

In particular, when the first user is not wearing the first HMD, the facial expression of the first avatar is not updated at all. Thus, the second user may feel strange about the first user when the second user does not grasp the fact that the first user is not wearing the first HMD. In this manner, it is possible to avoid a situation in which the second user feels strange about the first user who does not exhibit any reaction by allowing the second user to grasp the fact that the first user is not wearing the first HMD.

(4) The information processing method according to Item (3), in which the first mode is a default facial expression of the first avatar.

According to the method described above, when the unworn state information indicating the fact that the first user is not wearing the first head-mounted device (first HMD) is received, the facial expression of the first avatar becomes the default facial expression of the first avatar. In this manner, the second user can easily grasp the fact that the first user is not wearing the first HMD by visually recognizing the fact that the facial expression of the first avatar becomes the default facial expression when communicating to/from the first user in the virtual space.

(5) The information processing method according to Item (3), in which the first mode is a facial expression selected in advance as a mode indicating the fact that the first user is not wearing the first head-mounted device.

According to the method described above, when the unworn state information indicating the fact that the first user is not wearing the first head-mounted device (first HMD) is received, the facial expression of the first avatar is set to a facial expression (hereinafter referred to as "selected facial expression") selected in advance by the first user as a mode indicating the fact that the first user is not wearing the first head-mounted device. In this manner, the second user can easily grasp the fact that the first user is not wearing the first HMD by visually recognizing the fact that the facial expression of the first avatar becomes the selected facial expression when communicating to/from the first user in the virtual space.

(6) The information processing method according to any one of Items (1) to (5), in which the first user terminal includes a wearing sensor configured to detect whether the first user is wearing the first head-mounted device, and in which, when the wearing sensor detects the fact that the first user is not wearing the first head-mounted device, the first user terminal outputs the unworn state information and the second user terminal receives the output unworn state information from the first user terminal.

According to the method described above, the fact that the first user is not wearing the first head-mounted device (first HMD) is identified based on the information transmitted from the wearing sensor of the first user terminal. After that, the unworn state information indicating the fact that the first user is not wearing the first HMD is transmitted. In this manner, it is possible to automatically identify the fact that the first user is not wearing the first HMD based on the information output from the wearing sensor of the first user terminal.

(7) The information processing method according to any one of Items (1) to (6), further including presenting, to the second user, the fact the first user is wearing the first head-mounted device with the second user terminal when receiving worn state information indicating the fact that the first user has put on the first HMD again after the first user removed the first head-mounted device.

According to the method described above, when the worn state information indicating the fact that the first user has put on the first head-mounted device (first HMD) again after the first user removed the first head-mounted device, the second terminal presents to the second user the fact that the first user is wearing the first HMD. In this manner, the second user can easily recognize the fact that the first user has put on the first HMD again. Therefore, it is possible to provide the user with a rich virtual experience.

(8) A program for executing the information processing method of any one of Items (1) to (7) on a computer.

According to the program described above, it is possible to provide the user with a rich virtual experience.

(9) A virtual space delivering system, which is configured to execute the information processing method of any one of Items (1) to (7), the virtual space delivering system including: a first user terminal including a first head-mounted device to be worn on a head of a first user; and a second user terminal including a second head-mounted device to be worn on a head of a second user.

According to the virtual space delivering system described above, it is possible to provide the user with a rich virtual experience.

(10) An apparatus, including a processor and a memory having stored thereon a computer-readable instruction, in which the apparatus is configured to execute the information processing method of any one of Items (1) to (7) when the computer-readable instruction is executed by the processor.

According to the apparatus described above, it is possible to provide the user with a rich virtual experience.

(11) A program for causing a computer for providing a user with a virtual experience to execute: moving an operation object in a virtual space in association with a motion of a part of a body of the user; performing, by the operation object, a first action on a virtual object whose motion in the virtual space is controllable based on a motion of another user different from the user; and performing a second action on the another user based on execution of the first action.

According to the program described above, it is possible to improve the virtual experience of the user. In particular, the plurality of users sharing the virtual space perform an action through an intuitive operation using an operation object, to thereby be able to smoothly communicate to/from one another in the virtual space without impairing the sense of immersion.

(12) The program according to Item (11), in which the second action is performed when the first action is performed under a state in which the virtual object is not controlled by the another user.

According to the program described above, the second action is performed on a virtual object that is not controlled at that time, to thereby be able to induce another user to participate in the virtual space.

(13) The program according to Item (11) or (12), in which the first action includes a motion of touching the virtual object in a process of a reciprocal motion of the operation object.

(14) The program according to Item (13), in which the first action includes a motion of touching the virtual object in the process of the reciprocal motion at an acceleration of a fixed value or more.

(15) The program according to Item (13) or (14), in which the first action includes a motion of passing a relative coordinate associated with the virtual object a predetermined number of times or more within a certain period of time.

According to those programs, it is possible to prevent erroneous detection of the motion of the operation object by not considering a case of the operation object having erroneously touched the virtual object.

(16) The program according to any one of Items (11) to (15), in which the second action includes notification for inducing the another user to participate in the virtual space.

According to the program described above, it is possible to allow the other users sharing the virtual space to easily recognize, for example, the fact that the other users are requested to participate in a multiplayer game.

(17) The program according to Item (16), in which the program causes the computer to further execute: transitioning the virtual object from a first state to a second state when reaction to the second action is exhibited; and transitioning the virtual object to a third state when the virtual object has entered a state of being controlled by the another user within a certain period of time after the transition to the second state.

According to the program described above, the user who has performed the first action can easily grasp the fact that another user has reacted or the virtual object has entered the state of being controlled by another user.

(18) The program according to Item (17), in which the program causes the computer to further execute returning the virtual object to the first state when the virtual object has not entered the state of being controlled by the another user within the certain period of time after the transition to the second state.

According to the program described above, the user who has performed the first action can easily grasp the fact that the virtual object has not entered the state of being controlled by another user in spite of execution of the second action.

(19) The program according to any one of Items (16) to (18), in which details of the notification are different depending on at least one of a strength of a motion of the first action performed on the virtual object or a type of the first action performed on the virtual object.

According to the method described above, another user can easily grasp the level of a request for participation in the multiplayer game, which has been given by the user who has performed the first action, and can determine whether to participate in the virtual space depending on the level of the request.

(20) The program according to any one of Items (11) to (19), in which the program causes the computer to further execute: performing the first action with the operation object on another virtual object whose motion in the virtual space is controllable by the computer; and transitioning a game provided in the virtual space from a first scene to a second scene based on execution of the first action.

According to the program described above, it is possible to progress the game without impairing the sense of immersion of the user into the virtual space.

(21) An information processing apparatus, which is configured to provide a user with a virtual experience, the information processing apparatus including a processor, in which the processor is configured to control the information processing apparatus to execute: moving an operation object in a virtual space in association with a motion of a part of a body of the user; performing a first action with the operation object on a virtual object whose motion in the virtual space is controllable based on a motion of another user different from the user; and performing a second action on the another user based on execution of the first action.

According to the information processing apparatus described above, it is possible to improve the virtual experience of the user.

(22) An information processing system, which is configured to provide a user with a virtual experience, the information processing system including a plurality of processors, in which each of the plurality of processors is configured to control the information processing system to execute: moving an operation object in a virtual space in association with a motion of a part of a body of the user; performing a first action with the operation object on a virtual object whose motion in the virtual space is controllable based on a motion of another user different from the user; and performing a second action on the another user based on execution of the first action.

According to the information processing system described above, it is possible to improve the virtual experience of the user.

(23) An information processing method to be executed on a computer to provide a user with a virtual experience, the information processing method including: moving an operation object in a virtual space in association with a motion of a part of a body of the user; performing a first action with the operation object on a virtual object whose motion in the virtual space is controllable based on a motion of another user different from the user; and performing a second action on the another user based on execution of the first action.

According to the information processing method described above, it is possible to improve the virtual experience of the user.

(24) A program for causing a computer for providing a user with a virtual space to execute: performing a first action in a virtual space; performing a second action on another user different from the user based on execution of the first action; and performing a third action in the virtual space based on reaction to the second action.

According to the program described above, it is possible to improve the virtual experience of the user. In particular, it is possible to provide a novel virtual experience that achieves a seamless boundary between the real space and the virtual space by performing the third action in the virtual space based on reaction to the second action performed on another user.

(25) The program according to Item (24), in which the first action is an action for identifying the another user, and the third action is an action performed by a virtual object associated with the another user in the virtual space.

According to the program described above, the plurality of users sharing the virtual space can smoothly communicate to/from one another in the virtual space by performing actions on one another.

(26) The program according to Item (24) or (25), in which the program causes the computer to further execute moving an operation object in the virtual space in association with a motion of a part of a body of the user, and in which the first action is performed through use of the operation object.

According to the program described above, the plurality of users sharing the virtual space can perform actions through an intuitive operation using operation objects, and the sense of immersion is not impaired.

(27) The program according to any one of Items (24) to (26), in which the second action includes notification for inducing the another user to participate in the virtual space.

According to the program described above, the other users sharing the virtual space can easily recognize, for example, the fact that participation in the multiplayer game is requested, and it is possible to promote usage of the multiplayer game.

(28) A program according to any one of Items (24) to (27), in which the third action includes transitioning an action performed by a virtual object associated with the another user in the virtual space from a first state to a second state.

According to the method described above, the user who has performed the first action can easily grasp whether or not another user has reacted.

(29) An information processing apparatus, which is configured to provide a user with a virtual experience, the information processing apparatus including a processor, in which the processor is configured to control the information processing apparatus to execute: performing a first action in a virtual space; performing a second action on another user different from the user based on execution of the first action; and performing a third action in the virtual space based on reaction to the second action.

According to the information processing apparatus described above, it is possible to improve the virtual experience of the user.

(30) An information processing system, which is configured to provide a user with a virtual experience, the information processing system including a plurality of processors, in which each of the plurality of processors is configured to control the information processing system to execute: performing a first action in a virtual space; performing a second action on another user different from the user based on execution of the first action; and performing a third action in the virtual space based on reaction to the second action.

According to the information processing apparatus described above, it is possible to improve the virtual experience of the user.

(31) An information processing method to be executed on a computer to provide a user with a virtual experience, the information processing method including: performing a first action in a virtual space; performing a second action on another user different from the user based on execution of the first action; and performing a third action in the virtual space based on reaction to the second action.

According to the information processing apparatus described above, it is possible to improve the virtual experience of the user.

DETAILED DESCRIPTION

Now, with reference to the drawings, embodiments of this technical idea are described in detail. In the following description, like components are denoted by like reference symbols. The same applies to the names and functions of those components. Therefore, detailed description of those components is not repeated. In one or more embodiments described in this disclosure, components of respective embodiments can be combined with each other, and the combination also serves as a part of the embodiments described in this disclosure.

[Configuration of HMD System]

With reference to FIG. 1, a configuration of a head-mounted device (HMD) system 100 is described. FIG. 1 is a diagram of a system 100 including a head-mounted display (HMD) according to at least one embodiment of this disclosure. The system 100 is usable for household use or for professional use.

The system 100 includes a server 600, HMD sets 110A, 110B, 110C, and 110D, an external device 700, and a network 2. Each of the HMD sets 110A, 110B, 110C, and 110D is capable of independently communicating to/from the server 600 or the external device 700 via the network 2. In some instances, the HMD sets 110A, 110B, 110C, and 110D are also collectively referred to as "HMD set 110". The number of HMD sets 110 constructing the HMD system 100 is not limited to four, but may be three or less, or five or more. The HMD set 110 includes an HMD 120, a computer 200, an HMD sensor 410, a display 430, and a controller 300. The HMD 120 includes a monitor 130, an eye gaze sensor 140, a first camera 150, a second camera 160, a microphone 170, and a speaker 180. In at least one embodiment, the controller 300 includes a motion sensor 420.

In at least one aspect, the computer 200 is connected to the network 2, for example, the Internet, and is able to communicate to/from the server 600 or other computers connected to the network 2 in a wired or wireless manner. Examples of the other computers include a computer of another HMD set 110 or the external device 700. In at least one aspect, the HMD 120 includes a sensor 190 instead of the HMD sensor 410. In at least one aspect, the HMD 120 includes both sensor 190 and the HMD sensor 410.

The HMD 120 is wearable on a head of a user 5 to display a virtual space to the user 5 during operation. More specifically, in at least one embodiment, the HMD 120 displays each of a right-eye image and a left-eye image on the monitor 130. Each eye of the user 5 is able to visually recognize a corresponding image from the right-eye image and the left-eye image so that the user 5 may recognize a three-dimensional image based on the parallax of both of the user's the eyes. In at least one embodiment, the HMD 120 includes any one of a so-called head-mounted display including a monitor or a head-mounted device capable of mounting a smartphone or other terminals including a monitor.

The monitor 130 is implemented as, for example, a non-transmissive display device. In at least one aspect, the monitor 130 is arranged on a main body of the HMD 120 so as to be positioned in front of both the eyes of the user 5. Therefore, when the user 5 is able to visually recognize the three-dimensional image displayed by the monitor 130, the user 5 is immersed in the virtual space. In at least one aspect, the virtual space includes, for example, a background, objects that are operable by the user 5, or menu images that are selectable by the user 5. In at least one aspect, the monitor 130 is implemented as a liquid crystal monitor or an organic electroluminescence (EL) monitor included in a so-called smartphone or other information display terminals.

In at least one aspect, the monitor 130 is implemented as a transmissive display device. In this case, the user 5 is able to see through the HMD 120 covering the eyes of the user 5, for example, smartglasses. In at least one embodiment, the transmissive monitor 130 is configured as a temporarily non-transmissive display device through adjustment of a transmittance thereof. In at least one embodiment, the monitor 130 is configured to display a real space and a part of an image constructing the virtual space simultaneously. For example, in at least one embodiment, the monitor 130 displays an image of the real space captured by a camera mounted on the HMD 120, or may enable recognition of the real space by setting the transmittance of a part the monitor 130 sufficiently high to permit the user 5 to see through the HMD 120.

In at least one aspect, the monitor 130 includes a sub-monitor for displaying a right-eye image and a sub-monitor for displaying a left-eye image. In at least one aspect, the monitor 130 is configured to integrally display the right-eye image and the left-eye image. In this case, the monitor 130 includes a high-speed shutter. The high-speed shutter operates so as to alternately display the right-eye image to the right of the user 5 and the left-eye image to the left eye of the user 5, so that only one of the user's 5 eyes is able to recognize the image at any single point in time.

In at least one aspect, the HMD 120 includes a plurality of light sources (not shown). Each light source is implemented by, for example, a light emitting diode (LED) configured to emit an infrared ray. The HMD sensor 410 has a position tracking function for detecting the motion of the HMD 120. More specifically, the HMD sensor 410 reads a plurality of infrared rays emitted by the HMD 120 to detect the position and the inclination of the HMD 120 in the real space.

In at least one aspect, the HMD sensor 410 is implemented by a camera. In at least one aspect, the HMD sensor 410 uses image information of the HMD 120 output from the camera to execute image analysis processing, to thereby enable detection of the position and the inclination of the HMD 120.

In at least one aspect, the HMD 120 includes the sensor 190 instead of, or in addition to, the HMD sensor 410 as a position detector. In at least one aspect, the HMD 120 uses the sensor 190 to detect the position and the inclination of the HMD 120. For example, in at least one embodiment, when the sensor 190 is an angular velocity sensor, a geomagnetic sensor, or an acceleration sensor, the HMD 120 uses any or all of those sensors instead of (or in addition to)

the HMD sensor 410 to detect the position and the inclination of the HMD 120. As an example, when the sensor 190 is an angular velocity sensor, the angular velocity sensor detects over time the angular velocity about each of three axes of the HMD 120 in the real space. The HMD 120 calculates a temporal change of the angle about each of the three axes of the HMD 120 based on each angular velocity, and further calculates an inclination of the HMD 120 based on the temporal change of the angles.

The eye gaze sensor 140 detects a direction in which the lines of sight of the right eye and the left eye of the user 5 are directed. That is, the eye gaze sensor 140 detects the line of sight of the user 5. The direction of the line of sight is detected by, for example, a known eye tracking function. The eye gaze sensor 140 is implemented by a sensor having the eye tracking function. In at least one aspect, the eye gaze sensor 140 includes a right-eye sensor and a left-eye sensor. In at least one embodiment, the eye gaze sensor 140 is, for example, a sensor configured to irradiate the right eye and the left eye of the user 5 with an infrared ray, and to receive a reflection light from the cornea and the iris with respect to the irradiation light, to thereby detect a rotational angle of each of the user's 5 eyeballs. In at least one embodiment, the eye gaze sensor 140 detects the line of sight of the user 5 based on each detected rotational angle.

The first camera 150 photographs a lower part of a face of the user 5. More specifically, the first camera 150 photographs, for example, the nose or mouth of the user 5. The second camera 160 photographs, for example, the eyes and eyebrows of the user 5. A side of a casing of the HMD 120 on the user 5 side is defined as an interior side of the HMD 120, and a side of the casing of the HMD 120 on a side opposite to the user 5 side is defined as an exterior side of the HMD 120. In at least one aspect, the first camera 150 is arranged on an exterior side of the HMD 120, and the second camera 160 is arranged on an interior side of the HMD 120. Images generated by the first camera 150 and the second camera 160 are input to the computer 200. In at least one aspect, the first camera 150 and the second camera 160 are implemented as a single camera, and the face of the user 5 is photographed with this single camera.

The microphone 170 converts an utterance of the user 5 into a voice signal (electric signal) for output to the computer 200. The speaker 180 converts the voice signal into a voice for output to the user 5. In at least one embodiment, the speaker 180 converts other signals into audio information provided to the user 5. In at least one aspect, the HMD 120 includes earphones in place of the speaker 180.

The controller 300 is connected to the computer 200 through wired or wireless communication. The controller 300 receives input of a command from the user 5 to the computer 200. In at least one aspect, the controller 300 is held by the user 5. In at least one aspect, the controller 300 is mountable to the body or a part of the clothes of the user 5. In at least one aspect, the controller 300 is configured to output at least any one of a vibration, a sound, or light based on the signal transmitted from the computer 200. In at least one aspect, the controller 300 receives from the user 5 an operation for controlling the position and the motion of an object arranged in the virtual space.

In at least one aspect, the controller 300 includes a plurality of light sources. Each light source is implemented by, for example, an LED configured to emit an infrared ray. The HMD sensor 410 has a position tracking function. In this case, the HMD sensor 410 reads a plurality of infrared rays emitted by the controller 300 to detect the position and the inclination of the controller 300 in the real space. In at least one aspect, the HMD sensor 410 is implemented by a camera. In this case, the HMD sensor 410 uses image information of the controller 300 output from the camera to execute image analysis processing, to thereby enable detection of the position and the inclination of the controller 300.

In at least one aspect, the motion sensor 420 is mountable on the hand of the user 5 to detect the motion of the hand of the user 5. For example, the motion sensor 420 detects a rotational speed, a rotation angle, and the number of rotations of the hand. The detected signal is transmitted to the computer 200. The motion sensor 420 is provided to, for example, the controller 300. In at least one aspect, the motion sensor 420 is provided to, for example, the controller 300 capable of being held by the user 5. In at least one aspect, to help prevent accidently release of the controller 300 in the real space, the controller 300 is mountable on an object like a glove-type object that does not easily fly away by being worn on a hand of the user 5. In at least one aspect, a sensor that is not mountable on the user 5 detects the motion of the hand of the user 5. For example, a signal of a camera that photographs the user 5 may be input to the computer 200 as a signal representing the motion of the user 5. As at least one example, the motion sensor 420 and the computer 200 are connected to each other through wired or wireless communication. In the case of wireless communication, the communication mode is not particularly limited, and for example, Bluetooth (trademark) or other known communication methods are usable.

The display 430 displays an image similar to an image displayed on the monitor 130. With this, a user other than the user 5 wearing the HMD 120 can also view an image similar to that of the user 5. An image to be displayed on the display 430 is not required to be a three-dimensional image, but may be a right-eye image or a left-eye image. For example, a liquid crystal display or an organic EL monitor may be used as the display 430.

In at least one embodiment, the server 600 transmits a program to the computer 200. In at least one aspect, the server 600 communicates to/from another computer 200 for providing virtual reality to the HMD 120 used by another user. For example, when a plurality of users play a participatory game, for example, in an amusement facility, each computer 200 communicates to/from another computer 200 via the server 600 with a signal that is based on the motion of each user, to thereby enable the plurality of users to enjoy a common game in the same virtual space. Each computer 200 may communicate to/from another computer 200 with the signal that is based on the motion of each user without intervention of the server 600.

The external device 700 is any suitable device as long as the external device 700 is capable of communicating to/from the computer 200. The external device 700 is, for example, a device capable of communicating to/from the computer 200 via the network 2, or is a device capable of directly communicating to/from the computer 200 by near field communication or wired communication. Peripheral devices such as a smart device, a personal computer (PC), or the computer 200 are usable as the external device 700, in at least one embodiment, but the external device 700 is not limited thereto.

[Hardware Configuration of Computer]

Figure 2:
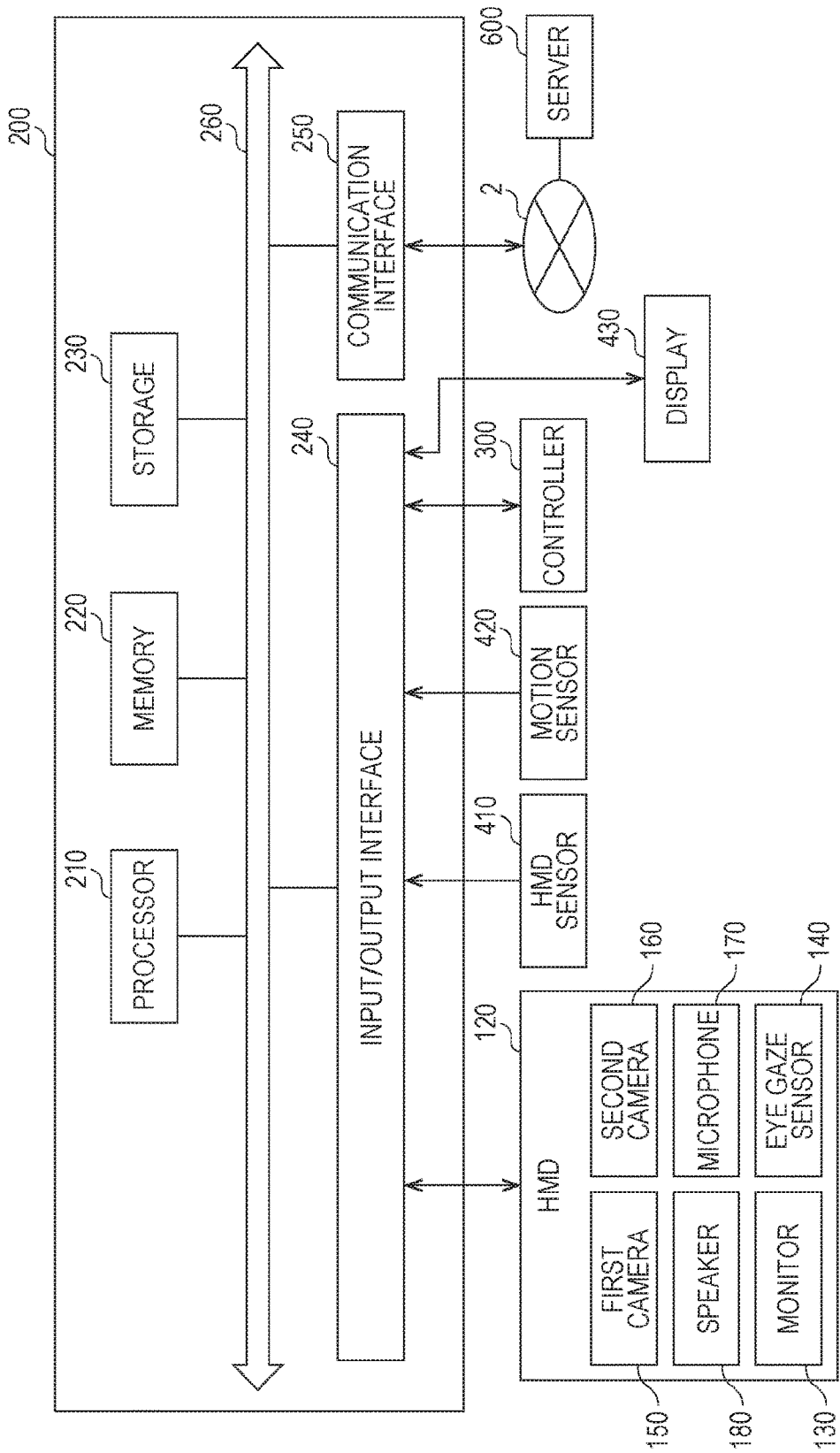
FIG. 2 A block diagram of a hardware configuration of a computer according to at least one embodiment of this disclosure.

With reference to FIG. 2, the computer 200 in at least one embodiment is described. FIG. 2 is a block diagram of a hardware configuration of the computer 200 according to at least one embodiment. The computer 200 includes, a processor 210, a memory 220, a storage 230, an input/output interface 240, and a communication interface 250. Each component is connected to a bus 260. In at least one embodiment, at least one of the processor 210, the memory 220, the storage 230, the input/output interface 240 or the communication interface 250 is part of a separate structure and communicates with other components of computer 200 through a communication path other than the bus 260.

The processor 210 executes a series of commands included in a program stored in the memory 220 or the storage 230 based on a signal transmitted to the computer 200 or in response to a condition determined in advance. In at least one aspect, the processor 210 is implemented as a central processing unit (CPU), a graphics processing unit (GPU), a micro-processor unit (MPU), a field-programmable gate array (FPGA), or other devices.

The memory 220 temporarily stores programs and data. The programs are loaded from, for example, the storage 230. The data includes data input to the computer 200 and data generated by the processor 210. In at least one aspect, the memory 220 is implemented as a random access memory (RAM) or other volatile memories.

The storage 230 permanently stores programs and data. In at least one embodiment, the storage 230 stores programs and data for a period of time longer than the memory 220, but not permanently. The storage 230 is implemented as, for example, a read-only memory (ROM), a hard disk device, a flash memory, or other non-volatile storage devices. The programs stored in the storage 230 include programs for providing a virtual space in the system 100, simulation programs, game programs, user authentication programs, and programs for implementing communication to/from other computers 200. The data stored in the storage 230 includes data and objects for defining the virtual space.

In at least one aspect, the storage 230 is implemented as a removable storage device like a memory card. In at least one aspect, a configuration that uses programs and data stored in an external storage device is used instead of the storage 230 built into the computer 200. With such a configuration, for example, in a situation in which a plurality of HMD systems 100 are used, for example in an amusement facility, the programs and the data are collectively updated.

The input/output interface 240 allows communication of signals among the HMD 120, the HMD sensor 410, the motion sensor 420, and the display 430. The monitor 130, the eye gaze sensor 140, the first camera 150, the second camera 160, the microphone 170, and the speaker 180 included in the HMD 120 may communicate to/from the computer 200 via the input/output interface 240 of the HMD 120. In at least one aspect, the input/output interface 240 is implemented with use of a universal serial bus (USB), a digital visual interface (DVI), a high-definition multimedia interface (HDMI) (trademark), or other terminals. The input/output interface 240 is not limited to the specific examples described above.

In at least one aspect, the input/output interface 240 further communicates to/from the controller 300. For example, the input/output interface 240 receives input of a signal output from the controller 300 and the motion sensor 420. In at least one aspect, the input/output interface 240 transmits a command output from the processor 210 to the controller 300. The command instructs the controller 300 to, for example, vibrate, output a sound, or emit light. When the controller 300 receives the command, the controller 300 executes any one of vibration, sound output, and light emission in accordance with the command.

The communication interface 250 is connected to the network 2 to communicate to/from other computers (e.g., server 600) connected to the network 2. In at least one aspect, the communication interface 250 is implemented as, for example, a local area network (LAN), other wired communication interfaces, wireless fidelity (Wi-Fi), Bluetooth®, near field communication (NFC), or other wireless communication interfaces. The communication interface 250 is not limited to the specific examples described above.

In at least one aspect, the processor 210 accesses the storage 230 and loads one or more programs stored in the storage 230 to the memory 220 to execute a series of commands included in the program. In at least one embodiment, the one or more programs includes an operating system of the computer 200, an application program for providing a virtual space, and/or game software that is executable in the virtual space. The processor 210 transmits a signal for providing a virtual space to the HMD 120 via the input/output interface 240. The HMD 120 displays a video on the monitor 130 based on the signal.

In FIG. 2, the computer 200 is outside of the HMD 120, but in at least one aspect, the computer 200 is integral with the HMD 120. As an example, a portable information communication terminal (e.g., smartphone) including the monitor 130 functions as the computer 200 in at least one embodiment.

In at least one embodiment, the computer 200 is used in common with a plurality of HMDs 120. With such a configuration, for example, the computer 200 is able to provide the same virtual space to a plurality of users, and hence each user can enjoy the same application with other users in the same virtual space.

According to at least one embodiment of this disclosure, in the system 100, a real coordinate system is set in advance. The real coordinate system is a coordinate system in the real space. The real coordinate system has three reference directions (axes) that are respectively parallel to a vertical direction, a horizontal direction orthogonal to the vertical direction, and a front-rear direction orthogonal to both of the vertical direction and the horizontal direction in the real space. The horizontal direction, the vertical direction (up-down direction), and the front-rear direction in the real coordinate system are defined as an x axis, a y axis, and a z axis, respectively. More specifically, the x axis of the real coordinate system is parallel to the horizontal direction of the real space, the y axis thereof is parallel to the vertical direction of the real space, and the z axis thereof is parallel to the front-rear direction of the real space.

In at least one aspect, the HMD sensor 410 includes an infrared sensor. When the infrared sensor detects the infrared ray emitted from each light source of the HMD 120, the infrared sensor detects the presence of the HMD 120. The HMD sensor 410 further detects the position and the inclination (direction) of the HMD 120 in the real space, which corresponds to the motion of the user 5 wearing the HMD 120, based on the value of each point (each coordinate value in the real coordinate system). In more detail, the HMD sensor 410 is able to detect the temporal change of the position and the inclination of the HMD 120 with use of each value detected over time.

Each inclination of the HMD 120 detected by the HMD sensor 410 corresponds to an inclination about each of the three axes of the HMD 120 in the real coordinate system. The HMD sensor 410 sets a uvw visual-field coordinate system to the HMD 120 based on the inclination of the HMD 120 in the real coordinate system. The uvw visual-field coordinate system set to the HMD 120 corresponds to a point-of-view coordinate system used when the user 5 wearing the HMD 120 views an object in the virtual space.

[Uvw Visual-Field Coordinate System]

Figure 3:
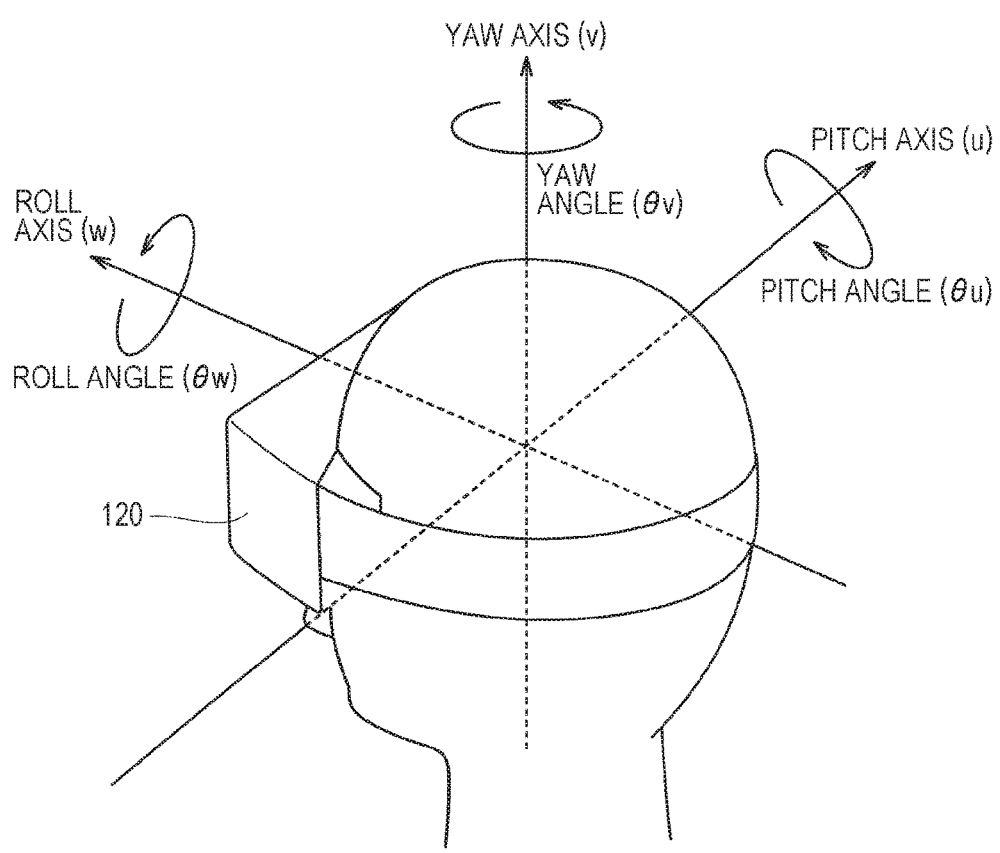
FIG. 3 A diagram of a uvw visual-field coordinate system to be set for an HMD according to at least one embodiment of this disclosure.

With reference to FIG. 3, the uvw visual-field coordinate system is described. FIG. 3 is a diagram of a uvw visual-field coordinate system to be set for the HMD 120 according to at least one embodiment of this disclosure. The HMD sensor 410 detects the position and the inclination of the HMD 120 in the real coordinate system when the HMD 120 is activated. The processor 210 sets the uvw visual-field coordinate system to the HMD 120 based on the detected values.

In FIG. 3, the HMD 120 sets the three-dimensional uvw visual-field coordinate system defining the head of the user 5 wearing the HMD 120 as a center (origin). More specifically, the HMD 120 sets three directions newly obtained by inclining the horizontal direction, the vertical direction, and the front-rear direction (x axis, y axis, and z axis), which define the real coordinate system, about the respective axes by the inclinations about the respective axes of the HMD 120 in the real coordinate system, as a pitch axis (u axis), a yaw axis (v axis), and a roll axis (w axis) of the uvw visual-field coordinate system in the HMD 120.

In at least one aspect, when the user 5 wearing the HMD 120 is standing (or sitting) upright and is visually recognizing the front side, the processor 210 sets the uvw visual-field coordinate system that is parallel to the real coordinate system to the HMD 120. In this case, the horizontal direction (x axis), the vertical direction (y axis), and the front-rear direction (z axis) of the real coordinate system directly match the pitch axis (u axis), the yaw axis (v axis), and the roll axis (w axis) of the uvw visual-field coordinate system in the HMD 120, respectively.

After the uvw visual-field coordinate system is set to the HMD 120, the HMD sensor 410 is able to detect the inclination of the HMD 120 in the set uvw visual-field coordinate system based on the motion of the HMD 120. In this case, the HMD sensor 410 detects, as the inclination of the HMD 120, each of a pitch angle (θu), a yaw angle (θv), and a roll angle (θw) of the HMD 120 in the uvw visual-field coordinate system. The pitch angle (θu) represents an inclination angle of the HMD 120 about the pitch axis in the uvw visual-field coordinate system. The yaw angle (θv) represents an inclination angle of the HMD 120 about the yaw axis in the uvw visual-field coordinate system. The roll angle (θw) represents an inclination angle of the HMD 120 about the roll axis in the uvw visual-field coordinate system.

The HMD sensor 410 sets, to the HMD 120, the uvw visual-field coordinate system of the HMD 120 obtained after the movement of the HMD 120 based on the detected inclination angle of the HMD 120. The relationship between the HMD 120 and the uvw visual-field coordinate system of the HMD 120 is constant regardless of the position and the inclination of the HMD 120. When the position and the inclination of the HMD 120 change, the position and the inclination of the uvw visual-field coordinate system of the HMD 120 in the real coordinate system change in synchronization with the change of the position and the inclination.

In at least one aspect, the HMD sensor 410 identifies the position of the HMD 120 in the real space as a position relative to the HMD sensor 410 based on the light intensity of the infrared ray or a relative positional relationship between a plurality of points (e.g., distance between points), which is acquired based on output from the infrared sensor. In at least one aspect, the processor 210 determines the origin of the uvw visual-field coordinate system of the HMD 120 in the real space (real coordinate system) based on the identified relative position.

[Virtual Space]

Figure 4:
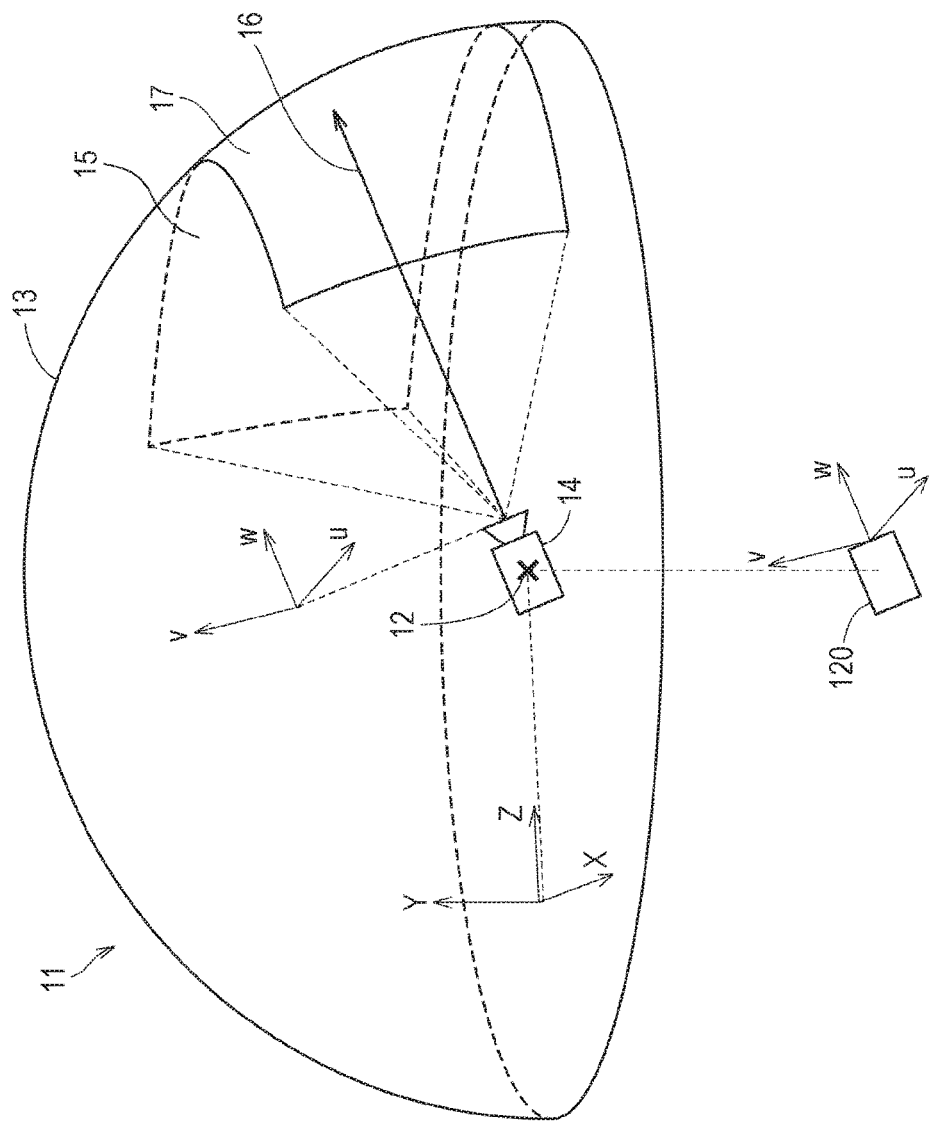
FIG. 4 A diagram of a mode of expressing a virtual space according to at least one embodiment of this disclosure.

With reference to FIG. 4, the virtual space is further described. FIG. 4 is a diagram of a mode of expressing a virtual space 11 according to at least one embodiment of this disclosure. The virtual space 11 has a structure with an entire celestial sphere shape covering a center 12 in all 360-degree directions. In FIG. 4, for the sake of clarity, only the upper-half celestial sphere of the virtual space 11 is included. Each mesh section is defined in the virtual space 11. The position of each mesh section is defined in advance as coordinate values in an XYZ coordinate system, which is a global coordinate system defined in the virtual space 11. The computer 200 associates each partial image forming a panorama image 13 (e.g., still image or moving image) that is developed in the virtual space 11 with each corresponding mesh section in the virtual space 11.

In at least one aspect, in the virtual space 11, the XYZ coordinate system having the center 12 as the origin is defined. The XYZ coordinate system is, for example, parallel to the real coordinate system. The horizontal direction, the vertical direction (up-down direction), and the front-rear direction of the XYZ coordinate system are defined as an X axis, a Y axis, and a Z axis, respectively. Thus, the X axis (horizontal direction) of the XYZ coordinate system is parallel to the x axis of the real coordinate system, the Y axis (vertical direction) of the XYZ coordinate system is parallel to the y axis of the real coordinate system, and the Z axis (front-rear direction) of the XYZ coordinate system is parallel to the z axis of the real coordinate system.

When the HMD 120 is activated, that is, when the HMD 120 is in an initial state, a virtual camera 14 is arranged at the center 12 of the virtual space 11. In at least one embodiment, the virtual camera 14 is offset from the center 12 in the initial state. In at least one aspect, the processor 210 displays on the monitor 130 of the HMD 120 an image photographed by the virtual camera 14. In synchronization with the motion of the HMD 120 in the real space, the virtual camera 14 similarly moves in the virtual space 11. With this, the change in position and direction of the HMD 120 in the real space is reproduced similarly in the virtual space 11.

The uvw visual-field coordinate system is defined in the virtual camera 14 similarly to the case of the HMD 120. The uvw visual-field coordinate system of the virtual camera 14 in the virtual space 11 is defined to be synchronized with the uvw visual-field coordinate system of the HMD 120 in the real space (real coordinate system). Therefore, when the inclination of the HMD 120 changes, the inclination of the virtual camera 14 also changes in synchronization therewith. The virtual camera 14 can also move in the virtual space 11 in synchronization with the movement of the user 5 wearing the HMD 120 in the real space.

The processor 210 of the computer 200 defines a field-of-view region 15 in the virtual space 11 based on the position and inclination (reference line of sight 16) of the virtual camera 14. The field-of-view region 15 corresponds to, of the virtual space 11, the region that is visually recognized by the user 5 wearing the HMD 120. That is, the position of the virtual camera 14 determines a point of view of the user 5 in the virtual space 11.

The line of sight of the user 5 detected by the eye gaze sensor 140 is a direction in the point-of-view coordinate system obtained when the user 5 visually recognizes an object. The uvw visual-field coordinate system of the HMD 120 is equal to the point-of-view coordinate system used when the user 5 visually recognizes the monitor 130. The uvw visual-field coordinate system of the virtual camera 14 is synchronized with the uvw visual-field coordinate system of the HMD 120. Therefore, in the system 100 in at least one aspect, the line of sight of the user 5 detected by the eye gaze sensor 140 can be regarded as the line of sight of the user 5 in the uvw visual-field coordinate system of the virtual camera 14.

Figure 5:
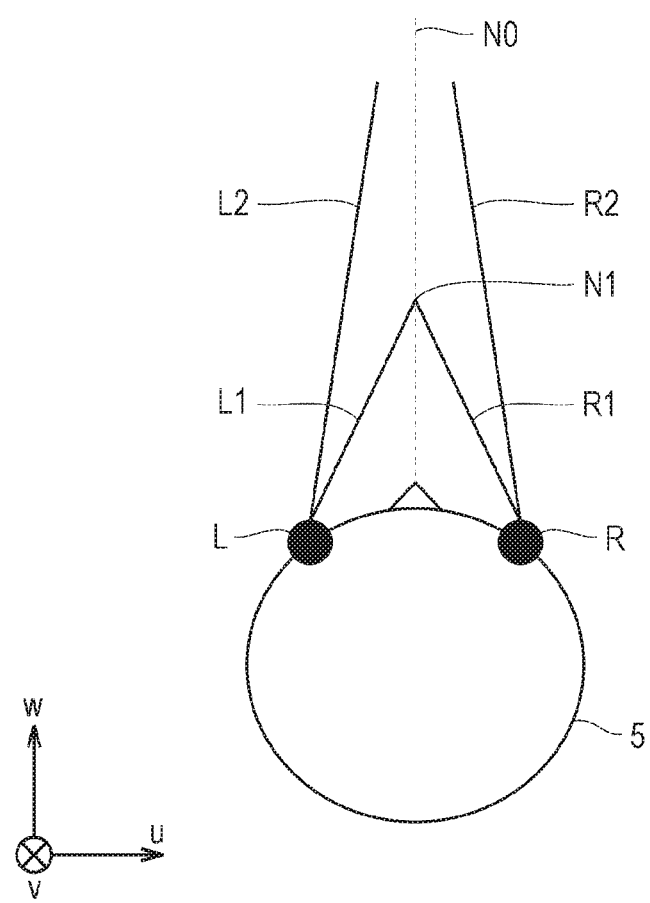
FIG. 5 A diagram of a plan view of a head of a user wearing the HMD according to at least one embodiment of this disclosure.

[User's Line of Sight] With reference to FIG. 5, determination of the line of sight of the user 5 is described. FIG. 5 is a plan view diagram of the head of the user 5 wearing the HMD 120 according to at least one embodiment of this disclosure.

In at least one aspect, the eye gaze sensor 140 detects lines of sight of the right eye and the left eye of the user 5. In at least one aspect, when the user 5 is looking at a near place, the eye gaze sensor 140 detects lines of sight R1 and L1. In at least one aspect, when the user 5 is looking at a far place, the eye gaze sensor 140 detects lines of sight R2 and L2. In this case, the angles formed by the lines of sight R2 and L2 with respect to the roll axis w are smaller than the angles formed by the lines of sight R1 and L1 with respect to the roll axis w. The eye gaze sensor 140 transmits the detection results to the computer 200.

When the computer 200 receives the detection values of the lines of sight R1 and L1 from the eye gaze sensor 140 as the detection results of the lines of sight, the computer 200 identifies a point of gaze N1 being an intersection of both the lines of sight R1 and L1 based on the detection values. Meanwhile, when the computer 200 receives the detection values of the lines of sight R2 and L2 from the eye gaze sensor 140, the computer 200 identifies an intersection of both the lines of sight R2 and L2 as the point of gaze. The computer 200 identifies a line of sight N0 of the user 5 based on the identified point of gaze N1. The computer 200 detects, for example, an extension direction of a straight line that passes through the point of gaze N1 and a midpoint of a straight line connecting a right eye R and a left eye L of the user 5 to each other as the line of sight N0. The line of sight N0 is a direction in which the user 5 actually directs his or her lines of sight with both eyes. The line of sight N0 corresponds to a direction in which the user 5 actually directs his or her lines of sight with respect to the field-of-view region 15.

In at least one aspect, the system 100 includes a television broadcast reception tuner. With such a configuration, the system 100 is able to display a television program in the virtual space 11.

In at least one aspect, the HMD system 100 includes a communication circuit for connecting to the Internet or has a verbal communication function for connecting to a telephone line or a cellular service.

[Field-of-View Region]

Figure 6:
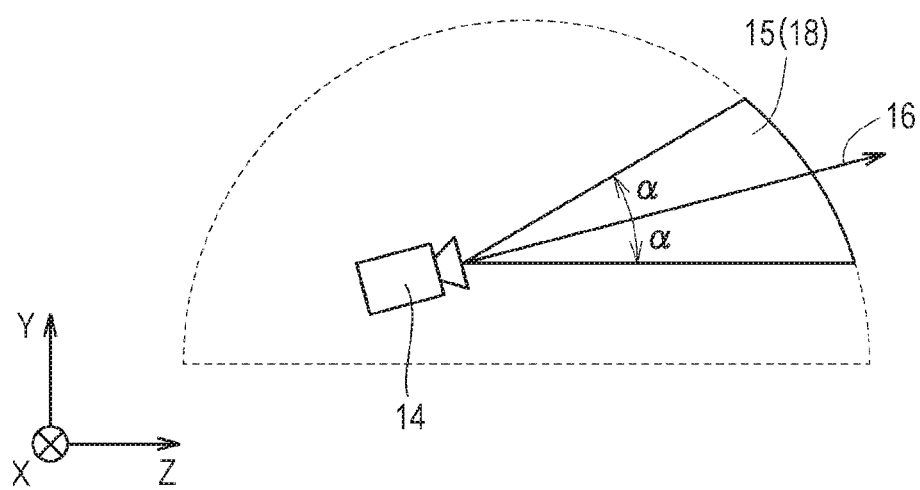
FIG. 6 A diagram of a YZ cross section obtained by viewing a field-of-view region from an X direction in the virtual space according to at least one embodiment of this disclosure.
Figure 7:
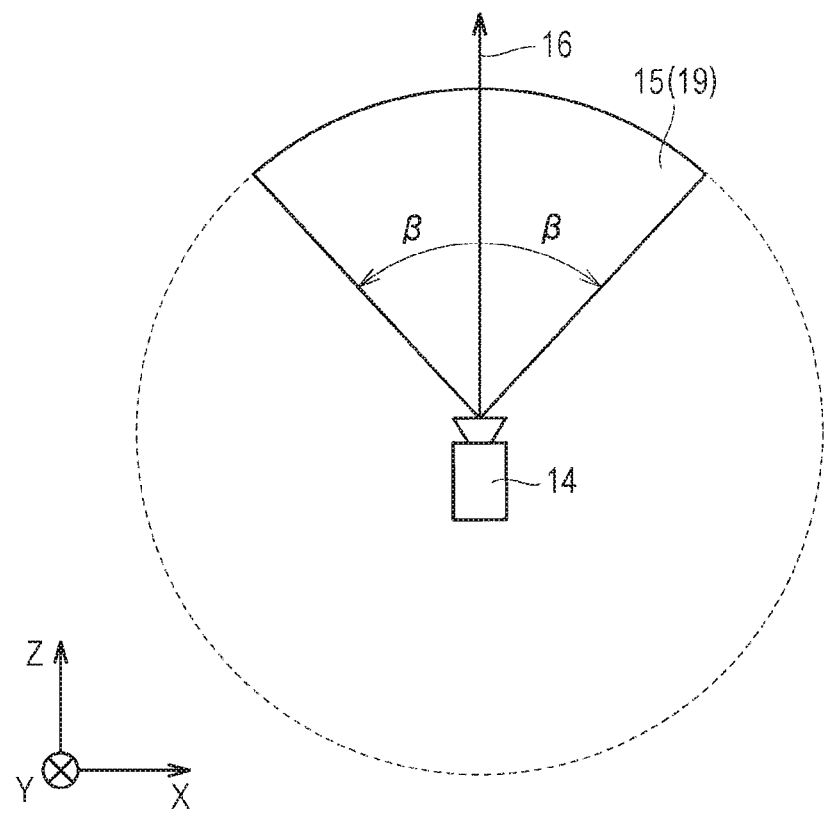
FIG. 7 A diagram of an XZ cross section obtained by viewing the field-of-view region from a Y direction in the virtual space according to at least one embodiment of this disclosure.

With reference to FIG. 6 and FIG. 7, the field-of-view region 15 is described. FIG. 6 is a diagram of a YZ cross section obtained by viewing the field-of-view region 15 from an X direction in the virtual space 11. FIG. 7 is a diagram of an XZ cross section obtained by viewing the field-of-view region 15 from a Y direction in the virtual space 11.

In FIG. 6, the field-of-view region 15 in the YZ cross section includes a region 18. The region 18 is defined by the position of the virtual camera 14, the reference line of sight 16, and the YZ cross section of the virtual space 11. The processor 210 defines a range of a polar angle α from the reference line of sight 16 serving as the center in the virtual space as the region 18.

In FIG. 7, the field-of-view region 15 in the XZ cross section includes a region 19. The region 19 is defined by the position of the virtual camera 14, the reference line of sight 16, and the XZ cross section of the virtual space 11. The processor 210 defines a range of an azimuth β from the reference line of sight 16 serving as the center in the virtual space 11 as the region 19. The polar angle α and β are determined in accordance with the position of the virtual camera 14 and the inclination (direction) of the virtual camera 14.

In at least one aspect, the system 100 causes the monitor 130 to display a field-of-view image 17 based on the signal from the computer 200, to thereby provide the field of view in the virtual space 11 to the user 5. The field-of-view image 17 corresponds to apart of the panorama image 13, which corresponds to the field-of-view region 15. When the user 5 moves the HMD 120 worn on his or her head, the virtual camera 14 is also moved in synchronization with the movement. As a result, the position of the field-of-view region 15 in the virtual space 11 is changed. With this, the field-of-view image 17 displayed on the monitor 130 is updated to an image of the panorama image 13, which is superimposed on the field-of-view region 15 synchronized with a direction in which the user 5 faces in the virtual space 11. The user 5 can visually recognize a desired direction in the virtual space 11.

In this way, the inclination of the virtual camera 14 corresponds to the line of sight of the user 5 (reference line of sight 16) in the virtual space 11, and the position at which the virtual camera 14 is arranged corresponds to the point of view of the user 5 in the virtual space 11. Therefore, through the change of the position or inclination of the virtual camera 14, the image to be displayed on the monitor 130 is updated, and the field of view of the user 5 is moved.

While the user 5 is wearing the HMD 120 (having a non-transmissive monitor 130), the user 5 can visually recognize only the panorama image 13 developed in the virtual space 11 without visually recognizing the real world. Therefore, the system 100 provides a high sense of immersion in the virtual space 11 to the user 5.

In at least one aspect, the processor 210 moves the virtual camera 14 in the virtual space 11 in synchronization with the movement in the real space of the user 5 wearing the HMD 120. In this case, the processor 210 identifies an image region to be projected on the monitor 130 of the HMD 120 (field-of-view region 15) based on the position and the direction of the virtual camera 14 in the virtual space 11.

In at least one aspect, the virtual camera 14 includes two virtual cameras, that is, a virtual camera for providing a right-eye image and a virtual camera for providing a left-eye image. An appropriate parallax is set for the two virtual cameras so that the user 5 is able to recognize the three-dimensional virtual space 11. In at least one aspect, the virtual camera 14 is implemented by a single virtual camera. In this case, a right-eye image and a left-eye image may be generated from an image acquired by the single virtual camera. In at least one embodiment, the virtual camera 14 is assumed to include two virtual cameras, and the roll axes of the two virtual cameras are synthesized so that the generated roll axis (w) is adapted to the roll axis (w) of the HMD 120.

[Controller]

Figure 8A:
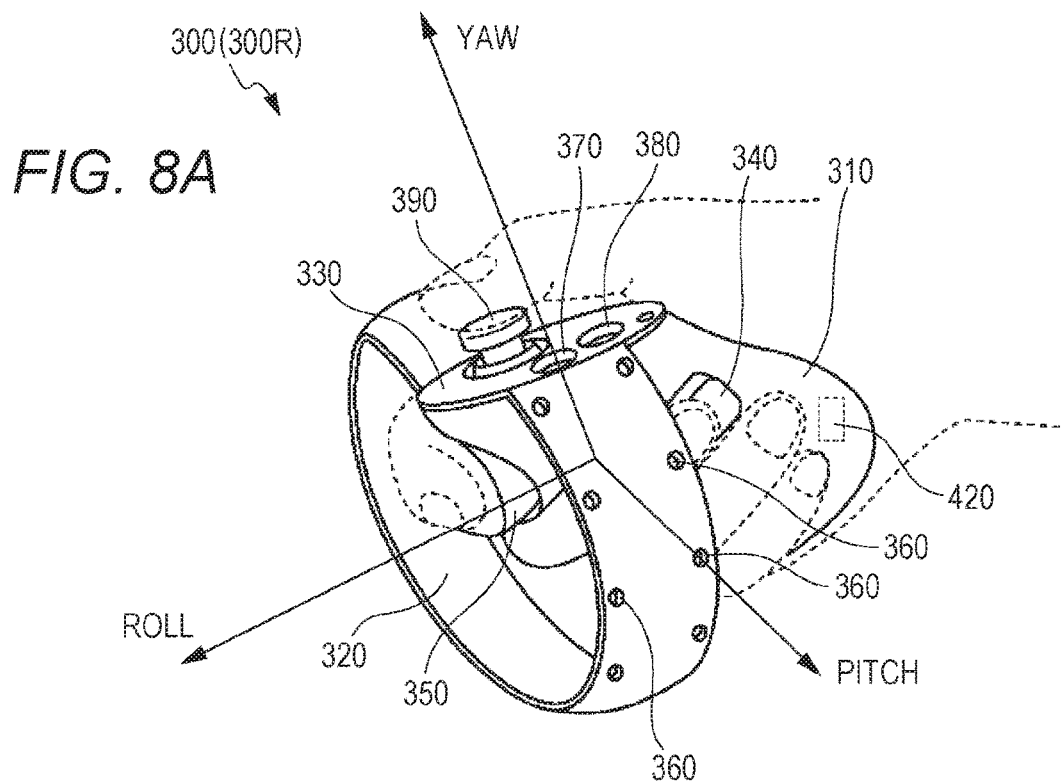
FIG. 8A A diagram of a schematic configuration of a controller according to at least one embodiment of this disclosure.
Figure 8B:
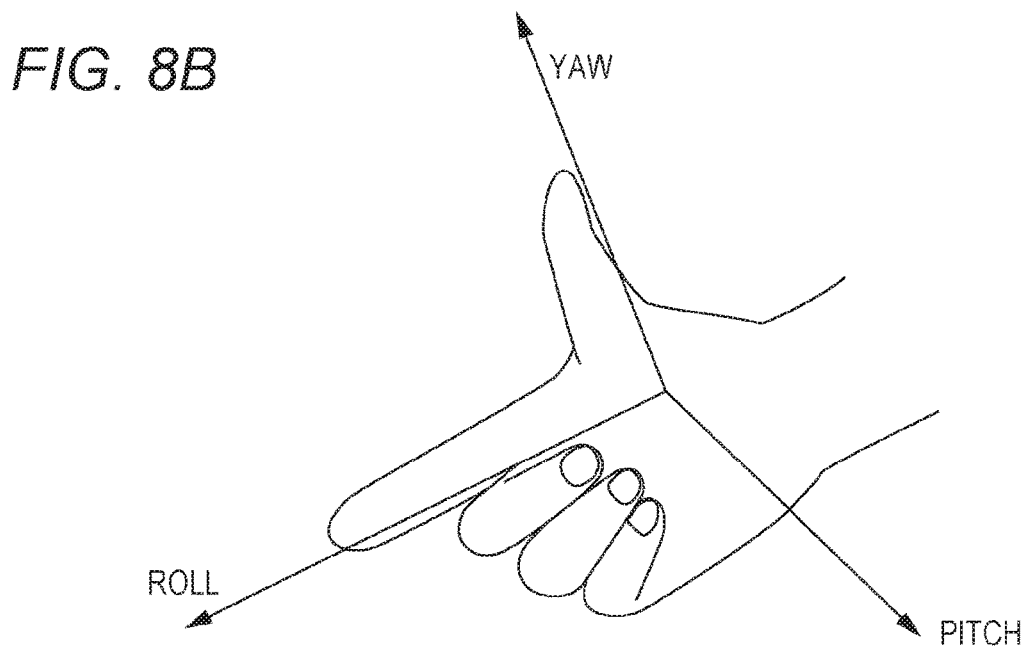
FIG. 8B A diagram of a coordinate system to be set for a hand of a user holding the controller according to at least one embodiment of this disclosure.

An example of the controller 300 is described with reference to FIG. 8A and FIG. 8B. FIG. 8A is a diagram of a schematic configuration of a controller according to at least one embodiment of this disclosure. FIG. 8B is a diagram of a coordinate system to be set for a hand of a user holding the controller according to at least one embodiment of this disclosure.

In at least one aspect, the controller 300 includes a right controller 300R and a left controller (not shown). In FIG. 8A only right controller 300R is shown for the sake of clarity.

The right controller 300R is operable by the right hand of the user 5. The left controller is operable by the left hand of the user 5. In at least one aspect, the right controller 300R and the left controller are symmetrically configured as separate devices. Therefore, the user 5 can freely move his or her right hand holding the right controller 300R and his or her left hand holding the left controller. In at least one aspect, the controller 300 may be an integrated controller configured to receive an operation performed by both the right and left hands of the user 5. The right controller 300R is now described.

The right controller 300R includes a grip 310, a frame 320, and a top surface 330. The grip 310 is configured so as to be held by the right hand of the user 5. For example, the grip 310 may be held by the palm and three fingers (e.g., middle finger, ring finger, and small finger) of the right hand of the user 5.

The grip 310 includes buttons 340 and 350 and the motion sensor 420. The button 340 is arranged on a side surface of the grip 310, and receives an operation performed by, for example, the middle finger of the right hand. The button 350 is arranged on a front surface of the grip 310, and receives an operation performed by, for example, the index finger of the right hand. In at least one aspect, the buttons 340 and 350 are configured as trigger type buttons. The motion sensor 420 is built into the casing of the grip 310. When a motion of the user 5 can be detected from the surroundings of the user 5 by a camera or other device. In at least one embodiment, the grip 310 does not include the motion sensor 420.

The frame 320 includes a plurality of infrared LEDs 360 arranged in a circumferential direction of the frame 320. The infrared LEDs 360 emit, during execution of a program using the controller 300, infrared rays in accordance with progress of the program. The infrared rays emitted from the infrared LEDs 360 are usable to independently detect the position and the posture (inclination and direction) of each of the right controller 300R and the left controller. In FIG. 8A, the infrared LEDs 360 are shown as being arranged in two rows, but the number of arrangement rows is not limited to that illustrated in FIG. 8. In at least one embodiment, the infrared LEDs 360 are arranged in one row or in three or more rows. In at least one embodiment, the infrared LEDs 360 are arranged in a pattern other than rows.

The top surface 330 includes buttons 370 and 380 and an analog stick 390. The buttons 370 and 380 are configured as push type buttons. The buttons 370 and 380 receive an operation performed by the thumb of the right hand of the user 5. In at least one aspect, the analog stick 390 receives an operation performed in any direction of 360 degrees from an initial position (neutral position). The operation includes, for example, an operation for moving an object arranged in the virtual space 11.

In at least one aspect, each of the right controller 300R and the left controller includes a battery for driving the infrared ray LEDs 360 and other members. The battery includes, for example, a rechargeable battery, a button battery, a dry battery, but the battery is not limited thereto. In at least one aspect, the right controller 300R and the left controller are connectable to, for example, a USB interface of the computer 200. In at least one embodiment, the right controller 300R and the left controller do not include a battery.

In FIG. 8A and FIG. 8B, for example, a yaw direction, a roll direction, and a pitch direction are defined with respect to the right hand of the user 5. A direction of an extended thumb is defined as the yaw direction, a direction of an extended index finger is defined as the roll direction, and a direction perpendicular to a plane is defined as the pitch direction.

[Hardware Configuration of Server]

Figure 9:
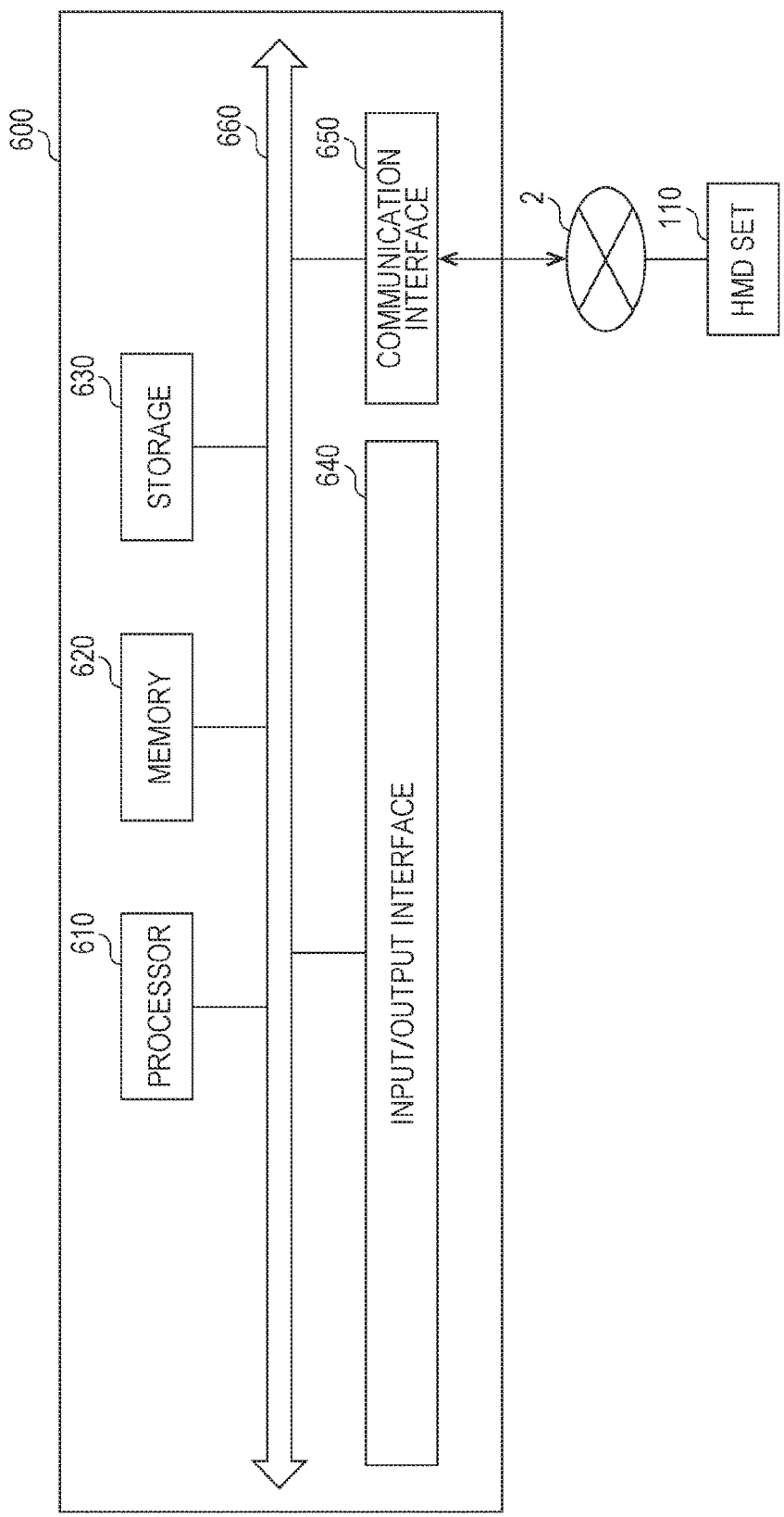
FIG. 9 A block diagram of a hardware configuration of a server according to at least one embodiment of this disclosure.

With reference to FIG. 9, the server 600 in at least one embodiment is described. FIG. 9 is a block diagram of a hardware configuration of the server 600 according to at least one embodiment of this disclosure. The server 600 includes a processor 610, a memory 620, a storage 630, an input/output interface 640, and a communication interface 650. Each component is connected to a bus 660. In at least one embodiment, at least one of the processor 610, the memory 620, the storage 630, the input/output interface 640 or the communication interface 650 is part of a separate structure and communicates with other components of server 600 through a communication path other than the bus 660.

The processor 610 executes a series of commands included in a program stored in the memory 620 or the storage 630 based on a signal transmitted to the server 600 or on satisfaction of a condition determined in advance. In at least one aspect, the processor 610 is implemented as a central processing unit (CPU), a graphics processing unit (GPU), a micro processing unit (MPU), a field-programmable gate array (FPGA), or other devices.

The memory 620 temporarily stores programs and data. The programs are loaded from, for example, the storage 630. The data includes data input to the server 600 and data generated by the processor 610. In at least one aspect, the memory 620 is implemented as a random access memory (RAM) or other volatile memories.

The storage 630 permanently stores programs and data. In at least one embodiment, the storage 630 stores programs and data for a period of time longer than the memory 620, but not permanently. The storage 630 is implemented as, for example, a read-only memory (ROM), a hard disk device, a flash memory, or other non-volatile storage devices. The programs stored in the storage 630 include programs for providing a virtual space in the system 100, simulation programs, game programs, user authentication programs, and programs for implementing communication to/from other computers 200 or servers 600. The data stored in the storage 630 may include, for example, data and objects for defining the virtual space.

In at least one aspect, the storage 630 is implemented as a removable storage device like a memory card. In at least one aspect, a configuration that uses programs and data stored in an external storage device is used instead of the storage 630 built into the server 600. With such a configuration, for example, in a situation in which a plurality of HMD systems 100 are used, for example, as in an amusement facility, the programs and the data are collectively updated.

The input/output interface 640 allows communication of signals to/from an input/output device. In at least one aspect, the input/output interface 640 is implemented with use of a USB, a DVI, an HDMI, or other terminals. The input/output interface 640 is not limited to the specific examples described above.

The communication interface 650 is connected to the network 2 to communicate to/from the computer 200 connected to the network 2. In at least one aspect, the communication interface 650 is implemented as, for example, a LAN, other wired communication interfaces, Wi-Fi, Bluetooth, NFC, or other wireless communication interfaces. The communication interface 650 is not limited to the specific examples described above.

In at least one aspect, the processor 610 accesses the storage 630 and loads one or more programs stored in the storage 630 to the memory 620 to execute a series of commands included in the program. In at least one embodiment, the one or more programs include, for example, an operating system of the server 600, an application program for providing a virtual space, and game software that can be executed in the virtual space. In at least one embodiment, the processor 610 transmits a signal for providing a virtual space to the HMD device 110 to the computer 200 via the input/output interface 640.

[Control Device of HMD]

Figure 10:
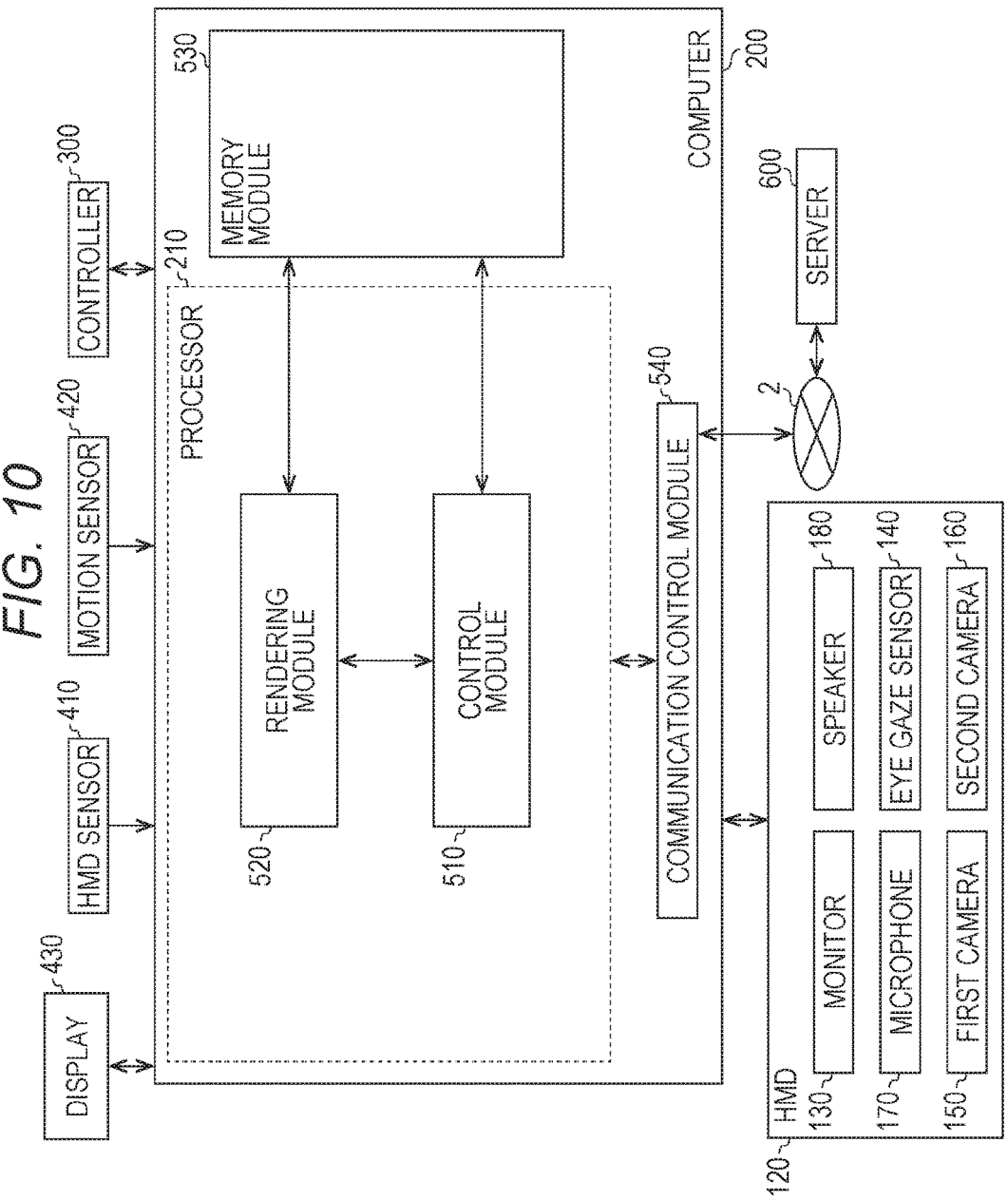
FIG. 10 A block diagram of a computer according to at least one embodiment of this disclosure.

With reference to FIG. 10, the control device of the HMD 120 is described. According to at least one embodiment of this disclosure, the control device is implemented by the computer 200 having a known configuration. FIG. 10 is a block diagram of the computer 200 according to at least one embodiment of this disclosure. FIG. 10 includes a module configuration of the computer 200.

In FIG. 10, the computer 200 includes a control module 510, a rendering module 520, a memory module 530, and a communication control module 540. In at least one aspect, the control module 510 and the rendering module 520 are implemented by the processor 210. In at least one aspect, a plurality of processors 210 function as the control module 510 and the rendering module 520. The memory module 530 is implemented by the memory 220 or the storage 230. The communication control module 540 is implemented by the communication interface 250.

The control module 510 controls the virtual space 11 provided to the user 5. The control module 510 defines the virtual space 11 in the HMD system 100 using virtual space data representing the virtual space 11. The virtual space data is stored in, for example, the memory module 530. In at least one embodiment, the control module 510 generates virtual space data. In at least one embodiment, the control module 510 acquires virtual space data from, for example, the server 600.

The control module 510 arranges objects in the virtual space 11 using object data representing objects. The object data is stored in, for example, the memory module 530. In at least one embodiment, the control module 510 generates virtual space data. In at least one embodiment, the control module 510 acquires virtual space data from, for example, the server 600. In at least one embodiment, the objects include, for example, an avatar object of the user 5, character objects, operation objects, for example, a virtual hand to be operated by the controller 300, and forests, mountains, other landscapes, streetscapes, or animals to be arranged in accordance with the progression of the story of the game.

The control module 510 arranges an avatar object of the user 5 of another computer 200, which is connected via the network 2, in the virtual space 11. In at least one aspect, the control module 510 arranges an avatar object of the user 5 in the virtual space 11. In at least one aspect, the control module 510 arranges an avatar object simulating the user 5 in the virtual space 11 based on an image including the user 5. In at least one aspect, the control module 510 arranges an avatar object in the virtual space 11, which is selected by the user 5 from among a plurality of types of avatar objects (e.g., objects simulating animals or objects of deformed humans).

The control module 510 identifies an inclination of the HMD 120 based on output of the HMD sensor 410. In at least one aspect, the control module 510 identifies an inclination of the HMD 120 based on output of the sensor 190 functioning as a motion sensor. The control module 510 detects parts (e.g., mouth, eyes, and eyebrows) forming the face of the user 5 from a face image of the user 5 generated by the first camera 150 and the second camera 160. The control module 510 detects a motion (shape) of each detected part.

The control module 510 detects a line of sight of the user 5 in the virtual space 11 based on a signal from the eye gaze sensor 140. The control module 510 detects a point-of-view position (coordinate values in the XYZ coordinate system) at which the detected line of sight of the user 5 and the celestial sphere of the virtual space 11 intersect with each other. More specifically, the control module 510 detects the point-of-view position based on the line of sight of the user 5 defined in the uvw coordinate system and the position and the inclination of the virtual camera 14. The control module 510 transmits the detected point-of-view position to the server 600. In at least one aspect, the control module 510 is configured to transmit line-of-sight information representing the line of sight of the user 5 to the server 600. In such a case, the control module 510 may calculate the point-of-view position based on the line-of-sight information received by the server 600.

The control module 510 translates a motion of the HMD 120, which is detected by the HMD sensor 410, in an avatar object. For example, the control module 510 detects inclination of the HMD 120, and arranges the avatar object in an inclined manner. The control module 510 translates the detected motion of face parts in a face of the avatar object arranged in the virtual space 11. The control module 510 receives line-of-sight information of another user 5 from the server 600, and translates the line-of-sight information in the line of sight of the avatar object of another user 5. In at least one aspect, the control module 510 translates a motion of the controller 300 in an avatar object and an operation object. In this case, the controller 300 includes, for example, a motion sensor, an acceleration sensor, or a plurality of light emitting elements (e.g., infrared LEDs) for detecting a motion of the controller 300.

The control module 510 arranges, in the virtual space 11, an operation object for receiving an operation by the user 5 in the virtual space 11. The user 5 operates the operation object to, for example, operate an object arranged in the virtual space 11. In at least one aspect, the operation object includes, for example, a hand object serving as a virtual hand corresponding to a hand of the user 5. In at least one aspect, the control module 510 moves the hand object in the virtual space 11 so that the hand object moves in association with a motion of the hand of the user 5 in the real space based on output of the motion sensor 420. In at least one aspect, the operation object may correspond to a hand part of an avatar object.

When one object arranged in the virtual space 11 collides with another object, the control module 510 detects the collision. The control module 510 is able to detect, for example, a timing at which a collision area of one object and a collision area of another object have touched with each other, and performs predetermined processing in response to the detected timing. In at least one embodiment, the control module 510 detects a timing at which an object and another object, which have been in contact with each other, have moved away from each other, and performs predetermined processing in response to the detected timing. In at least one embodiment, the control module 510 detects a state in which an object and another object are in contact with each other. For example, when an operation object touches another object, the control module 510 detects the fact that the operation object has touched the other object, and performs predetermined processing.

In at least one aspect, the control module 510 controls image display of the HMD 120 on the monitor 130. For example, the control module 510 arranges the virtual camera 14 in the virtual space 11. The control module 510 controls the position of the virtual camera 14 and the inclination (direction) of the virtual camera 14 in the virtual space 11. The control module 510 defines the field-of-view region 15 depending on an inclination of the head of the user 5 wearing the HMD 120 and the position of the virtual camera 14. The rendering module 520 generates the field-of-view region 17 to be displayed on the monitor 130 based on the determined field-of-view region 15. The communication control module 540 outputs the field-of-view region 17 generated by the rendering module 520 to the HMD 120.

The control module 510, which has detected an utterance of the user 5 using the microphone 170 from the HMD 120, identifies the computer 200 to which voice data corresponding to the utterance is to be transmitted. The voice data is transmitted to the computer 200 identified by the control module 510. The control module 510, which has received voice data from the computer 200 of another user via the network 2, outputs audio information (utterances) corresponding to the voice data from the speaker 180.

The memory module 530 holds data to be used to provide the virtual space 11 to the user 5 by the computer 200. In at least one aspect, the memory module 530 stores space information, object information, and user information.

The space information stores one or more templates defined to provide the virtual space 11.

The object information stores a plurality of panorama images 13 forming the virtual space 11 and object data for arranging objects in the virtual space 11. In at least one embodiment, the panorama image 13 contains a still image and/or a moving image. In at least one embodiment, the panorama image 13 contains an image in a non-real space and/or an image in the real space. An example of the image in a non-real space is an image generated by computer graphics.

The user information stores a user ID for identifying the user 5. The user ID is, for example, an internet protocol (IP) address or a media access control (MAC) address set to the computer 200 used by the user. In at least one aspect, the user ID is set by the user. The user information stores, for example, a program for causing the computer 200 to function as the control device of the HMD system 100.

The data and programs stored in the memory module 530 are input by the user 5 of the HMD 120. Alternatively, the processor 210 downloads the programs or data from a computer (e.g., server 600) that is managed by a business operator providing the content, and stores the downloaded programs or data in the memory module 530.

In at least one embodiment, the communication control module 540 communicates to/from the server 600 or other information communication devices via the network 2.

In at least one aspect, the control module 510 and the rendering module 520 are implemented with use of, for example, Unity® provided by Unity Technologies. In at least one aspect, the control module 510 and the rendering module 520 are implemented by combining the circuit elements for implementing each step of processing.

The processing performed in the computer 200 is implemented by hardware and software executed by the processor 410. In at least one embodiment, the software is stored in advance on a hard disk or other memory module 530. In at least one embodiment, the software is stored on a CD-ROM or other computer-readable non-volatile data recording media, and distributed as a program product. In at least one embodiment, the software may is provided as a program product that is downloadable by an information provider connected to the Internet or other networks. Such software is read from the data recording medium by an optical disc drive device or other data reading devices, or is downloaded from the server 600 or other computers via the communication control module 540 and then temporarily stored in a storage module. The software is read from the storage module by the processor 210, and is stored in a RAM in a format of an executable program. The processor 210 executes the program.

[Control Structure of HMD System]

Figure 11:
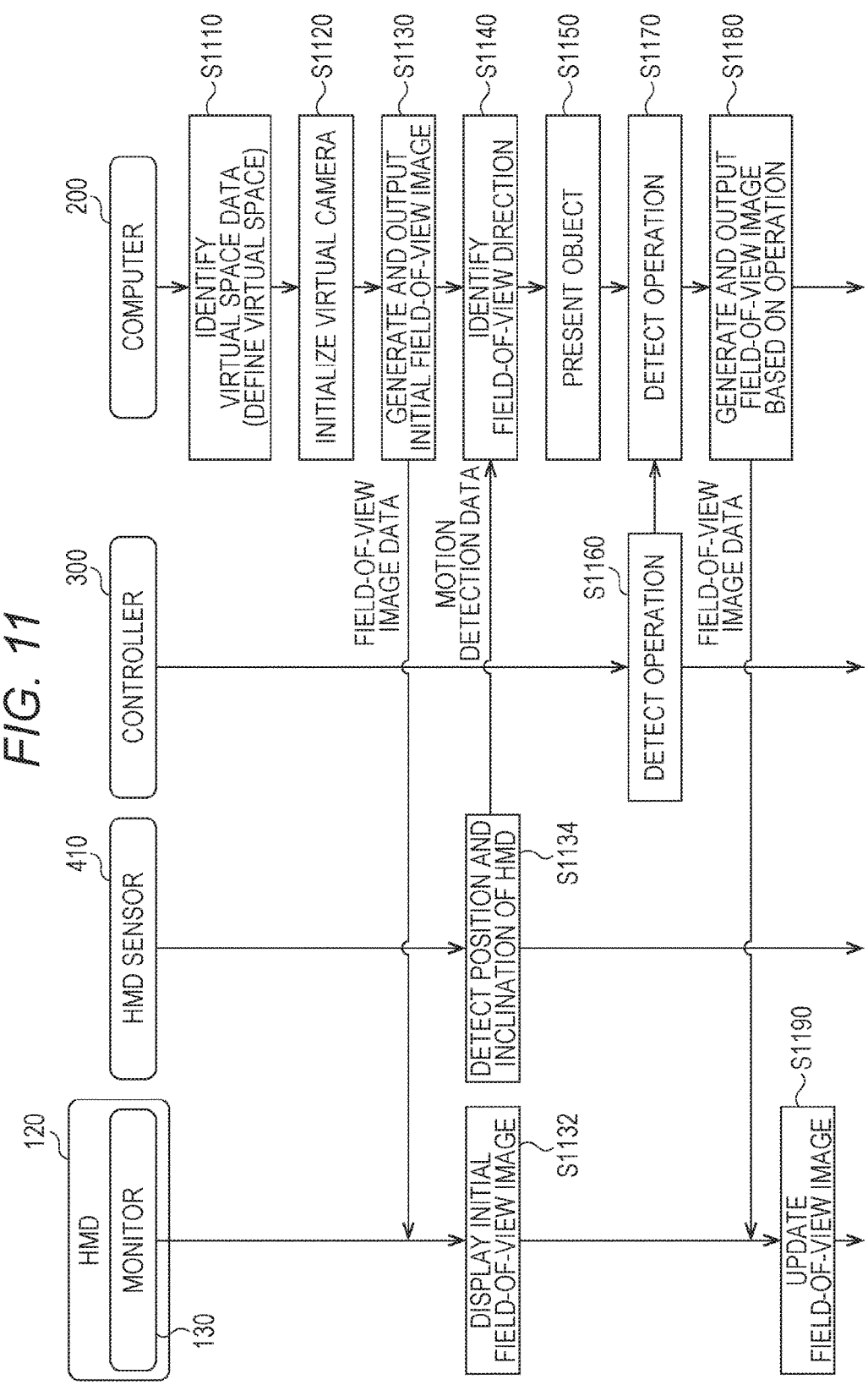
FIG. 11 A sequence chart of processing to be executed by a system including an HMD set according to at least one embodiment of this disclosure.

With reference to FIG. 11, the control structure of the HMD set 110 is described. FIG. 11 is a sequence chart of processing to be executed by the system 100 according to at least one embodiment of this disclosure.

In FIG. 11, in Step S1110, the processor 210 of the computer 200 serves as the control module 510 to identify virtual space data and define the virtual space 11.

In Step S1120, the processor 210 initializes the virtual camera 14. For example, in a work area of the memory, the processor 210 arranges the virtual camera 14 at the center 12 defined in advance in the virtual space 11, and matches the line of sight of the virtual camera 14 with the direction in which the user 5 faces.

In Step S1130, the processor 210 serves as the rendering module 520 to generate field-of-view image data for displaying an initial field-of-view image. The generated field-of-view image data is output to the HMD 120 by the communication control module 540.

In Step S1132, the monitor 130 of the HMD 120 displays the field-of-view image based on the field-of-view image data received from the computer 200. The user 5 wearing the HMD 120 is able to recognize the virtual space 11 through visual recognition of the field-of-view image.

In Step S1134, the HMD sensor 410 detects the position and the inclination of the HMD 120 based on a plurality of infrared rays emitted from the HMD 120. The detection results are output to the computer 200 as motion detection data.

In Step S1140, the processor 210 identifies a field-of-view direction of the user 5 wearing the HMD 120 based on the position and inclination contained in the motion detection data of the HMD 120.

In Step S1150, the processor 210 executes an application program, and arranges an object in the virtual space 11 based on a command contained in the application program.

In Step S1160, the controller 300 detects an operation by the user 5 based on a signal output from the motion sensor 420, and outputs detection data representing the detected operation to the computer 200. In at least one aspect, an operation of the controller 300 by the user 5 is detected based on an image from a camera arranged around the user 5.

In Step S1170, the processor 210 detects an operation of the controller 300 by the user 5 based on the detection data acquired from the controller 300.

In Step S1180, the processor 210 generates field-of-view image data based on the operation of the controller 300 by the user 5. The communication control module 540 outputs the generated field-of-view image data to the HMD 120.

In Step S1190, the HMD 120 updates a field-of-view image based on the received field-of-view image data, and displays the updated field-of-view image on the monitor 130.

[Avatar Object]

Figure 12A:
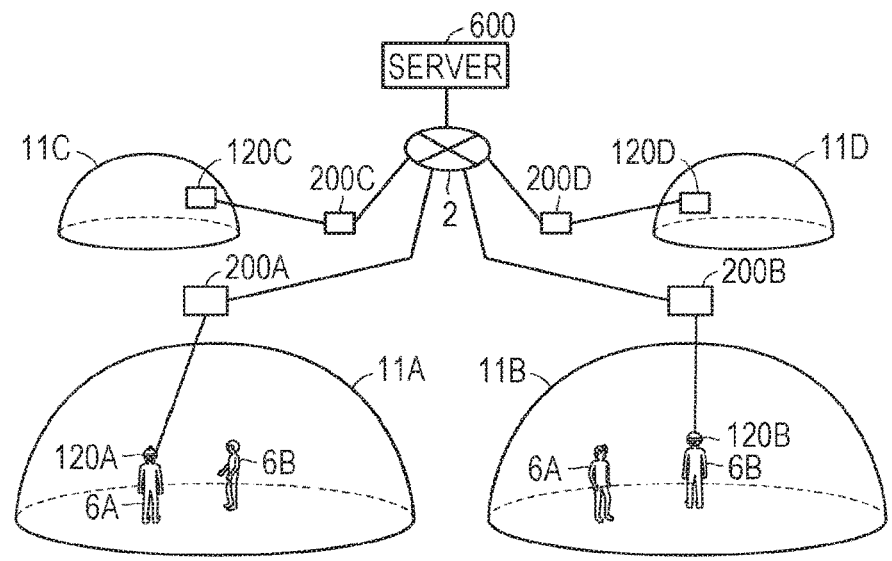
FIG. 12A A schematic diagram of HMD systems of several users sharing the virtual space interact using a network according to at least one embodiment of this disclosure.
Figure 12B:
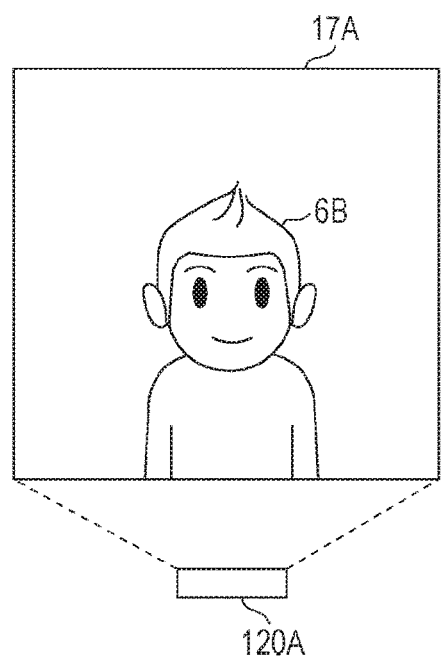
FIG. 12B A diagram of a field of view image of a HMD according to at least one embodiment of this disclosure.

With reference to FIG. 12A and FIG. 12B, an avatar object according to at least one embodiment is described. FIG. 12 and FIG. 12B are diagrams of avatar objects of respective users 5 of the HMD sets 110A and 110B. In the following, the user of the HMD set 110A, the user of the HMD set 110B, the user of the HMD set 110C, and the user of the HMD set 110D are referred to as "user 5A", "user 5B", "user 5C", and "user 5D", respectively. A reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively. For example, the HMD 120A is included in the HMD set 110A.

FIG. 12A is a schematic diagram of HMD systems of several users sharing the virtual space interact using a network according to at least one embodiment of this disclosure. Each HMD 120 provides the user 5 with the virtual space 11. Computers 200A to 200D provide the users 5A to 5D with virtual spaces 11A to 11D via HMDs 120A to 120D, respectively. In FIG. 12A, the virtual space 11A and the virtual space 11B are formed by the same data. In other words, the computer 200A and the computer 200B share the same virtual space. An avatar object 6A of the user 5A and an avatar object 6B of the user 5B are present in the virtual space 11A and the virtual space 11B. The avatar object 6A in the virtual space 11A and the avatar object 6B in the virtual space 11B each wear the HMD 120. However, the inclusion of the HMD 120A and HMD 120B is only for the sake of simplicity of description, and the avatars do not wear the HMD 120A and HMD 120B in the virtual spaces 11A and 11B, respectively.

In at least one aspect, the processor 210A arranges a virtual camera 14A for photographing a field-of-view region 17A of the user 5A at the position of eyes of the avatar object 6A.

FIG. 12B is a diagram of a field of view of a HMD according to at least one embodiment of this disclosure. FIG. 12 (B) corresponds to the field-of-view region 17A of the user 5A in FIG. 12A. The field-of-view region 17A is an image displayed on a monitor 130A of the HMD 120A. This field-of-view region 17A is an image generated by the virtual camera 14A. The avatar object 6B of the user 5B is displayed in the field-of-view region 17A. Although not included in FIG. 12B, the avatar object 6A of the user 5A is displayed in the field-of-view image of the user 5B.

In the arrangement in FIG. 12B, the user 5A can communicate to/from the user 5B via the virtual space 11A through conversation. More specifically, voices of the user 5A acquired by a microphone 170A are transmitted to the HMD 120B of the user 5B via the server 600 and output from a speaker 180B provided on the HMD 120B. Voices of the user 5B are transmitted to the HMD 120A of the user 5A via the server 600, and output from a speaker 180A provided on the HMD 120A.

The processor 210A translates an operation by the user 5B (operation of HMD 120B and operation of controller 300B) in the avatar object 6B arranged in the virtual space 11A. With this, the user 5A is able to recognize the operation by the user 5B through the avatar object 6B.

FIG. 13 is a sequence chart of processing to be executed by the system 100 according to at least one embodiment of this disclosure. In FIG. 13, although the HMD set 110D is not included, the HMD set 110D operates in a similar manner as the HMD sets 110A, 110B, and 110C. Also in the following description, a reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively.

In Step S1310A, the processor 210A of the HMD set 110A acquires avatar information for determining a motion of the avatar object 6A in the virtual space 11A. This avatar information contains information on an avatar such as motion information, face tracking data, and sound data. The motion information contains, for example, information on a temporal change in position and inclination of the HMD 120A and information on a motion of the hand of the user 5A, which is detected by, for example, a motion sensor 420A. An example of the face tracking data is data identifying the position and size of each part of the face of the user 5A. Another example of the face tracking data is data representing motions of parts forming the face of the user 5A and line-of-sight data. An example of the sound data is data representing sounds of the user 5A acquired by the microphone 170A of the HMD 120A. In at least one embodiment, the avatar information contains information identifying the avatar object 6A or the user 5A associated with the avatar object 6A or information identifying the virtual space 11A accommodating the avatar object 6A. An example of the information identifying the avatar object 6A or the user 5A is a user ID. An example of the information identifying the virtual space 11A accommodating the avatar object 6A is a room ID. The processor 210A transmits the avatar information acquired as described above to the server 600 via the network 2.

In Step S1310B, the processor 210B of the HMD set 110B acquires avatar information for determining a motion of the avatar object 6B in the virtual space 11B, and transmits the avatar information to the server 600, similarly to the processing of Step S1310A. Similarly, in Step S1310C, the processor 210C of the HMD set 110C acquires avatar information for determining a motion of the avatar object 6C in the virtual space 11C, and transmits the avatar information to the server 600.

In Step S1320, the server 600 temporarily stores pieces of player information received from the HMD set 110A, the HMD set 110B, and the HMD set 110C, respectively. The server 600 integrates pieces of avatar information of all the users (in this example, users 5A to 5C) associated with the common virtual space 11 based on, for example, the user IDs and room IDs contained in respective pieces of avatar information. Then, the server 600 transmits the integrated pieces of avatar information to all the users associated with the virtual space 11 at a timing determined in advance. In this manner, synchronization processing is executed. Such synchronization processing enables the HMD set 110A, the HMD set 110B, and the HMD 120C to share mutual avatar information at substantially the same timing.

Next, the HMD sets 110A to 110C execute processing of Step S1330A to Step S1330C, respectively, based on the integrated pieces of avatar information transmitted from the server 600 to the HMD sets 110A to 110C. The processing of Step S1330A corresponds to the processing of Step S1180 of FIG. 11.

In Step S1330A, the processor 210A of the HMD set 110A updates information on the avatar object 6B and the avatar object 6C of the other users 5B and 5C in the virtual space 11A. Specifically, the processor 210A updates, for example, the position and direction of the avatar object 6B in the virtual space 11 based on motion information contained in the avatar information transmitted from the HMD set 110B. For example, the processor 210A updates the information (e.g., position and direction) on the avatar object 6B contained in the object information stored in the memory module 530. Similarly, the processor 210A updates the information (e.g., position and direction) on the avatar object 6C in the virtual space 11 based on motion information contained in the avatar information transmitted from the HMD set 110C.

In Step S1330B, similarly to the processing of Step S1330A, the processor 210B of the HMD set 110B updates information on the avatar object 6A and the avatar object 6C of the users 5A and 5C in the virtual space 11B. Similarly, in Step S1330C, the processor 210C of the HMD set 110C updates information on the avatar object 6A and the avatar object 6B of the users 5A and 5B in the virtual space 11C.

Figure 14:
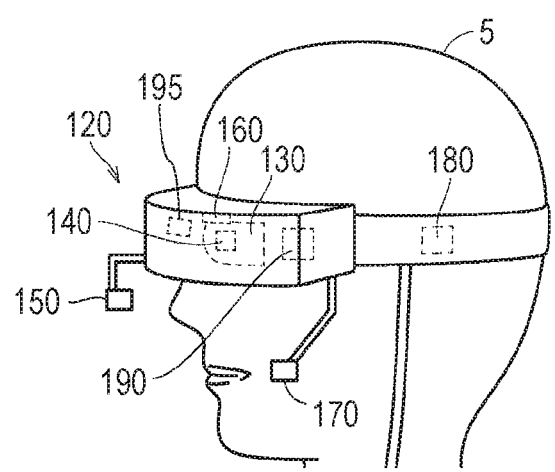
FIG. 14 A diagram of an exemplary configuration of an HMD set according to at least one embodiment of this disclosure.

FIG. 14 is a diagram of a configuration of the HMD set 110 according to at least one embodiment of this disclosure. In FIG. 14, the HMD set 110 further includes a wearing sensor 195 in addition to the above-mentioned components. The wearing sensor 195 is configured to generate event information for indicating whether or not the user 5 is wearing the HMD 120. Specifically, when the user 5 has removed the HMD 120 (when state of HMD 120 has transitioned from worn state to unworn state), the wearing sensor 195 generates and transmits event information to the computer 200. When the user 5 has put on the HMD 120 (when state of HMD 120 has transitioned from unworn state to worn state), the wearing sensor 195 generates event information and transmits the event information to the computer 200. The configuration of the wearing sensor 195 is not particularly limited. For example, in at least one embodiment, the elastic force of a spring installed in the HMD 120 changes when the user 5 has put on the HMD 120. In this case, the wearing sensor 195 may generate event information based on the change in elastic force of this spring. Alternatively, in at least one embodiment, a current flowing between two pads to be in contact with a part (nose) of the body and installed in the HMD 120 changes when the user 5 has put on the HMD 120. In this case, the wearing sensor 195 may generate event information based on the change in current flowing between those two pads.

Next, an example of processing of synchronizing motions of the avatar objects 6A and 6B between the HMD set 110A and the HMD set 110B is described with reference to FIG. 1, FIG. 15A, FIG. 15B, and FIG. 16. FIG. 15A is a diagram of the virtual space 11A to be provided to the user 5A according to at least one embodiment of this disclosure. FIG. 15B is a diagram of the virtual space 11B to be provided to the user 5B according to at least one embodiment of this disclosure. FIG. 16 is a sequence diagram of processing of synchronizing motions of the avatar objects 6A and 6B between the HMD set 110A and the HMD set 110B according to at least one embodiment of this disclosure. In at least one embodiment of this description, in FIG. 15A and FIG. 15B, the avatar object 6A (first avatar) associated with the HMD set 110A (user 5A) and the avatar object 6B (second avatar) associated with the HMD set 110B (user 5B) share the same virtual space. In other words, the user 5A and the user 5B share one virtual space via the network 2. In at least one embodiment of this disclosure, the avatar object has the same meaning as the avatar.

In FIG. 15A, the virtual space 11A of the user 5A includes the avatar object 6A and the avatar object 6B. The avatar object 6A is operated by the user 5A and moves in association with a motion of the user 5A. The avatar object 6A includes: a left hand (part of virtual body of avatar object 6A), which moves in association with a motion (motion of left hand of user 5A) of a controller 300L of the HMD set 110A; a right hand, which moves in association with a motion (motion of right hand of user 5A) of a controller 300R of the HMD set 110A; and a face, whose facial expression moves in association with a facial expression of the user 5A. The face of the avatar object 6A includes a plurality of face parts (e.g., eyes, eyebrows, and mouth). The avatar object 6B is operated by the user 5B and moves in association with a motion of the user 5B. The avatar object 6B includes: a left hand, which moves in association with a motion of a controller 300L of the HMD set 110B indicating a motion of a left hand of the user 5B; a right hand, which moves in association with a motion of a controller 300R of the HMD set 110B indicating a motion of a right hand of the user 5B; and a face, whose facial expression moves in association with a facial expression of the user 5B. The face of the avatar object 6B includes a plurality of face parts (e.g., eyes, eyebrows, and mouth).

In at least one embodiment, the avatar object 6A is not visible in the virtual space 11A provided to the user 5A. In this case, the avatar object 6A arranged in the virtual space 11A includes at least the virtual camera 14 that moves in association with the motion of the HMD 120 of the HMD set 110A.

The positions of the avatar objects 6A and 6B may also be identified based on the positions of the HMDs 120 of the HMD sets 110A and 110B, respectively. Similarly, the directions of the faces of the avatar objects 6A and 6B may also be identified based on the inclinations of the HMDs 120 of the HMD sets 110A and 110B, respectively. The motions of the hands of the avatar objects 6A and 6B may also be identified based on motions of the controllers 300 of the HMD sets 110A and 110B, respectively. In particular, the motions of the left hands of the avatar objects 6A and 6B may be identified based on the motions of the controllers 300L of the HMD sets 110A and 110B, respectively, and the motions of the right hands of the avatar objects 6A and 6B may be identified based on the motions of the controllers 300R of the HMD sets 110A and 110B, respectively. The facial expressions of the avatar objects 6A and 6B may also be identified based on the facial expressions (states) of the users 5A and 5B, respectively.

Corresponding virtual cameras 14 (FIG. 4) may be arranged at the eye of each of the avatar objects 6A and 6B. In particular, a left eye virtual camera may be arranged at the left eye of each of the avatar objects 6A and 6B, and a right eye virtual camera may be arranged at the right eye of each of the avatar objects 6A and 6B. In at least one embodiment, corresponding virtual cameras 14 are arranged at the eye of each of the avatar objects 6A and 6B. As a result, in at least one embodiment, the field-of-view region 15 of the avatar object 6A matches the field-of-view region 15 of the virtual camera 14 arranged at the avatar object 6A (see FIG. 4). Similarly, in at least one embodiment, the field-of-view region 15 of the avatar object 6B matches the field-of-view region 15 of the virtual camera 14 arranged at the avatar object 6B (see FIG. 4).

In FIG. 15B, the virtual space 11B of the user 5B includes the avatar object 6A and the avatar object 6B. The position of each of the avatar objects 6A and 6B in the virtual space 11A may correspond to the position of each of the avatar objects 6A and 6B in the virtual space 11B.

In at least one embodiment, the avatar object 6B is not visible in the virtual space 11B provided to the user 5B. In this case, the avatar object 6B arranged in the virtual space 11B includes at least the virtual camera 14 that moves in association with the motion of the HMD 120 of the HMD set 110B.

Next, in FIG. 16, in Step S1610, the processor 210 of the HMD set 110A generates voice data on the user 5A. For example, when the user 5A has input a voice into the microphone 170 (voice input device) of the HMD set 110A, the microphone 170 generates voice data representing the input voice. After that, the microphone 170 transmits the generated voice data to the processor 210 via the input/output interface 240.

Next, in Step S1611, the processor 210 of the HMD set 110A generates control information on the avatar object 6A, and then transmits the generated control information on the avatar object 6A and the voice data representing the voice of the user 5A (voice data on user 5A) to the server 600. After that, the processor 610 of the server 600 receives the control information on the avatar object 6A and the voice data on the user 5A from the HMD set 110A (Step S1612).

In this case, the control information on the avatar object 6A is information required for controlling the motion of the avatar object 6A. The control information on the avatar object 6A may contain information (position information) on a position of the avatar object 6A, information (face direction position) on a direction of the face of the avatar object 6A, information (hand information) on states of the hands (left hand and right hand) of the avatar object 6A, and information (face information) on the facial expression of the avatar object 6A.

The face information on the avatar object 6A contains information on states of the plurality of face parts. The information on states of the plurality of face parts contains information (eye information) on states of the eyes (e.g., shape of sclera and position of pupil and iris with respect to sclera) of the avatar object 6A, information (eyebrow information) on information of the eyebrows (e.g., positions and shapes of eyebrows) of the avatar object 6A, and information (e.g., mouth information) on states of the mouth (e.g., position and shape of mouth) of the avatar object 6A.

More specifically, the eye information on the avatar object 6A contains information on a state of a left eye of the avatar object 6A and information on a state of a right eye of the avatar object 6A. The eyebrow information on the avatar object 6A contains information on a state of a left eyebrow of the avatar object 6A and information on a state of a right eyebrow of the avatar object 6A.

The processor 210 of the HMD set 110A acquires an image representing the eyes (left eye and right eye) and eyebrows (left eyebrow and right eyebrow) of the user 5A from the second camera 160 mounted on the HMD 120, and identifies the states of the eyes (left eye and right eye) and eyebrows (left eyebrow and right eyebrow) of the user 5A based on the acquired image and a predetermined image processing algorithm. Next, the processor 210 generates information on the states of the eyes (left eye and right eye) of the avatar object 6A and information on the states of the eyebrows (left eyebrow and right eyebrow) of the avatar object 6A based on the identified states of the eyes and eyebrows of the user 5A.

Similarly, the processor 210 of the HMD set 110A acquires an image representing the mouth and surroundings of the mouth of the user 5A from the first camera 150, and identifies the state of the mouth of the user 5A based on the acquired image and a predetermined image processing algorithm. Next, the processor 210 generates information on the state of the mouth of the avatar object 6A based on the identified state of the mouth of the user 5A.

In this manner, the processor 210 of the HMD set 110A can generate the eye information on the avatar object 6A corresponding to the eyes of the user 5A, the eyebrow information on the avatar object 6A corresponding to the eyebrows of the user 5A, and the mouth information on the avatar object 6A corresponding to the mouth of the user 5A.

The processor 210 may identify the facial expression (e.g., smile) of the user 5A from among a plurality of types of facial expressions (e.g., smile, sorrow, poker face, anger, surprise, and confusion) stored in the storage 230 or the memory 220 based on an image photographed by the second camera 160, an image photographed by the first camera 150, and a predetermined image processing algorithm. After that, the processor 210 can generate face information on the facial expression (e.g., smile) of the avatar object 6A based on the identified facial expression of the user 5A. In this case, the storage 230 may store facial expression data containing the plurality of types of facial expressions of the avatar object 6A and a plurality of pieces of face information on the avatar object 6A associated with the plurality of types of facial expressions, respectively.

For example, when the processor 210 identifies the facial expression of the avatar object 6A as a smile, the processor 210 acquires the face information representing the smile of the avatar object 6A based on the facial expression (smile) and facial expression data on the face of the avatar object 6A. The facial expression data representing the smile of the avatar object 6A contains the eye information, eyebrow information, and mouth information on the avatar object 6A at a time when the facial expression of the avatar object 6A is a smile.

Next, in Step S1613, the processor 210 of the HMD set 110B generates control information on the avatar object 6B, and then transmits the generated control information on the avatar object 6B to the server 600. After that, the processor 610 of the server 600 receives the control information on the avatar object 6B from the HMD set 110B (Step S1614).

In this case, the control information on the avatar object 6B is information required for controlling the motion of the avatar object 6B. The control information on the avatar object 6B may contain information (position information) on a position of the avatar object 6B, information (face direction position) on a direction of the face of the avatar object 6B, information (hand information) on states of the hands (left hand and right hand) of the avatar object 6B, and information (face information) on the facial expression of the avatar object 6B.

The face information on the avatar object 6B contains information on states of the plurality of face parts. The information on states of the plurality of face parts contains information (eye information) on states of the eyes (e.g., shape of sclera and position of pupil and iris with respect to sclera) of the avatar object 6B, information (eyebrow information) on information of the eyebrows (e.g., positions and shapes of eyebrows) of the avatar object 6B, and information (e.g., mouth information) on states of the mouth (e.g., position and shape of mouth) of the avatar object 6B. The method of acquiring the face information on the avatar object 6B is similar to the method of acquiring the face information on the avatar object 6A.

Next, the server 600 transmits control information on the avatar object 6B to the HMD set 110A (Step S1615), and transmits the control information on the avatar object 6A and the voice data on the user 5A to the HMD set 110B (Step S1619). After that, in Step S1616, the processor 210 of the HMD set 110A receives the control information on the avatar object 6B, and then updates the states of the avatar objects 6A and 6B to update the virtual space data representing the virtual space 11A (see FIG. 15A) based on the control information on the avatar objects 6A and 6B (Step S1617).

Specifically, the processor 210 of the HMD set 110A updates the positions of the avatar objects 6A and 6B based on the position information on the avatar objects 6A and 6B. The processor 210 updates the directions of the faces of the avatar objects 6A and 6B based on face direction information on the avatar objects 6A and 6B. The processor 210 updates the hands of the avatar objects 6A and 6B based on the hand information on the avatar objects 6A and 6B. The processor 210 updates the facial expressions of the avatar objects 6A and 6B based on the face information on the avatar objects 6A and 6B. In this manner, the virtual space data representing the virtual space 11A including the updated avatar objects 6A and 6B is updated.

After that, the processor 210 of the HMD set 110A identifies the field-of-view region 15 of the avatar object 6A (virtual camera 14) based on the position and inclination of the HMD 120, and then updates the field-of-view image displayed on the HMD 120 based on the updated virtual space data and the field-of-view region 15 of the avatar object 6A (Step S1618).

Meanwhile, in Step S1620, the processor 210 of the HMD set 110B receives the control information on the avatar object 6A and the voice data on the user 5A, and then updates the states of the avatar objects 6A and 6B to update the virtual space data representing the virtual space 11B (see FIG. 15B) based on the control information on the avatar objects 6A and 6B (Step S1621).

Specifically, the processor 210 of the HMD set 110B updates the positions of the avatar objects 6A and 6B based on the position information on the avatar objects 6A and 6B. The processor 210 updates the directions of the faces of the avatar objects 6A and 6B based on face direction information on the avatar objects 6A and 6B. The processor 210 updates the hands of the avatar objects 6A and 6B based on the hand information on the avatar objects 6A and 6B. The processor 210 updates the facial expressions of the avatar objects 6A and 6B based on the face information on the avatar objects 6A and 6B. In this manner, virtual space data representing the virtual space including the updated avatar objects 6A and 6B is updated.

After that, the processor 210 of the HMD set 110B identifies the field-of-view region 15 of the avatar object 6B (virtual camera 14) based on the position and inclination of the HMD 120, and then updates the field-of-view image displayed on the HMD 120 based on the updated virtual space data and the field-of-view region 15 of the avatar object 6B (Step S1622).

After that, the processor 210 of the HMD set 110B processes the voice data on the user 5A based on the received voice data on the user 5A, the information on the position of the avatar object 6A included in the control information on the avatar object 6A, the information on the position of the avatar object 6B, and a predetermined voice processing algorithm. After that, the processor 210 transmits the processed voice data to the speaker 180 (voice output device), and the speaker 180 outputs the voice of the user 5A based on the processed voice data (Step S1623). In this way, a voice chat (VR chat) can be implemented between users (between avatars) in the virtual space.

In at least one embodiment of this disclosure, after the HMD sets 110A and 110B have transmitted the control information on the avatar object 6A and the control information on the avatar object 6B, respectively, to the server 600, the server 600 transmits the control information on the avatar object 6A to the HMD set 110B, and transmits the control information on the avatar object 6B to the HMD set 110A. In this way, the motion of each of the avatar objects 6A and 6B can be synchronized between the HMD set 110A and the HMD set 110B.

Figure 17:
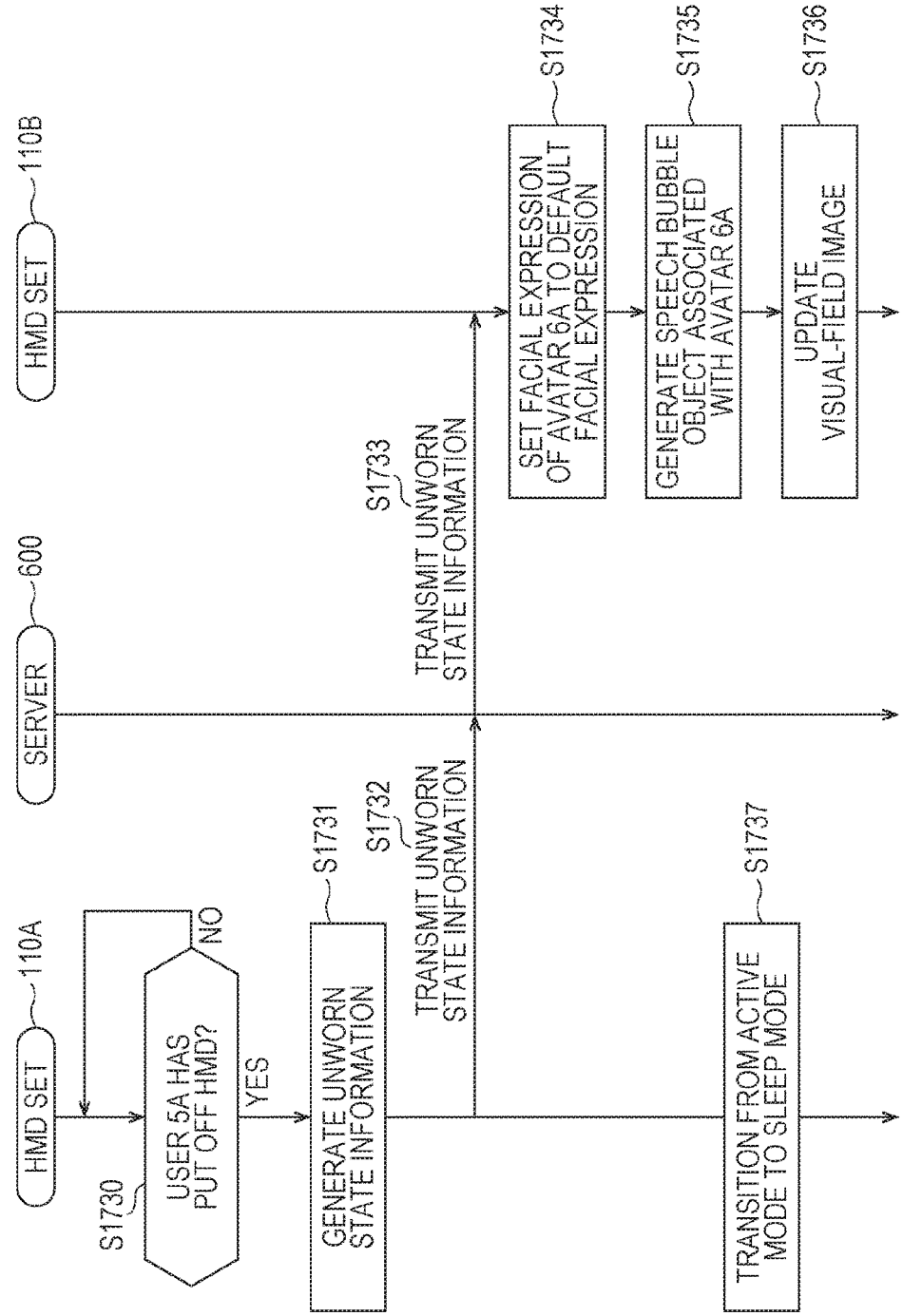
FIG. 17 A flowchart of an information processing method in a case where the user has removed the HMD according to at least one embodiment of this disclosure.
Figure 19:
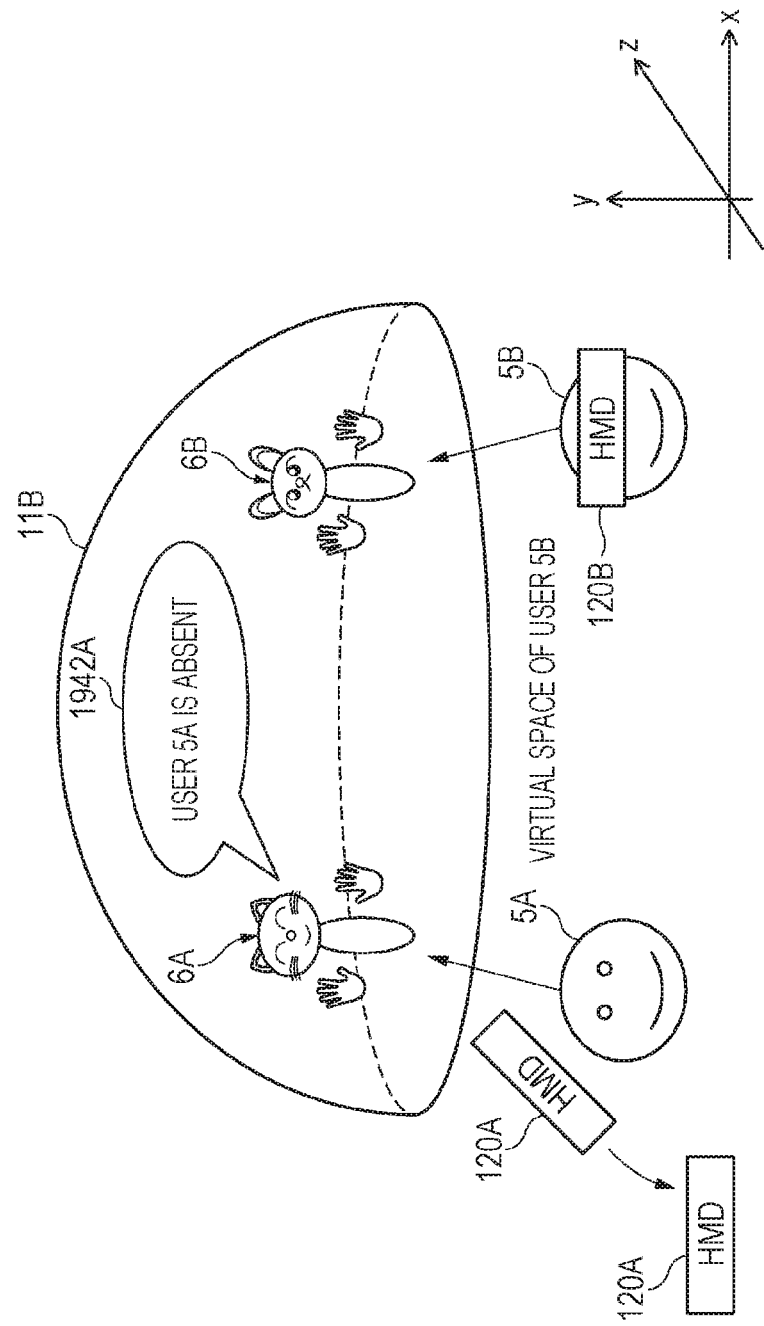
FIG. 19 A diagram of a virtual space to be provided to the user according to at least one embodiment of this disclosure.

Next, referring mainly to FIG. 17 and FIG. 19, a description is given of an information processing method in a case where the user 5A has removed the HMD 120 according to at least one embodiment of this disclosure. FIG. 17 is a flowchart of an information processing method in a case where the user 5A has removed the HMD 120 according to at least one embodiment of this disclosure. FIG. 19 is a diagram of an example of the virtual space 11B to be provided to the user 5B, which is used to describe the information processing method according to at least one embodiment of this disclosure. In the flowchart of FIG. 17, processing of the processor 210 of the HMD set 110A transmitting the control information on the avatar object 6A to the server 600 or processing of the processor 210 of the HMD set 110B transmitting the control information on the avatar object 6B to the server 600 are omitted for the sake of simplicity of description.

In at least one embodiment of this disclosure, in FIG. 19, in at least one embodiment, the avatar object 6A and the avatar object 6B share the same virtual space. In other words, in at least one embodiment, the users 5A and 5B share one virtual space via the network 2.

The virtual space 11B of the user 5B includes the avatar object 6A and the avatar object 6B. The processor 210 of the HMD set 110B updates virtual space data representing the virtual space 11B. In this description, for the sake of simplicity of description, illustration of the virtual space 11A provided to the avatar object 6A is omitted.

With reference to FIG. 17, in Step S1730, the processor 210 of the HMD set 110A determines whether or not the user 5A has removed the HMD 120. In this determination, the processor 210 may determine whether or not the user 5A has removed the HMD 120 based on inclination information on the HMD 120, which is transmitted from the sensor 190, or the event information transmitted from the wearing sensor 195. The sensor 190 and the wearing sensor 195 function as sensors configured to detect whether or not the HMD 120 is worn.

Figure 18B:
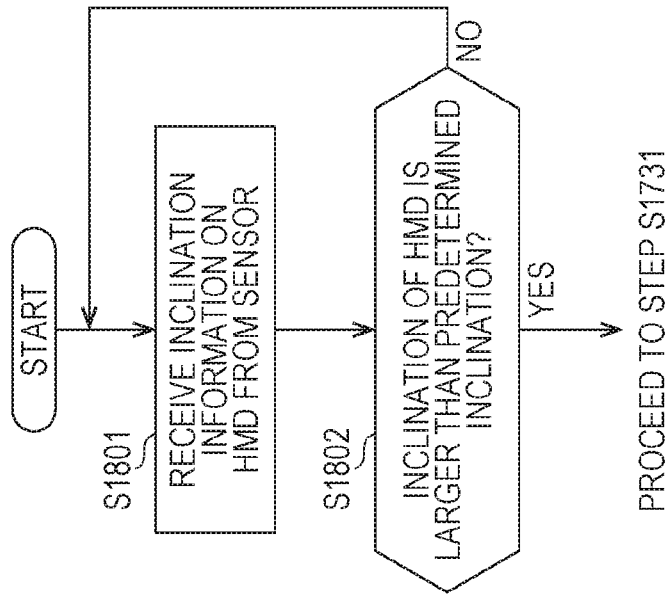
FIG. 18B A flowchart of processing of determining whether or not the user has removed the HMD through use of a wearing sensor according to at least one embodiment of this disclosure.
Figure 18A:
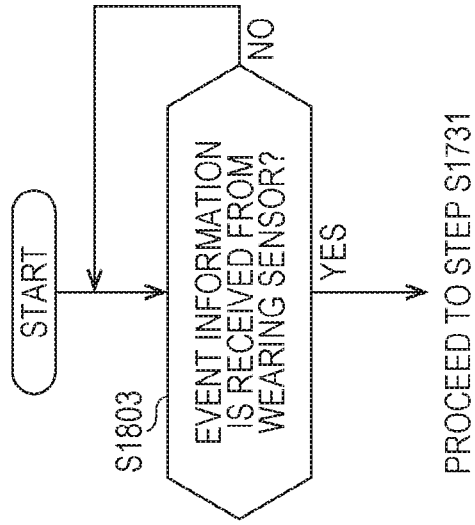
FIG. 18A A flowchart of processing of determining whether or not the user has removed the HMD through use of an HMD sensor according to at least one embodiment of this disclosure.

With reference to FIG. 18A, a description is given of processing of determining whether or not the user 5A has removed the HMD 120 through use of the sensor 190. FIG. 18A is a flowchart of processing of determining whether or not the user 5A has removed the HMD 120 through use of the sensor 190 according to at least one embodiment of this disclosure. In FIG. 18A, the processor 210 receives inclination information indicating the inclination (roll angle, yaw angle, and pitch angle) of the HMD 120 from the sensor 190 (Step S1801). Next, the processor 210 determines whether or not the inclination of the HMD 120 is larger than a predetermined inclination based on the received inclination information (Step S1802). The predetermined inclination may be appropriately set by the user. In at least one embodiment, the inclination of the HMD 120 does not become larger than the predetermined inclination while the user 5A is wearing the HMD 120. In other words, the inclination of the HMD 120 is equal to or smaller than the predetermined inclination while the user 5A is wearing the HMD 120, whereas the HMD 120 is greatly inclined when the user 5A has removed the HMD 120, with the result that the inclination of the HMD 120 may exceed the predetermined inclination. The predetermined inclination is set from such a perspective.

For example, when the processor 210 determines that a pitch angle θ of the HMD 120, which is an example of the inclination of the HMD 120, is larger than a predetermined angle θth (YES in Step S1802), the processor 210 identifies removal of the HMD 120 by the user 5A (i.e., fact that user 5A is not wearing HMD 120), and executes the processing of Step S1731. On the other hand, when the processor 210 determines that the pitch angle θ of the HMD 120 is equal to or smaller than the predetermined angle θth (NO in Step S1802), the processor 210 identifies the fact that the user 5A is wearing the HMD 120, and waits until reception of the inclination information on the HMD 120 from the sensor 190.

Next, with reference to FIG. 18B, a description is given of processing of determining whether or not the user 5B has removed the HMD 120 through use of the wearing sensor 195. FIG. 18B is a flowchart of processing of determining whether or not the user 5A has removed the HMD 120 through use of the wearing sensor 195 according to at least one embodiment of this disclosure. In FIG. 18B, the processor 210 determines whether or not the processor 210 has received the event information from the wearing sensor 195 (Step S1803). The event information transmitted from the wearing sensor 195 is information indicating the fact that the state of the HMD 120 in the HMD set 110A has changed between the worn state and the unworn state. For example, when the user 5A has removed the HMD 120 (when state of HMD 120 has transitioned from worn state to unworn state), the wearing sensor 195 outputs the event information. When the user 5A has put on the HMD 120 (when state of HMD 120 has transitioned from unworn state to worn state), the wearing sensor 195 outputs the event information.

When the processor 210 determines that the processor 210 has received the event information from the wearing sensor 195 (YES in Step S1803), the processor 210 identifies removal of the HMD 120 by the user 5A (that is, fact that user 5A is not wearing HMD 120), and executes the processing of Step S1731. On the other hand, when the processor 210 determines that the processor 210 has not received the event information from the wearing sensor 195 (NO in Step S1803), the processor 210 identifies the fact that the user 5A is wearing the HMD 120, and waits until reception of the event information from the wearing sensor 195.

Next, referring back to FIG. 17, when the processor 210 determines that the user 5A has removed the HMD 120 (i.e., fact that user 5A is not wearing HMD 120) (YES in Step S1730), the processor 210 generates information (unworn state information) indicating the fact that the user 5A is not wearing the HMD 120 (Step S1731). After that, the processor 210 transmits the unworn state information to the server 600 via the network 2 (Step S1732).

Next, after the server 600 receives the unworn state information from the HMD set 110A, the server 600 transmits the unworn state information to the HMD set 110B via the network 2 (Step S1733). After that, the processor 210 of the HMD set 110B receives the unworn state information from the server 600, and then sets the facial expression of the avatar object 6A arranged in the virtual space 11B to a default facial expression (namely, facial expression in default setting) (Step S1734). The default expression of the avatar object 6A refers to the facial expression of the avatar object 6A in an initial state before the facial expression of the avatar object 6A starts to be updated based on detected facial features of user 5A. When the default facial expression is a smile, in FIG. 19, the facial expression of the avatar object 6A is set to a smile. The processor 210 updates the motion (including facial expression of avatar object 6B) of the avatar object 6B based on the control information on the avatar object 6B.

In Step S1734, the processor 210 may set the facial expression of the avatar object 6A to the one selected in advance by the user 5A as a mode of representation of the fact that the user 5A is not wearing the HMD 120. In this case, information on the facial expression of the avatar object 6A selected by the user 5A may be transmitted from the HMD set 110A to the HMD set 110B, and then stored into the storage 230 of the HMD set 110B in advance.

Next, in FIG. 19, the processor 210 generates a speech bubble object 1942A associated with the avatar object 6A in the virtual space 11B. The speech bubble object 1942A displays information (e.g., "user 5A is absent") indicating the fact that the user 5A is not wearing the HMD 120.

Figure 20:
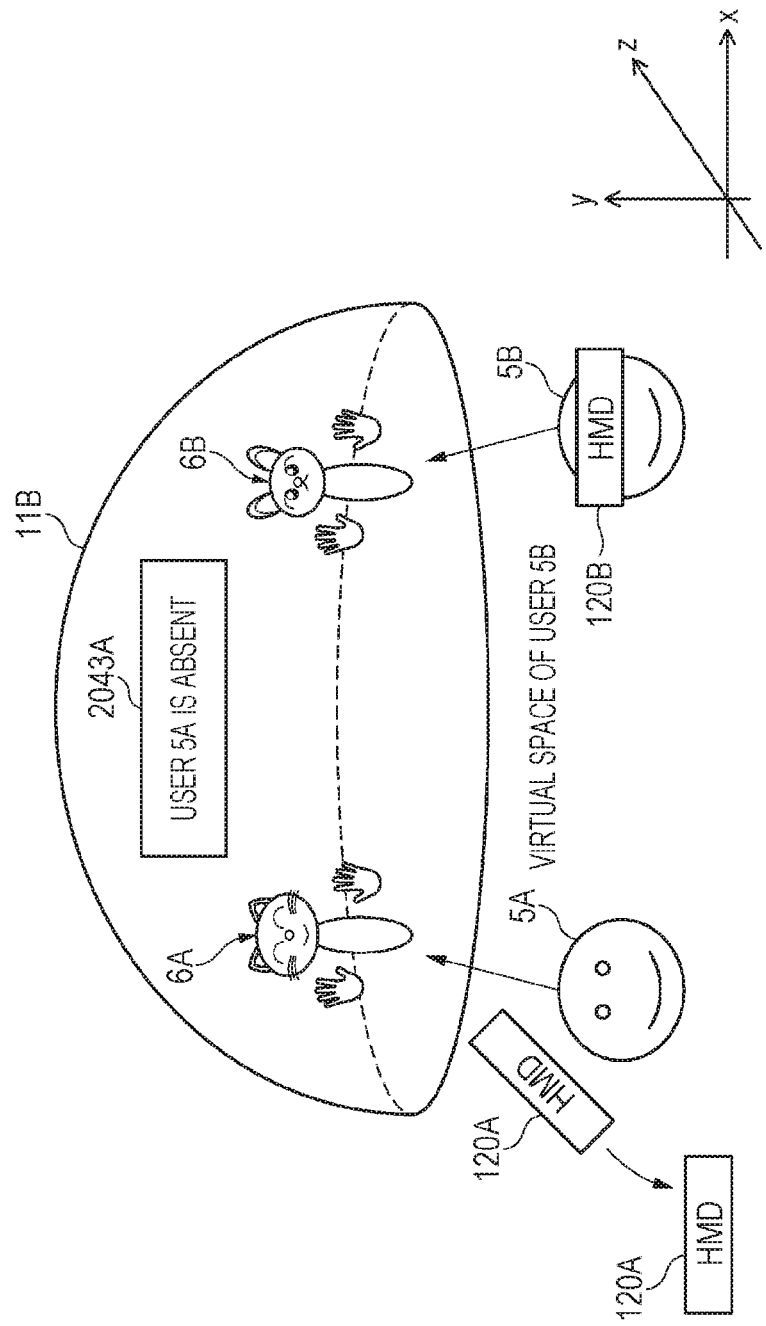
FIG. 20 A diagram of the virtual space to be provided to the user according to at least one embodiment of this disclosure.

The processor 210 may generate a subtitle object 2043A in the virtual space 11B instead of the speech bubble object 1942A (see FIG. 20). In FIG. 20, the subtitle object 2043A displays information (e.g., "user 5A is absent") indicating the fact that the user 5A is not wearing the HMD 120. The subtitle object 2043A may be arranged near the avatar object 6A, or may be moved in association with the field-of-view region 15 of the avatar object 6B so that the subtitle object 2043A is always arranged in the field-of-view region 15 of the avatar object 6B. Further, subtitles indicating the fact that the user 5A is not wearing the HMD 120 may be superimposed on the field-of-view image displayed on the HMD 120.

After that, the processor 210 updates the virtual space data representing the virtual space 11B, and at the same time, updates the field-of-view CV of the avatar object 6B in association with the motion of the HMD 120 of the HMD set 110B. Next, the processor 210 updates the field-of-view image data based on the updated virtual space data and the updated field-of-view region 15 of the avatar object 6B, and displays a field-of-view image on the HMD 120 based on the updated field-of-view image data (Step S1736).

Meanwhile, the processor 210 of the HMD set 110A transmits the unworn state information to the server 600 via the network 2, and then transitions from an active mode to a sleep mode (Step S1737). In this case, preferably, the mode of the processor 210 is a sleep mode, whereas the mode of the sensor (wearing sensor 195 or sensor 190) is an active mode.

According to at least one embodiment of this disclosure, when the user 5A is not wearing the HMD 120, the HMD set 110B presents the user 5B with the fact that the user 5A is not wearing the HMD 120. In particular, according to at least one embodiment of this disclosure, when the user 5A is not wearing the HMD 120, information indicating the fact that the user 5A is not wearing the HMD 120 is visualized in the field-of-view image displayed on the HMD 120 of the HMD set 110B. In this respect, the avatar object 6A whose facial expression is set to the default expression and the speech bubble object 1942A are visualized in the field-of-view image displayed on the HMD 120 of the HMD set 110B.

In this manner, when the user 5B communicates to/from the user 5A on the virtual space 11B, the user 5B can visually recognize the default facial expression (e.g., smile) of the avatar object 6A and the information displayed on the speech bubble object 1942A, to thereby easily grasp the fact that the user 5A is not wearing the HMD 120. Therefore, the user is provided with a rich virtual experience.

In particular, the user 5B may feel strange about the user 5A who does not react at all when the user 5B does not grasp the fact that the user 5A is not wearing the HMD 120. In this manner, the situation in which the user 5B feels strange (e.g., uncanny valley) about the user 5A who does not react to the user 5B at all is reduced or avoided by allowing the user 5B to grasp the fact that the user 5A is not wearing the HMD 120.

According to at least one embodiment of this disclosure, the user 5A is determined to not be wearing the HMD 120 based on the information (inclination information or event information) transmitted from a sensor (sensor 190 or wearing sensor 195) of the HMD set 110A. After that, the unworn state information indicating the fact that the user 5A is not wearing the HMD 120 is transmitted to the server 600. In this manner, i the fact that the user 5A is not wearing the HMD 120 is automatically identified based on the information output from the sensor of the HMD set 110A.

In at least one embodiment of this disclosure, the HMD set 110A transmits the unworn state information to the HMD set 110B via the server 600, but the HMD set 110A may transmit the inclination information transmitted from the sensor 190 to the HMD set 110B instead of the unworn state information. In this case, the processor 210 of the HMD set 110B may identify the fact that the user 5A is not wearing the HMD 120 based on the received inclination information, and execute the processing defined in Step S1734 to Step S1736.

Figure 21:
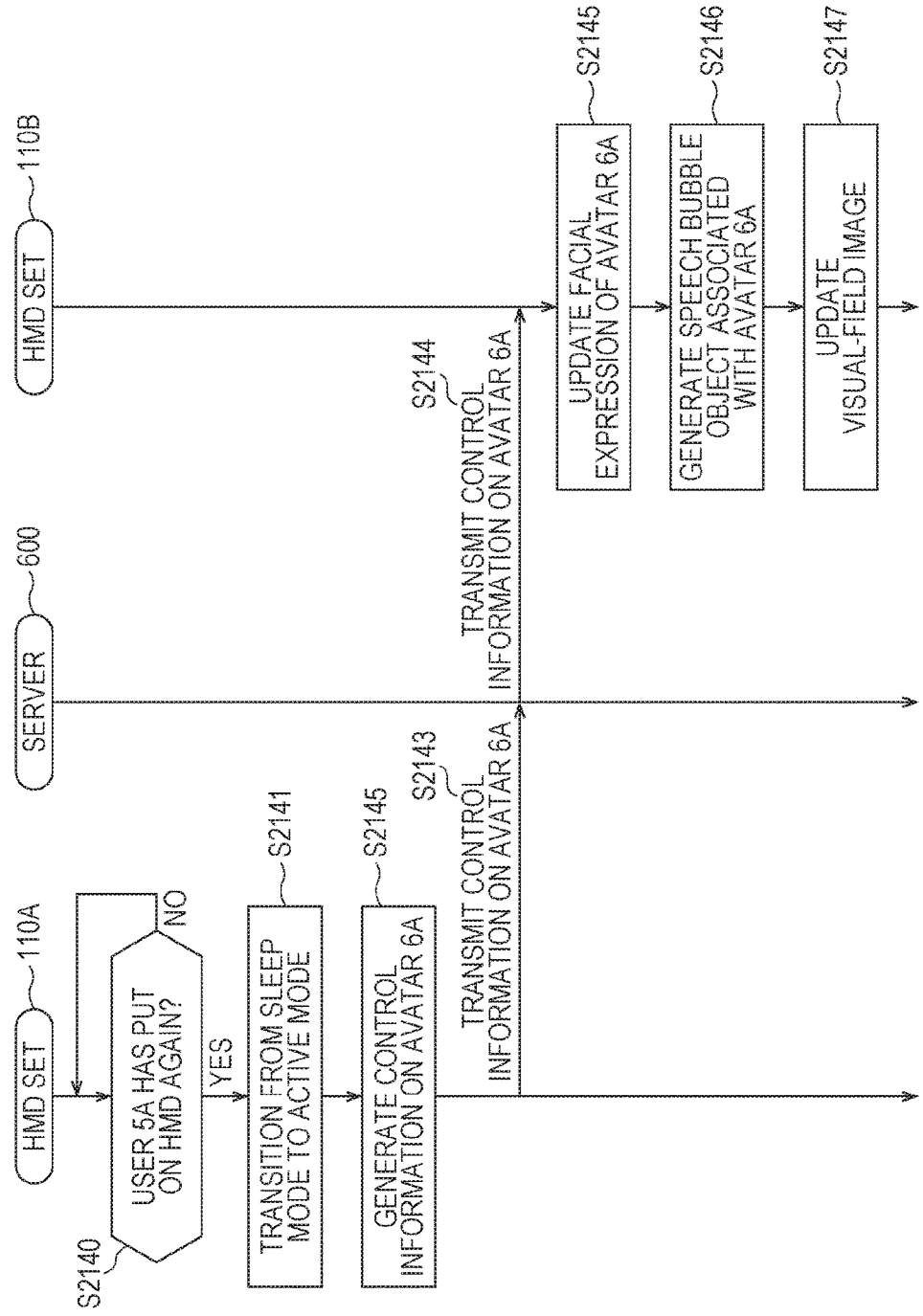
FIG. 21 A flowchart of the information processing method in a case where the user has put on the HMD again according to at least one embodiment of this disclosure.
Figure 22:
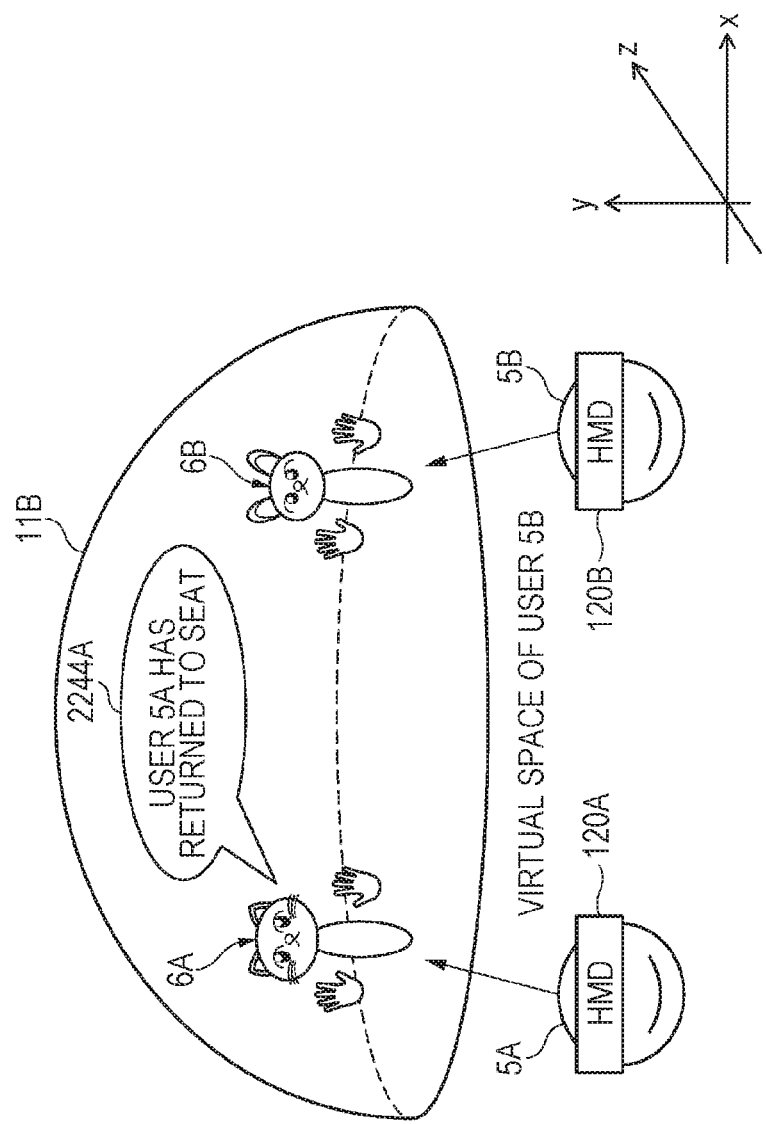
FIG. 22 A diagram of the virtual space to be provided to the user according to at least one embodiment of this disclosure.

Next, referring mainly to FIG. 21 and FIG. 22, a description is given of an information processing method according to at least one embodiment of this disclosure in a case where the user 5A removed the HMD 120 and has put on the HMD 120 again. FIG. 21 is a flowchart of the information processing method in a case where the user 5A has put on the HMD 120 again according to at least one embodiment of this disclosure. FIG. 22 is a diagram of the virtual space 11B to be provided to the user 5B, which is used to describe the information processing method according to at least one embodiment of this disclosure.

With reference to FIG. 21, in Step S2140, the processor 210 determines whether or not the user 5A has put on the HMD 120 again. In this determination, the processor 210 may determine whether or not the user 5A has put on the HMD 120 again based on the inclination information on the HMD 120 transmitted from the sensor 190 or the event information transmitted from the wearing sensor 195. For example, when the processor 210 determines that the processor 210 has received the event information from the wearing sensor 195, the processor 210 identifies the fact that the user 5A has put on the HMD 120 and executes processing of Step S2141. On the other hand, when the processor 210 determines that the processor 210 has not received the event information from the wearing sensor 195, the processor 210 identifies the fact that the user 5A is not wearing the HMD 120, and waits until reception of the event information from the wearing sensor 195.

When the determination result of Step S2140 is "YES", the processor 210 transitions from the sleep mode to the active mode (Step S2141). Next, the processor 210, which has transitioned to the active mode, generates control information on the avatar object 6A, and generates worn state information indicating the fact that the user 5A has put on the HMD 120 (Step S2142). After that, the processor 210 transmits the control information and worn state information on the avatar object 6A to the server 600 via the network 2 (Step S2143).

Next, after the server 600 has received the control information and worn state information on the avatar object 6A from the HMD set 110A, the server 600 transmits the control information and worn state information on the avatar object 6A to the HMD set 110B via the network 2 (Step S2144). After that, the processor 210 of the HMD set 110B updates the motion of the avatar object 6A based on the control information on the avatar object 6A, and also updates the motion of the avatar object 6B based on the control information on the avatar object 6B (Step S2145). In particular, the processor 210 updates the facial expression of the avatar object 6A based on the face information on the avatar object 6A contained in the control information on the avatar object 6A, and updates the facial expression of the avatar object 6B based on the face information on the avatar object 6B contained in the control information on the avatar object 6B.

Next, in FIG. 22, the processor 210 generates a speech bubble object 2244A associated with the avatar object 6A in the virtual space 11B (Step S2146). Information indicating the fact that the user 5A has put on the HMD 120 (e.g., "user 5A has returned to seat") is displayed on the speech bubble object 2244A.

After that, the processor 210 updates the virtual space data on the virtual space 11B, and also updates the field-of-view region 15 of the avatar object 6B in association with the motion of the HMD 120 of the HMD set 110B. Next, the processor 210 updates the field-of-view image data based on the updated virtual space data and the updated field-of-view region 15 of the avatar object 6B, and displays the field-of-view image on the HMD 120 based on the updated field-of-view image data (Step S2147).

According to at least one embodiment of this disclosure, when the user 5A removed the HMD 120 and has put on the HMD 120 again, the HMD set 110B presents the user 5B with the fact that the user 5A is wearing the HMD 120. In this manner, the user 5B visually recognizes the updated facial expression of the avatar object 6A and the speech bubble object 2244A, to thereby be able to easily grasp the fact that the user 5A has put on the HMD 120 again. Therefore, a user is provided with a rich virtual experience.

In the description of at least one embodiment of this disclosure, information indicating the fact that the user 5A has put on the HMD 120 or is not wearing the HMD 120 is visualized in the field-of-view image, but at least one embodiment of this disclosure is not limited thereto. For example, the speaker 180 (sound output device) of the HMD set 110B may output a voice guidance (e.g., "user 5A has left seat") indicating the fact that the user 5A is not wearing the HMD 120, or a voice guidance (e.g., "user 5A has returned to seat") indicating the fact that the user 5A has put on the HMD 120. In this case, the processor 210 of the HMD set 110A transmits the voice guidance data to the HMD set 110B via the server 600 together with the unworn state information (or worn state information).

In the description of at least one embodiment of this disclosure, the virtual space data on the virtual space 11B is updated by the HMD set 110B. However, the virtual space data may be updated by the server 600. Further, in at least one embodiment, the field-of-view image data corresponding to the field-of-view image is updated by the HMD set 110B, but the field-of-view image data may be updated by the server 600. In this case, the HMD set 110B displays the field-of-view image on the HMD 120 based on the field-of-view image data transmitted from the server 600.

The order of processing steps defined in the respective steps in each of FIG. 17 and FIG. 21 is just an example, and the order of those steps can be appropriately changed.

Figure 23:
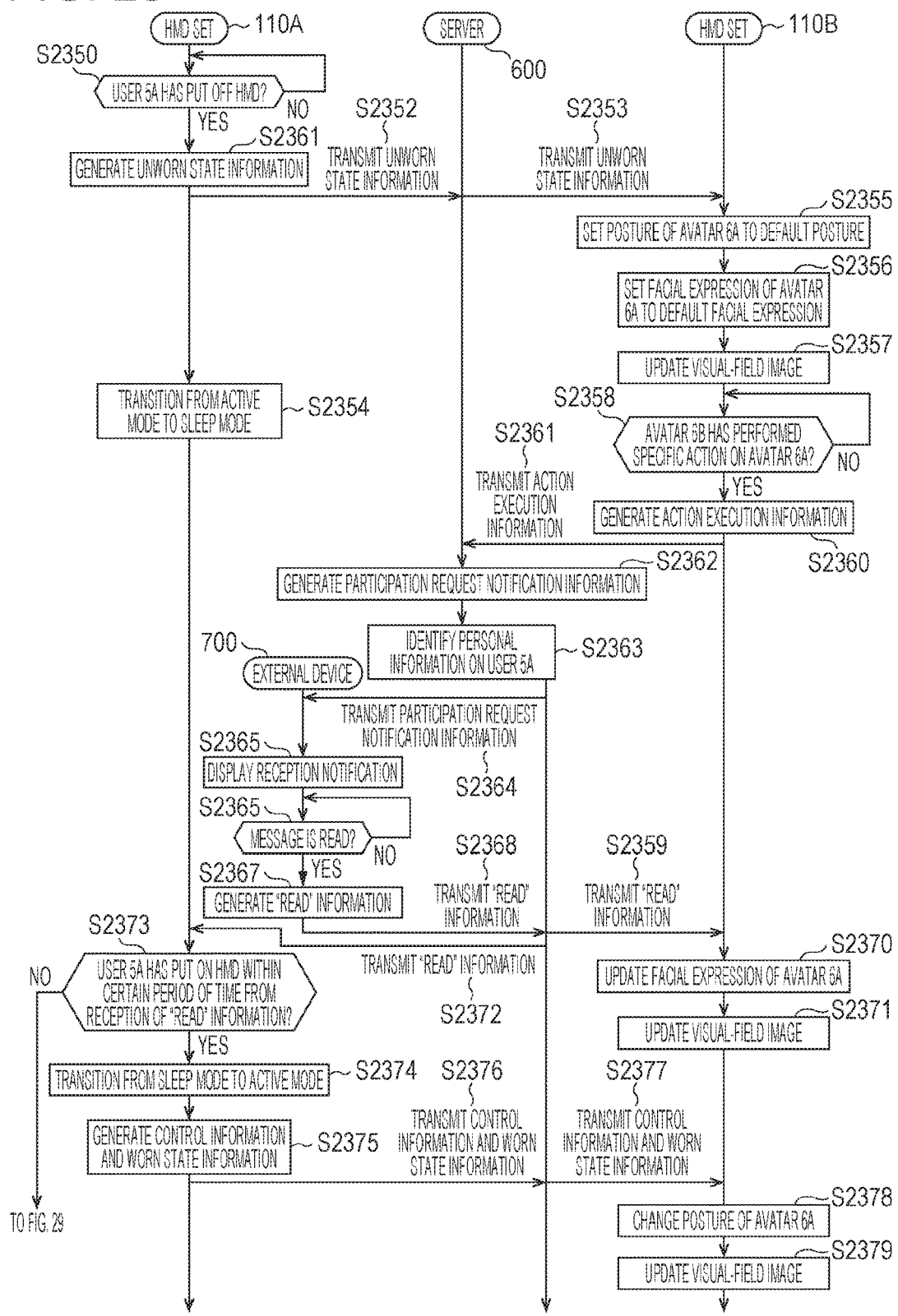
FIG. 23 A flowchart of an information processing method according to at least one embodiment of this disclosure.
Figure 24:
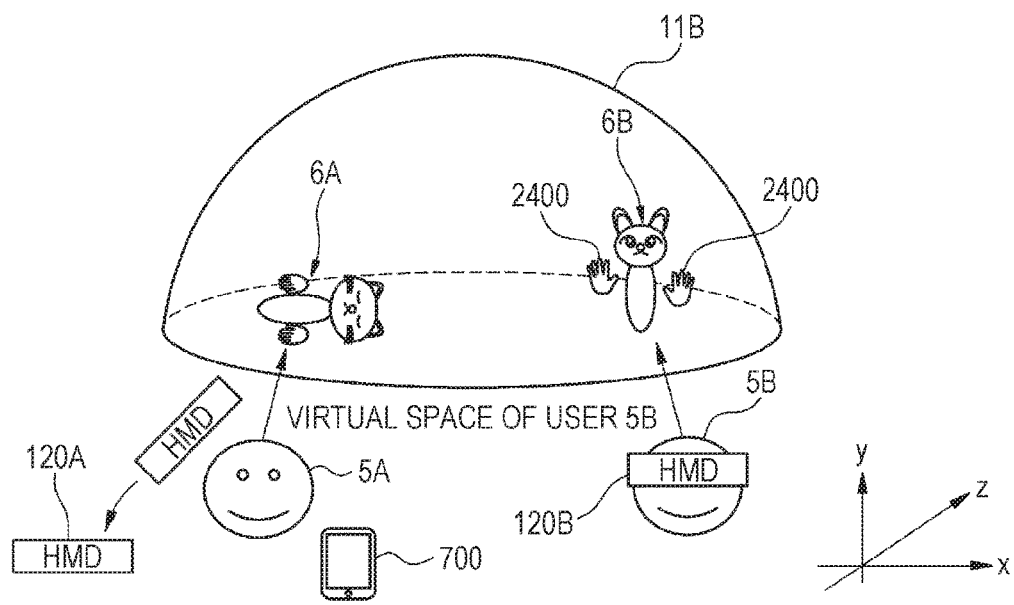
FIG. 24 A diagram of a virtual space to be provided to the user according to at least one embodiment of this disclosure.
Figure 25:
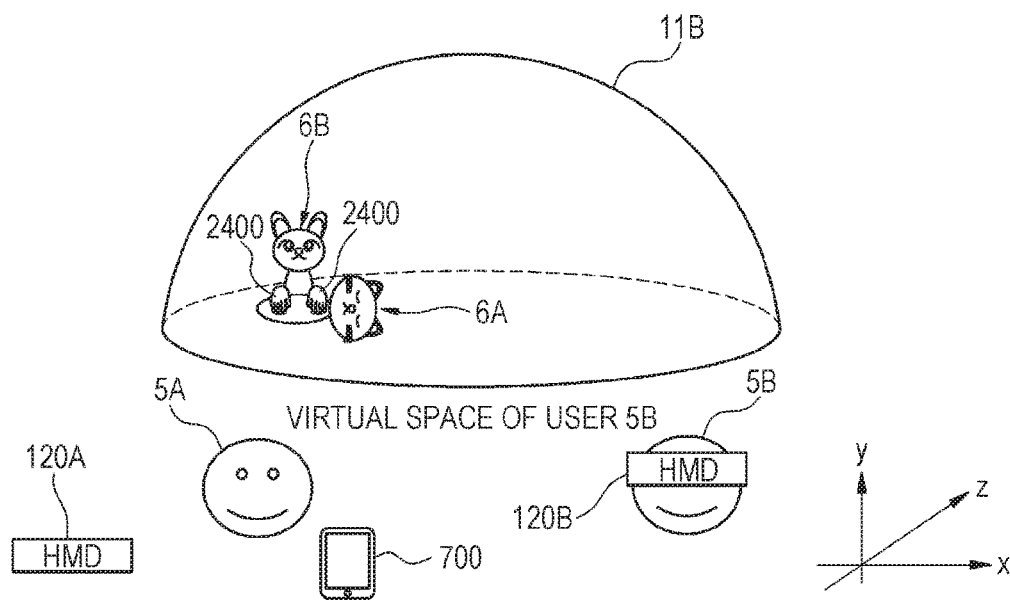
FIG. 25 A diagram of the virtual space to be provided to the user according to at least one embodiment of this disclosure.
Figure 26:
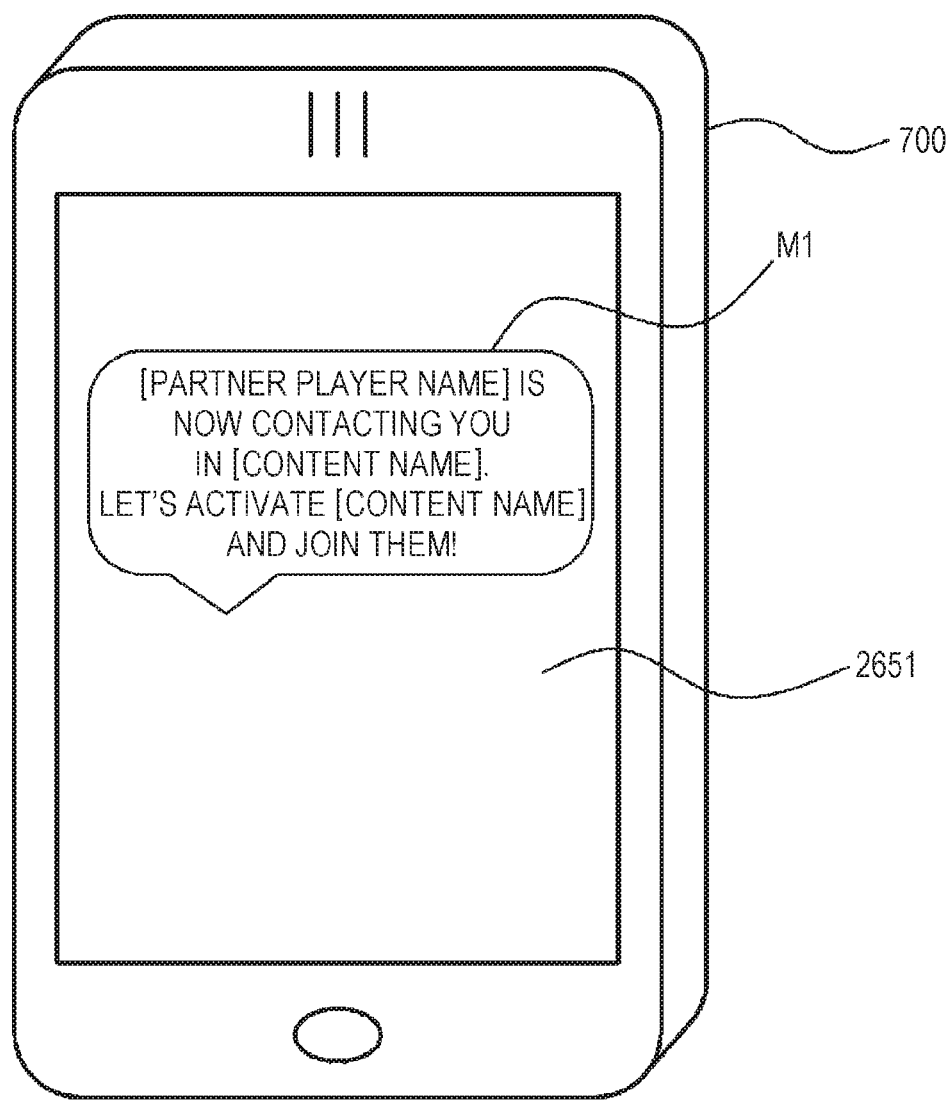
FIG. 26 A diagram of a display of an external device associated with the user according to at least one embodiment of this disclosure.
Figure 27:
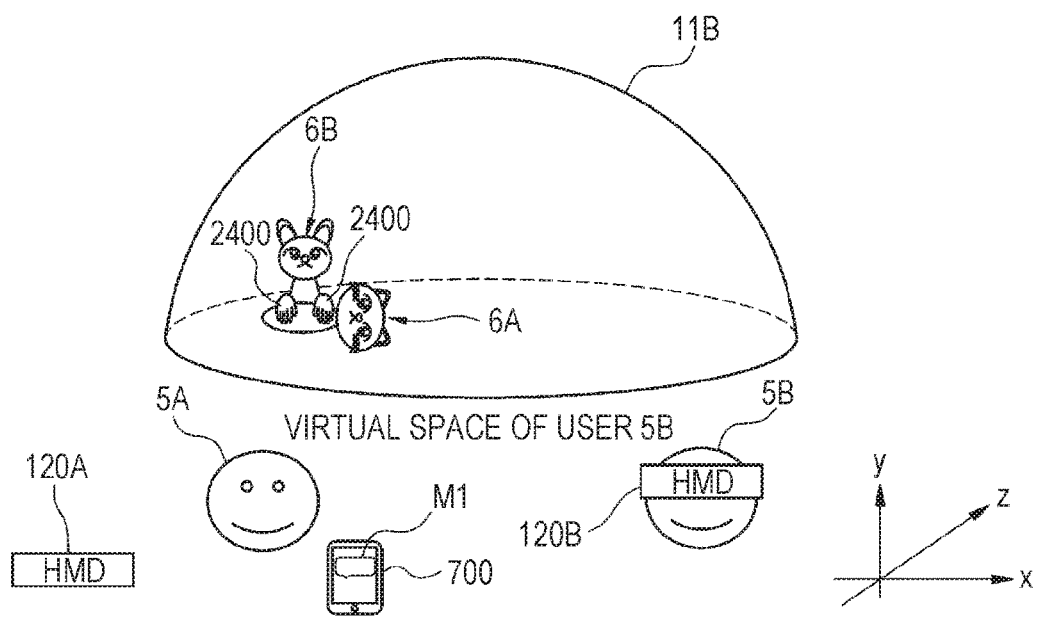
FIG. 27 A diagram of a virtual space to be provided to the user according to at least one embodiment of this disclosure.
Figure 28:
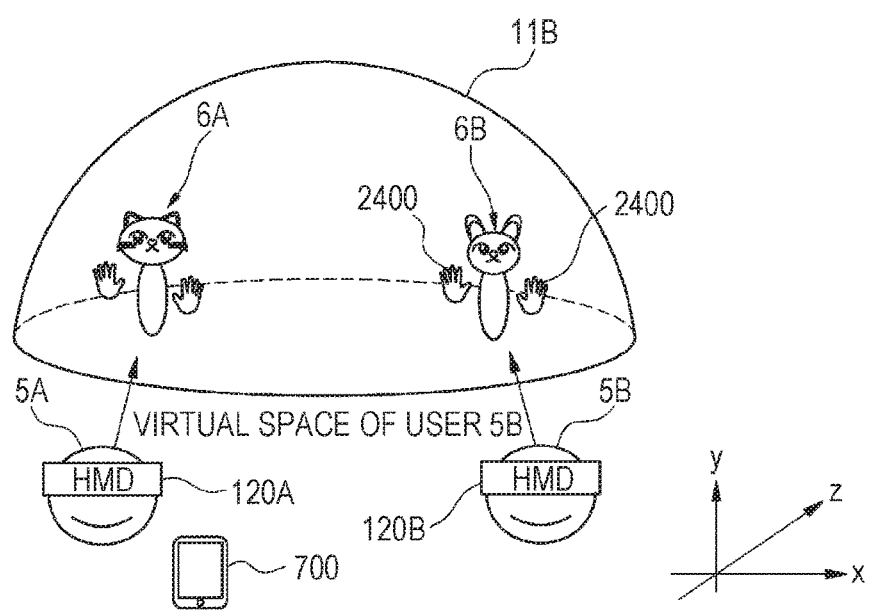
FIG. 28 A diagram of a virtual space to be provided to the user according to at least one embodiment of this disclosure.
Figure 29:
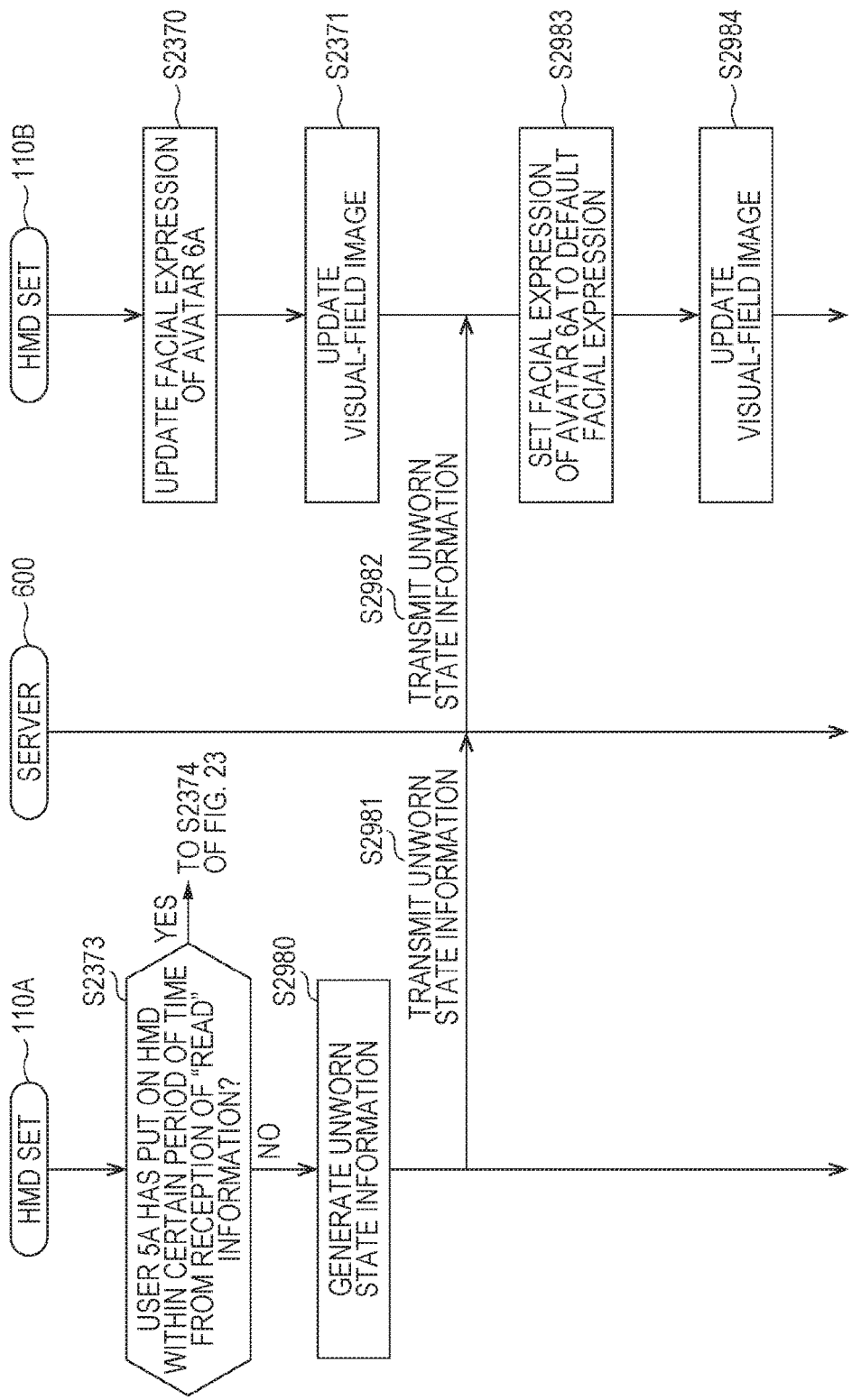
FIG. 29 A flowchart of an information processing method according to at least one embodiment of this disclosure in a case where the user has not put on the HMD within a certain period of time from reception of "read" information.

Next, with reference to FIG. 23 to FIG. 30, a description is given of an information processing method according to at least one embodiment of this disclosure in a case where the user 5A has removed the HMD 120. FIG. 23 is an exemplary flowchart of the information processing method according to at least one embodiment of this disclosure. FIG. 24, FIG. 25, FIG. 7, and FIG. 28 are each a diagram of the virtual space 11B to be provided to the user 5B, which is used to describe the information processing method according to at least one embodiment of this disclosure. FIG. 26 is a diagram of an example of display of the external device 700 associated with the user 5A, which is used to describe the information processing method according to at least one embodiment of this disclosure. FIG. 29 is a flowchart of the information processing method according to at least one embodiment of this disclosure in a case where the user 5A has not put on the HMD within a certain period of time from reception of "read" information.

With reference to FIG. 23, the processor 210 of the HMD set 110A determines whether or not the user 5A has removed the HMD 120 (Step S2350). The processing of determining whether or not the user 5A has removed the HMD 120 through use of the sensor 190 is the same as that described in the above-mentioned at least one embodiment, and thus a detailed description thereof is omitted here.

In response to a determination in Step S2350 that the user 5A has removed the HMD 120 (that is, user 5A is not wearing HMD 120) (YES in Step S2350), the processor 210 generates information (unworn state information) indicating the fact that the user 5A is not wearing the HMD 120 (Step S2351). After that, the processor 210 transmits the unworn state information to the server 600 via the network 2 (Step S2352). In Step S2351, the processor 210 may generate positional relationship information on a positional relationship between the HMD 120 and the controller 300, and transmit the positional relationship information to the server 600 together with the unworn state information.

Next, the server 600 receives the unworn state information from the HMD set 110A, and transmits the unworn state information to the HMD set 110B via the network 2 (Step S2353).

On the other hand, the processor 210 of the HMD set 110A transmits the unworn state information to the server 600 via the network 2, and then, transitions from the active mode to the sleep mode (Step S2354). In this case, in at least one embodiment, the mode of the processor 210 is the sleep mode, whereas the mode of the sensor (wearing sensor 195 or sensor 190) is the active mode.

Next, the processor 210 of the HMD set 110B sets the posture of the avatar object 6A arranged in the virtual space 11B to a default posture (that is, posture in default setting) based on the unworn state information received from the server 600 (Step S2355). In at least one embodiment, a description is given based on an assumption that the virtual space is a room in which to search for a partner of a multiplayer game, but the virtual space is not limited thereto. The default posture of the avatar object 6A refers to a posture in an initial state of the avatar object 6A. When the default posture is lying, in FIG. 24, the posture of the avatar object 6A is set to lying on the floor.

In Step S2355, the processor 210 may set, as a mode of representation of the fact that the user 5A is not wearing the HMD 120, the posture of the avatar object 6A to a posture selected in advance by the user 5A. In this case, information on the posture of the avatar object 6A selected by the user 5A may be transmitted from the HMD set 110A to the HMD set 110B, and then stored into the storage 230 of the HMD set 110B in advance.

When the user 5B receives the positional relationship information indicating a positional relationship between the HMD 120 and the controller 300, in Step S2355, the processor 210 may set the posture of the avatar object 6A based on the positional relationship information. That is, when the user 5A is not wearing the HMD 120, the HMD 120 and the controller 300 are placed in a floor or table in the real space in many cases. In this case, the avatar object 6A of the virtual space 11B may be set to have a posture of lying on the floor based on the positional relationship between the HMD 120 and the controller 300.

Next, the processor 210 of the HMD set 110B sets the facial expression of the avatar object 6A arranged in the virtual space 11B to the default facial expression (that is, facial expression in default setting) (Step S2356). When the default facial expression is closed eyes, in FIG. 24, the facial expression of the avatar object 6A is set to the closed eyes.

In Step S2356, the processor 210 may set, as a mode of representation of the fact that the user 5A is not wearing the HMD 120, the facial expression of the avatar object 6A to a facial expression selected in advance by the user 5A. In this case, information on the facial expression of the avatar object 6A selected by the user 5A may be transmitted from the HMD set 110A to the HMD set 110B, and then stored into the storage 230 of the HMD set 110B in advance.

Next, the processor 210 updates the virtual space data on the virtual space 11B, and also updates the field-of-view region 15 of the avatar object 6B in association with the motion of the HMD 120 of the HMD set 110B. Next, the processor 210 updates field-of-view image data based on the updated virtual space data and the updated field-of-view region 15 of the avatar object 6B, and displays the field-of-view image on the HMD 120 based on the updated field-of-view image data (Step S2357).

In this manner, display of the posture and facial expression of the avatar object 6A in the virtual space 11B is set to the default (lying with closed eyes) so that the user 5B can easily recognize the fact that the user 5A is not wearing the HMD 120 and is not participating in content provided in the virtual space 11B.

Next, after the processor 210 of the HMD set 110B updates the field-of-view image in Step S2357, the processor 210 of the HMD set 110B determines whether or not the avatar object 6B associated with the user 5B has performed a specific action (example of first action) on the avatar object 6A associated with the user 5A in the virtual space 11B (Step S2358).

The specific action performed by the avatar object 6B on the avatar object 6A includes, for example, a motion involving a physical interaction between the avatar object 6A and the avatar object 6B. The physical interaction between the avatar object 6A and the avatar object 6B is detected by using a collider (collision object) for detecting collision with other objects. Although not shown, the collider is associated with each of the bodies of the avatar objects 6A and 6B, and is provided for determination of collision (determination of touch) between the avatar object 6A and the avatar object 6B. For example, a virtual hand 2400 of the avatar object 6B with a collider touches the avatar object 6A with a collider so that the avatar object 6B and the avatar object 6A have touched each other. The collider may be set over an entire range of the bodies of the avatar objects 6A and 6B, or may be set to a specific position (e.g., hand, leg, head, shoulder, or hip) of the bodies of the avatar objects 6A and 6B. In particular, in at least one embodiment, the collider is set to each fingertip of the virtual hand 2400, and collision determination is performed for each finger independently. With this, determination of collision between fingers and other objects is accurately performed. The collider is formed as a transparent body, and is not displayed in the field-of-view image (FIG. 12B).

In the above-mentioned example, the processor 210 determines collision between the avatar object 6A and the avatar object 6B based on the motion of the avatar object 6B (e.g., motion of virtual hand 2400). However, the determination is not limited to this example. For example, the processor 210 may determine collision with the avatar object 6A based on the motion of the user 5B (e.g., motion of hand of user 5B).

The specific action of a motion involving the physical interaction may include, for example, a motion of holding and shaking the body of the avatar object 6A or a motion of slapping the avatar object 6A (e.g., slapping face or shoulder of avatar object 6A) in addition to the motion of the avatar object 6B touching the avatar object 6A with the virtual hand 2400. The specific action may be a motion involving a reciprocal motion, namely, a motion of touching the avatar object 6A in the process of the reciprocal motion of the virtual hand 2400. With such a configuration, even when the avatar object 6B has erroneously touched the avatar object 6A due to an erroneous operation by the user 5B, the fact that the specific action is not performed is detected, and erroneous detection of the motion of the virtual hand 2400 is prevented.

For example, in FIG. 25, when the avatar object 6B is holding the body (e.g., trunk of the body) of the avatar object 6A with the virtual hand 2400 and a reciprocal motion of the virtual hand 2400 is performed, the processor 210 determines that a shaking motion is performed as the specific action. Holding (selecting) the body of the avatar object 6A with the virtual hand 2400 can be implemented by, for example, the user 5B operating (pressing) a key (not shown) of the controller 300 under a state in which the collider of the virtual hand 2400 and the collider of the body of the avatar object 6A are in contact with each other. This shaking motion may include a motion of touching the avatar object 6A in the process of the reciprocal motion of the virtual hand 2400 at an acceleration of a fixed value or more. For example, in the case of the state in FIG. 25, a motion may be identified as the shaking motion when the virtual hand 2400 moves reciprocally in the z-axis direction under a state in which the virtual hand 2400 is holding the body of the avatar object 6A and a state of an acceleration in the +z-axis direction being a fixed value or more and an acceleration in the −z-axis direction being a fixed value or more occurs continuously a predetermined number of times or more. The direction in which the virtual hand 2400 moves reciprocally is not limited to the z-axis direction, but may be set to any direction. The shaking motion may include a motion of the virtual hand 2400 passing one or more relative coordinates associated with the avatar object 6A a predetermined number of times or more within a certain period of time. For example, in the case of the state in FIG. 25, one or more relative coordinates may be a first relative coordinate, which is set at a free-selected position in the +z direction, and a second relative coordinate, which is set at a free-selected position in the −z direction, with respect to a position of the body of the avatar object 6A held by the virtual hand 2400. In this example, a motion may be identified as the shaking motion when the virtual hand 2400 reciprocally moves in the z-axis direction under a state in which the virtual hand 2400 is holding the body of the avatar object 6A, the virtual hand 2400 passes the first relative coordinate a predetermined number of times or more within a certain period of time, and the virtual hand 2400 passes the second relative coordinate a predetermined number of times or more within a certain period of time. The direction of reciprocally moving the virtual hand 2400 is not limited to the z-axis direction, and may be set to any direction. In this case, relative coordinates of the virtual hand 2400 may also be set with respect to any direction.

In at least one embodiment, the specific action is determined to be performed for a motion recognized by the user 5B as shaking. That is, the shaking direction is not uniform, and is assumed to be different depending on the user. Thus, the movement direction of the virtual hand 2400 may be any direction, and is not required to be limited to a specific direction. When the motion of a specific action is required to be determined in a rigid manner, or the motion of the avatar object 6B is required to be realistic (for example, preventing virtual hand 2400 from digging into avatar object 6A), the processor 210 may determine that a shaking motion has occurred in consideration of the movement direction of the virtual hand 2400, that is, in response to a reciprocal motion in a specific direction.

On the other hand, when the virtual hand 2400 touches (collides with) the avatar object 6A at a fixed acceleration or more under a state in which the avatar object 6B is not holding the body of the avatar object 6A with the virtual hand 2400, the processor 210 identifies that a slapping motion is performed as the specific action. In at least one embodiment, in order to help prevent erroneous detection of the motion of the virtual hand 2400, in particular, the slapping motion includes a plurality of times of touching motions (collider collision) performed on the avatar object 6A in the process of the reciprocal motion (specifically, double slapping motion) together with the reciprocal motion of the virtual hand 2400 at a fixed acceleration or more. For example, in the case of the state in FIG. 24, a motion may be identified as the slapping motion when the virtual hand 2400 reciprocally moves in the y-axis direction, and touching between the collider of the virtual hand 2400 and the collider of the face of the avatar object 6A has occurred a predetermined number of times or more under a state in which an acceleration in the +y-axis direction is a fixed value or more and an acceleration in the −y-axis direction is a fixed value or more. The direction of reciprocally moving the virtual hand 2400 is not limited to the y-axis direction, and may be set to any direction. This double slapping motion may be identified, for example, when the virtual hand 2400 of the avatar object 6B passes relative coordinates associated with the avatar object 6A a predetermined number of times or more within a certain period of time, and a plurality of times of touching motions (touch determination) performed on the avatar object 6A have occurred within a certain period of time. For example, in the case of the state in FIG. 24, one or more relative coordinates may be a first relative coordinate, which is set at a free-selected position in the +y direction, and a second relative coordinate, which is set at a free-selected position in the −y direction, with respect to the face of the avatar object 6A. In this example, a motion may be identified as the slapping motion when the virtual hand 2400 reciprocally moves in the y-axis direction, and touching between the collider of the virtual hand 2400 and the collider of the face of the avatar object 6A has occurred a predetermined number of times or more under a state in which the virtual hand 2400 passes the first relative coordinate a predetermined number of times or more within a certain period of time, and the virtual hand 2400 passes the second relative coordinate a predetermined number of times or more within a certain period of time. The direction of reciprocally moving the virtual hand 2400 is not limited to the y-axis direction, and may be set to any direction. In this case, relative coordinates of the virtual hand 2400 may also be set with respect to any direction. The processor 210 may determine that a slapping motion has occurred in consideration of the movement direction of the virtual hand 2400, that is, in response to a reciprocal motion in a specific direction.

The avatar object 6A may be set so that the avatar object 6A moves in association with the motion of the avatar object 6B. For example, in FIG. 25, when the avatar object 6B has performed a shaking motion on the avatar object 6A, the processor 210 may set the motion of the avatar object 6A so that the avatar object 6A is shaken in association with the shaking motion. However, when the avatar object 6B has performed a shaking motion or slapping motion on the avatar object 6A, the avatar object 6A may be set so as not to follow the motion, that is, so as not to move.

Next, when the processor 210 determines that the avatar object 6B has performed a specific action on the avatar object 6A (YES in Step S2358), the processor 210 generates information (action execution information) indicating the fact that the user 5B has performed the specific action (Step S2360). After that, the processor 210 transmits the action execution information to the server 600 via the network 2 (Step S2361).

Next, the server 600 generates information (participation request notification information) on participation request notification for requesting the user 5A to participate in content provided in the virtual space 11 based on the action execution information received from the HMD set 110B (Step S2362). The participation request notification is notification for requesting the user 5A, who is not wearing the HMD 120, to participate in the content provided in the virtual space 11. The participation request notification information may contain, for example, the type of a specific action or the strength of the motion of a specific action in addition to identification information on the avatar object 6B having performed the specific action and the identification information on the avatar object 6A having received the specific action.

Next, the server 600 identifies personal information on the user 5A based on the generated participation request notification information (Step S2363). For example, personal information (e.g., email address or social networking service (SNS) address) on the user 5A is registered in advance in an information table stored in the storage 630 of the server 600, and is managed in association with identification information on the avatar object 6A. In Step S2363, the server 600 refers to the information table stored in the storage 630 to acquire the personal information on the user 5A based on the identification information on the avatar object 6A contained in the participation request notification information. The personal information on the user 5A may be managed in a server different from the server 600. Examples of the server different from the server 600 include a server that can distribute a game program to a user having registered personal information, namely, a server that plays a role of a platform for distribution of a game. However, the server different from the server 600 is not limited to those examples.

Next, the server 600 transmits the participation request notification information to the transmission destination (e.g., email address of user 5A) acquired in Step S2363 (Step S2364). A communication tool such as an email, chat, or SNS can be used as the method of transmitting the participation request notification information to the user 5A.

Next, the external device 700 receives the participation request notification information using a communication tool, and displays a notification of receiving the participation request notification information on a display 6 (Step S2365). The external device 700 is a terminal device (user terminal) possessed by the user 5A, and may be a portable terminal such as a smartphone, a personal digital assistant (PDA), a tablet computer, a phablet, or a wearable device, or may be, for example, a personal computer or a video game console.

Next, the external device 700 activates the communication tool based on an input operation by the user 5A, who has noticed the reception notification, and displays a message M1 on the display 2651 as illustrated in FIG. 26 (Step S2366). The message M1 contains information (for example, [partner player name (e.g., user 5B)] is now contacting you in [content name (e.g., name of content provided to virtual space 11)]. Let's activate [content] and join them!) indicating the fact that the user 5B is requesting the user 5A for participation in the virtual space 11. When the external device 700 is a personal computer or a video game console, and an image of the content provided in the virtual space 11 is displayed also in such a device, a message about the participation request notification may be displayed on the display. The message M1 may be a message that urges the user 5A to put on the HMD 120 of the HMD set 110A.

Next, the external device 700 determines that the user 5A has read the message M1 based on the fact that the message M1 is displayed on the display 2651, and generates "read" information indicating the fact that the message M1 is read (Step S2367). The "read" information is generated based on reaction of the user 5A to the message M1, and may be generated based on, for example, a reply to an email or application of "Like". After that, the external device 700 transmits the "read" information to the server 600 via the network 2 (Step S2368).

Next, after the server 600 has received the "read" information from the external device 700, the server 600 transmits the "read" information to the HMD set 110B via the network 2 (Step S2369).

Next, the processor 210 of the HMD set 110B sets the facial expression of the avatar object 6A arranged in the virtual space 11B to an updated facial expression based on the "read" information received from the server 600 (Step S2370). For example, in FIG. 27, the processor 210 updates the facial expression of the avatar object 6A, which has been in a closed-eye state (example of first state), to an opened-eye state (example of second state).

In Step S2370, the processor 210 may update the posture of the avatar object 6A based on the "read" information received from the server 600. For example, the posture of the avatar object 6A in a lying state may be updated to a sitting state.

Next, the processor 210 updates the virtual space data representing the virtual space 11B, and updates the field-of-view region 15 of the avatar object 6B based on the motion of the HMD 120 of the HMD set 110B. Next, the processor 210 updates the field-of-view image data based on the updated virtual space data and the updated field-of-view region 15 of the avatar object 6B, and displays a field-of-view image on the HMD 120 based on the updated field-of-view image data (Step S2371). With this, the user 5B can easily grasp the fact that the user 5A has reacted to the participation request notification by visually recognizing the state in which eyes of the avatar object 6A are open.

Meanwhile, in Step S2372, the server 600 also transmits the "read" information to the HMD set 110A as well as the HMD set 110B.

Next, the processor 210 of the HMD set 110A determines whether or not the user 5A has put on the HMD 120 within a certain period of time from reception of the "read" information (Step S2373). The processor 210 may determine whether or not the user 5A has put on the HMD 120 based on the inclination information on the HMD 120 transmitted from the sensor 190 or the event information transmitted from the wearing sensor 195. The determination of whether or not the user 5A has put on the HMD 120 may be made by determining whether or not the inclination of the HMD 120 is smaller than a predetermined inclination based on the inclination information indicating the inclination (roll angle, yaw angle, and pitch angle) of the HMD 120 acquired by the sensor 190. As described above, while the user 5A is wearing the HMD 120, the inclination of the HMD 120 is equal to or smaller than a predetermined inclination, and thus when the inclination of the HMD 120 is smaller than the predetermined inclination, the user 5A is determined to be wearing the HMD 120.

In response to a determination in Step S2373 that the user 5A has put on the HMD 120 (YES in Step S2373), the processor 210 of the HMD set 110A transitions from the sleep mode to the active mode (Step S2374). Next, the processor 210, which has transitioned to the active mode, generates control information on the avatar object 6A and generates the worn state information indicating the fact that the user 5A has put on the HMD 120 (Step S2375). After that, the processor 210 transmits the control information and worn state information on the avatar object 6A to the server 600 via the network 2 (Step S2376).

Next, after the server 600 has received the control information and worn state information on the avatar object 6A from the HMD set 110A, the server 600 transmits the control information and worn state information on the avatar object 6A to the HMD set 110B via the network 2 (Step S2377).

Next, the processor 210 of the HMD set 110B updates the motion of the avatar object 6A based on the control information on the avatar object 6A, and also updates the motion of the avatar object 6B based on the control information on the avatar object 6B (Step S2378). In particular, the processor 210 updates the posture of the avatar object 6A based on the worn state information on the avatar object 6A. The processor 210 may update the facial expression of the avatar object 6B based on the face information on the avatar object 6B contained in the control information on the avatar object 6B. Specifically, for example, in FIG. 28, the processor 210 sets the posture of the avatar object 6A to a standing state (example of third state).

Similarly to at least one embodiment in FIG. 22, the processor 210 may generate a speech bubble object associated with the avatar object 6A in the virtual space 11B. Information indicating the fact that the user 5A has put on the HMD 120 (e.g., "user 5A has returned to seat") is displayed on the speech bubble object.

After that, the processor 210 updates the virtual space data on the virtual space 11B, and also updates the field-of-view region 15 of the avatar object 6B in association with the motion of the HMD 120 of the HMD set 110B. Next, the processor 210 updates the field-of-view image data based on the updated virtual space data and the updated field-of-view region 15 of the avatar object 6B, and displays the field-of-view image on the HMD 120 based on the updated field-of-view image data (Step S2379).

On the other hand, in response to a determination in Step S2373 that the user 5A has not put on the HMD 120 within the certain period of time from reception of the "read" information (NO in Step S2373), the processor 210 proceeds to processing of FIG. 29. Next, in FIG. 29, the processor 210 generates the unworn state information indicating the fact that the user 5A is not wearing the HMD 120 (Step S2980). After that, the processor 210 transmits the unworn state information to the server 600 via the network 2 (Step S2981).

Next, after the server 600 receives the unworn state information from the HMD set 110A, the server 600 transmits the unworn state information to the HMD set 110B via the network 2 (Step S2982).

Next, the processor 210 of the HMD set 110B sets the facial expression of the avatar object 6A arranged in the virtual space 11B to the default facial expression based on the unworn state information received from the server 600 (Step S2983). For example, when the default facial expression is the closed-eye state, in FIG. 24, the facial expression of the avatar object 6A is updated to the closed-eye state. In the processing of Step S2983, the facial expression of the avatar object 6A may be set to the default facial expression when the control information and the worn state information on the avatar object 6A are not received within a certain period of time measured by the processor 210 of the HMD set 110B since reception of the "read" information. When the eyes of the avatar object 6A are opened based on the "read" information in Step S2370 of FIG. 23, in Step S2983, the facial expression of the avatar object 6A is returned to the closed-eye state. On the other hand, when the participation request notification is not read (NO in Step S2366), the avatar object 6A is kept to be in the closed-eye state, and thus the facial expression of the avatar object 6A is not changed in Step S2983.

After that, the processor 210 updates the virtual space data representing the virtual space 11B, and updates the field-of-view region 15 of the avatar object 6B based on the motion of the HMD 120 of the HMD set 110B. Next, the processor 210 updates the field-of-view image data based on the updated virtual space data and the updated field-of-view region 15 of the avatar object 6B, and displays the field-of-view image on the HMD 120 based on the updated field-of-view image data (Step S2984).

As described above, the information processing method according to at least one embodiment includes moving the virtual hand 2400 in the virtual space 11 based on the motion of the user 5B. The method further includes performing an action (first action), for example, shaking motion performed by the virtual hand 2400, on the avatar object 6A, whose motion can be controlled in the virtual space 11 based on the motion of the user 5A. The method further includes performing transmission (second action) of the participation request notification for requesting the user 5A (external device 700 associated therewith) to participate in the virtual space 11 based on the execution of the action. With this method, the plurality of users 5A and 5B sharing the virtual space 11 can smoothly communicate to/from each other in the virtual space 11 without impairing the sense of immersion of those users by performing predetermined actions through an intuitive operation that uses the virtual hand 2400. In this manner, the virtual experience of the user is improved by providing a user interface (so-called diegetic UI) that does not require a menu operation or a key operation for communication between users.

In particular, the user 5A can easily recognize the fact that the user 5B has requested the user 5A to participate in content provided in the virtual space 11 through transmission of the participation request notification to the external device 700 associated with the user 5A based on the specific action performed by the user 5B on the avatar object 6A. With this, usage of content (e.g., multiplayer game) that is to be played by a plurality of users in the virtual space 11 is encouraged.

In the information processing method according to at least one embodiment, the participation request notification is transmitted to the user 5A when the user 5B has performed a specific action on the avatar object 6A under a state in which the user 5A is not controlling the avatar object 6A (namely, under state in which user 5A is not wearing HMD 120). Thus, the user 5A, who is not wearing the HMD 120, is induced to play content provided in the virtual space 11, and encouraged to participate in the content.

In particular, in a VR game, when there are few users (avatars) waiting in a room, that is, when there are few candidates for partners of a multiplayer game, the user (avatar) enters a room for the moment, and waits until candidates for partners of the multiplayer game appear without wearing the HMD in many cases. Therefore, awaiting user is induced to play the multiplayer VR game.

The information processing method according to at least one embodiment may further include transitioning the avatar object 6A in the virtual space 11B from the closed-eye state (first state) to the opened-eye state (second state) when the user 5A has reacted to the participation request notification (for example, when message M1 is read), and transitioning the avatar object 6A in the virtual space 11B to a standing state (third state) when the user 5A has started to control the avatar object 6A within a certain period of time after the avatar object 6A transitioned to the opened-eye state. With this, the user 5B can easily grasp the fact that the user 5A has reacted or the user 5A has put on the HMD 120 to control the avatar object 6A.

On the other hand, when the user 5A has not entered the state of controlling the avatar object 6A within the certain period of time after the avatar object 6A transitioned to the opened-eye state, the avatar object 6A in the virtual space 11B may be returned to the closed-eye state. With this, the user 5B can easily grasp the fact that the user 5A has not entered the state of controlling the avatar object 6A (that is, fact that user 5A has not participated in content) even though the user 5B has transmitted the participation request notification. Therefore, the user 5B can shake the avatar object 6A again to request participation in the virtual space again, or can request avatars that are associated with users other than the user 5A who share the virtual space 11 to participate in the virtual space.

The state of the user 5A not controlling the avatar object 6A may include not only a case of the user 5A not wearing the HMD 120 but also a case of the user 5A not being logged in to the content provided in the virtual space 11 in the first place. In the case of the user 5A not being logged in to the content, the avatar object 6A is usually not present in the virtual space 11B provided by the HMD set 110B of the user 5B. However, in a case where the user 5B registers the user 5A as a "friend", the user 5B can cause the avatar object 6A of the user 5A to be present in the virtual space 11B even when the user 5A is not logged in to the content. Registration as a friend may be registered in, for example, the server 600 together with personal information on each user. In this case, the processor 210 of the HMD set 110B can set the posture and facial expression of the avatar object 6A arranged in the virtual space 11B to the default based on the fact that the user 5A is not logged in to the content (Step S2354 of FIG. 23).

In this manner, the avatar object 6A associated with the user 5A, which is in the state of not being logged in to the content, is caused to be present in the virtual space 11B, and the participation request notification is transmitted to the user 5A based on execution of a specific action on the avatar object 6A by the avatar object 6B, to thereby be able to motivate the user 5A to log in to the content.

Details of the participation request notification (message M1) may be different depending on the strength of the specific action on the avatar object 6A by the avatar object 6B. For example, a plurality of threshold values may be provided in a stepwise manner for the acceleration of a motion of the virtual hand 2400, and details of the message M1 may be changed depending on the threshold value of the acceleration. For example, the message M1 may contain information on a participation request level, and the information on a participation request level may be changed depending on the strength of the shaking motion. Specifically, when the shaking motion is intense, details (e.g., "participation request level: three stars") indicating the fact that the participation request level exhibited by the user 5B is high may be displayed as the message M1. A predetermined threshold value may be provided for the number of times that the virtual hand 2400 passes relative coordinates associated with the avatar object 6A, and the strength of the motion of a specific action may be identified based on the threshold value for the number of times of passage.

Details of the message M1 may be changed when a plurality of avatars have performed a specific action on the avatar object 6A at the same time (or in cooperation with one another). In at least one embodiment, a dedicated collider is set at each specific position of the body of the avatar 6A so that a plurality of avatars can hold the avatar A at the same time. With this, the plurality of avatars can perform motions of shaking the avatar object 6A. In this case, as the number of users performing a specific action on the avatar object 6A becomes larger, the participation request level preferably becomes higher.

Details of the message M1 may be different depending on the type of a specific action performed on the avatar object 6A. For example, when the avatar object 6B slaps the avatar object 6A, the participation request level displayed in the message M1 may be set higher compared to a case of the avatar object 6B shaking the avatar object 6A.

In this manner, details of the participation request notification are set different depending on the intensity of the motion of a specific action on the avatar object 6A by the avatar object 6B or the type of the specific action, to thereby allow the user 5A to grasp whether the participation request level for the content exhibited by the user 5B is high or low. Therefore, the user 5A can determine whether or not to participate in the content depending on the degree of the participation request level.

In at least one embodiment of this disclosure, an action involving a physical interaction is exemplified as the specific action on the avatar object 6A by the avatar object 6B. However, the specific action is not limited thereto. The specific action may be an action for identifying the user 5A, and for example, the specific action performed by the avatar object 6B on the avatar object 6A may be identified through, for example, the line of sight, a voice, a laser pointer, a facial expression (e.g., smile or glare), or clapping. When the user 5B desires some avatar (user) to participate in the content, the user 5B may select the avatar (user) from an avatar list (user list) displayed in the virtual space 11B. That is, the specific action performed by the avatar object 6B may be a direct action or an indirect action on the avatar object 6A. The direct action and the indirect action may be combined with each other.

The timing of transmitting a participation request notification may be set different depending on details of the content provided in the virtual space 11. For example, when the number of users required to start a multiplayer game is three or more, and the processor 210 of the HMD set 110B determines that the user 5B has performed a specific action on the last avatar among a plurality of avatars required to start the multiplayer game, the processor 210 of the HMD set 110B may transmit a participation request notification at the same time to each user associated with one of the plurality of avatars on which the specific action has been performed. Even when the number of users required to start the multiplayer game is three or more, the processor 210 of the HMD set 110B may transmit a participation request notification individually to each avatar at a timing of the avatar object 6B having performed a specific action on the avatar.

In the above-mentioned at least one embodiment of this disclosure, the facial expression of the avatar object 6A, who has closed his or her eyes, is updated to an opened-eye state based on reaction of the user 5A to a participation request notification (e.g., in response to message M1 for participation request notification being read). However, the manner of update is not limited thereto. For example, the eyes of the avatar object 6A may be updated to the opened-eye state based on the avatar object 6B having performed a specific action on the avatar object 6A. With this, the user 5B can easily grasp the fact that the specific action has appropriately been performed on the avatar object 6A. The eyes of the avatar object 6A may be updated to the opened-eye state based on the user 5A having worn the HMD 120.

The information processing method according to at least one embodiment includes performing a predetermined action (example of first action) involving a physical interaction on the user 5A by the user 5B in the virtual space 11. The method further includes issuing participation request notification (example of second action) to the user 5A based on execution of the action. The method further includes executing update (example of third action) of the posture and/or facial expression of the avatar object 6A in the virtual space 11 based on reaction of the user 5A to the participation request notification (e.g., in response to message M1 for participation request notification being read). With this method, the users 5A and 5B can smoothly communicate to/from each other in the virtual space 11 by updating the posture and facial expression of the avatar object 6A associated with the user 5A in the virtual space 11B based on reaction of the user 5A to the participation request notification transmitted to the user 5A. In this manner, a seamless virtual experience is provided so as to obscure the boundary between the real space and the virtual space by translating, in the virtual space 11, reaction of the user 5A to the participation request notification in the real space.

Figure 30:
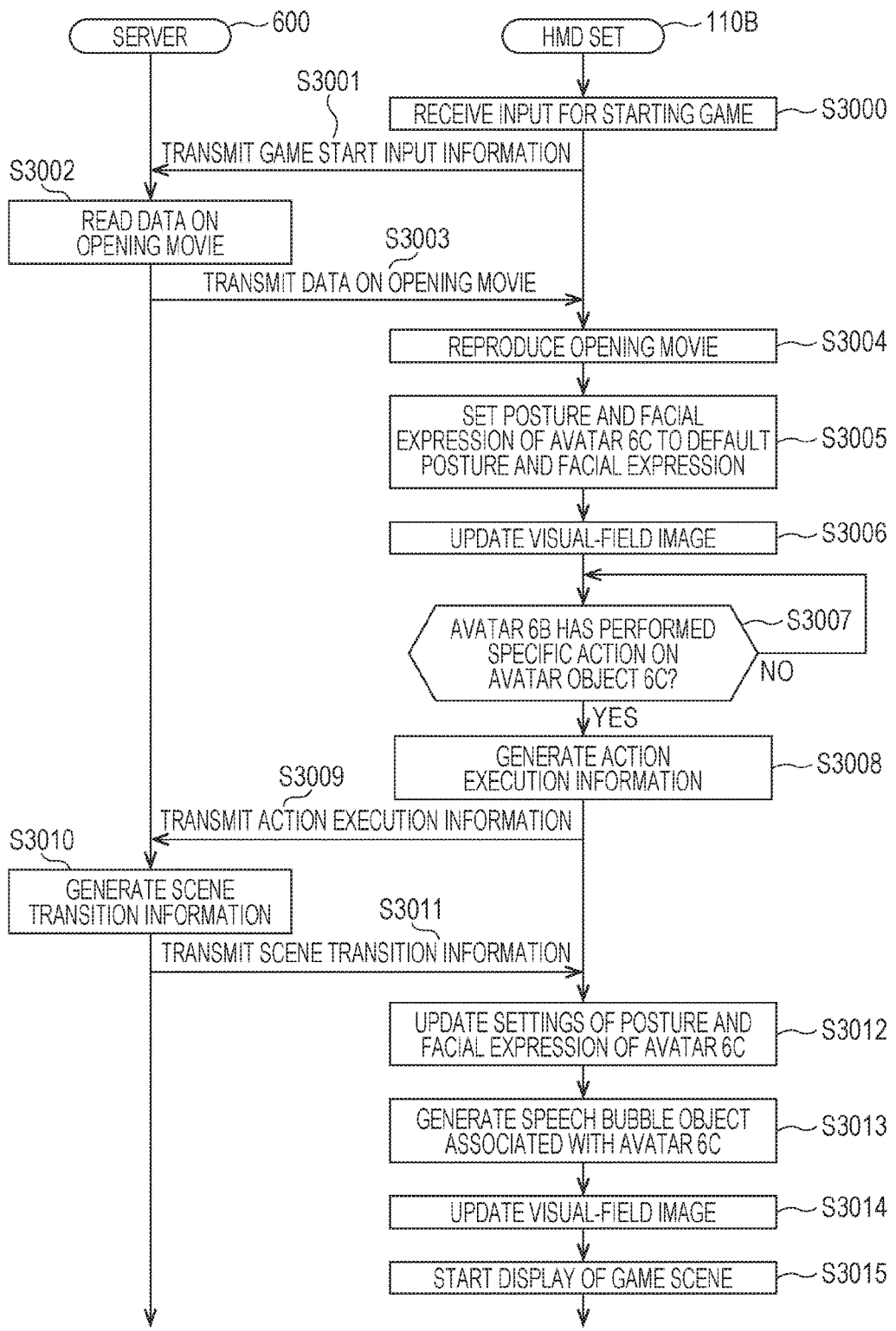
FIG. 30 A flowchart of an information processing method according to at least one embodiment of this disclosure.
Figure 31:
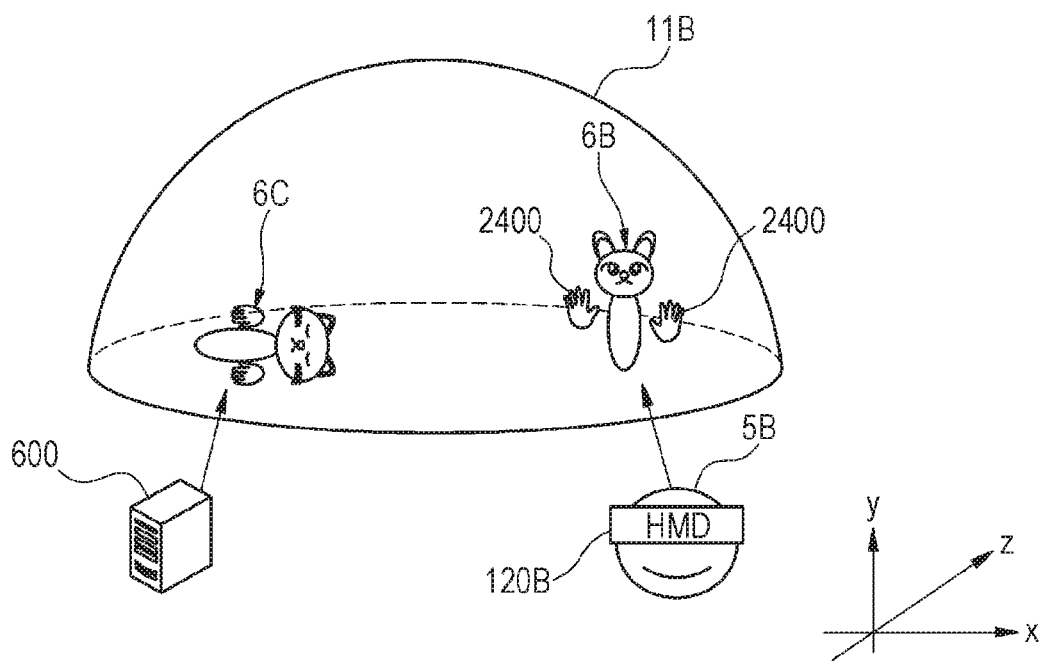
FIG. 31 A diagram of a virtual space to be provided to the user according to at least one embodiment of this disclosure.
Figure 32:
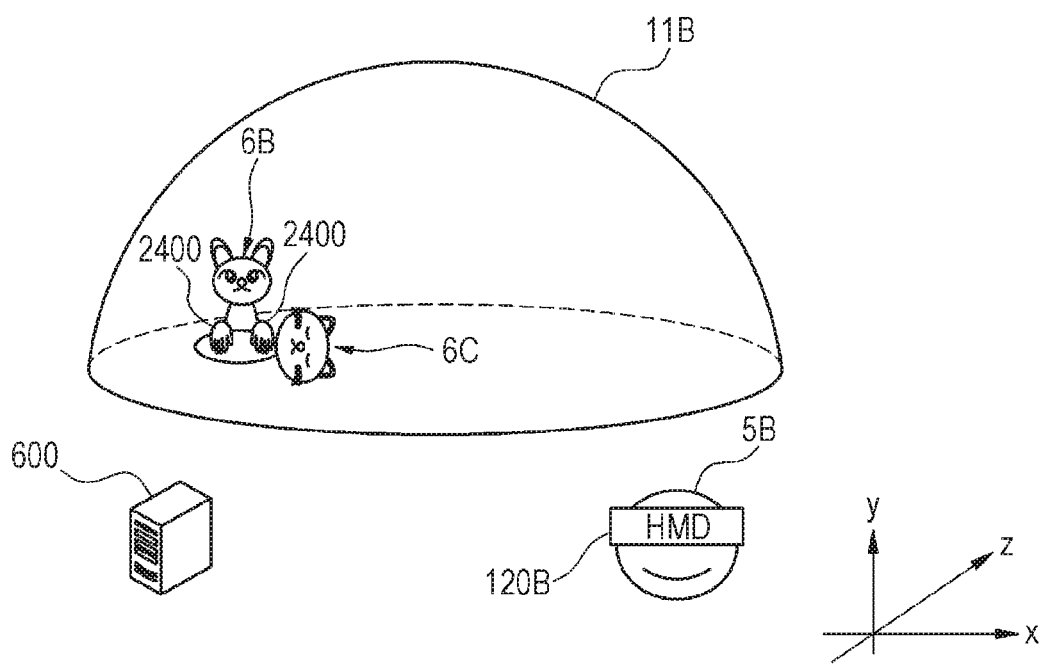
FIG. 32 A diagram of a virtual space to be provided to the user according to at least one embodiment of this disclosure.
Figure 33:
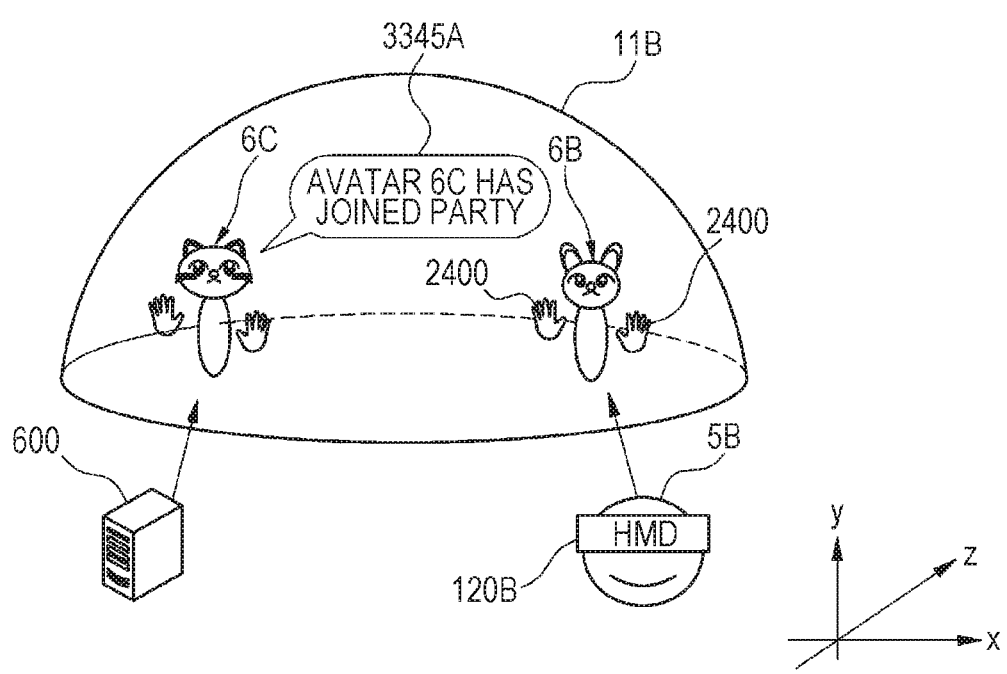
FIG. 33 A diagram of a virtual space to be provided to the user according to at least one embodiment of this disclosure.

Next, with reference to FIG. 30 to FIG. 33, a description is given of an information processing method according to at least one embodiment of this disclosure. In at least one embodiment, there is exemplified an information processing method to be executed at the time of starting a game in which only the user 5B plays the game in the virtual space 11 (11B) (so-called single player game). FIG. 30 is a flowchart of an information processing method according to at least one embodiment of this disclosure. FIG. 31 to FIG. 33 are diagrams of the virtual space 11B to be provided to the user 5B, which is used to describe the information processing method according to at least one embodiment of this disclosure. In FIG. 31, in at least one embodiment, the virtual space 11B includes the avatar object 6B and an avatar object 6C. The avatar object 6C is controllable by the server 600 (so-called non-player character (NPC)).

With reference to FIG. 30, first, the processor 210 of the HMD set 110B receives input for starting a game based on an operation by the user 5B (Step S3000). Next, the processor 210 transmits game start input information to the server 600 via the network 2 (Step S3001).

Next, the server 600 reads opening movie data from the storage 630 based on the game start input information received from the processor 210 (Step S3002). The opening movie is a video image to be reproduced in the virtual space 11B as a scenario scene (example of first scene) introduced at the time of starting the game. Next, the server 600 transmits the opening movie data to the processor 210 of the HMD set 110B via the network 2 (Step S3003).

Next, the processor 210 of the HMD set 110B reproduces the opening movie in the virtual space 11B based on the opening movie data received from the server 600 (Step S3004).

During or after reproduction of the opening movie, the processor 210 of the HMD set 110B sets the posture and facial expression of the avatar object 6C to the default posture and facial expression (Step S3005). When the default posture is a lying state, and the default facial expression is a closed-eye state, in FIG. 31, the posture of the avatar object 6C is set to the lying state, and the facial expression of the avatar object 6C is set to the closed-eye state.

Next, the processor 210 updates the virtual space data on the virtual space 11B, and also updates the field-of-view region 15 of the avatar object 6B in association with the motion of the HMD 120 of the HMD set 110B. Next, the processor 210 updates field-of-view image data based on the updated virtual space data and the updated field-of-view region 15 of the avatar object 6B, and displays the field-of-view image on the HMD 120 based on the updated field-of-view image data (Step S3006).

Next, after the field-of-view image is updated in Step S3006, the processor 210 determines whether or not the avatar object 6B associated with the user 5B has performed a specific action (example of first action) on the avatar object 6C associated with the server 600 (Step S3007). The processing of determining whether or not the specific action has been performed is the same as that of the first modification example, and thus a detailed description thereof is omitted here. After the reproduction of the opening movie in Step S3004, the processor 210 may display a message "Please wake the avatar object 6C up" in the virtual space 11B in order to induce the avatar object 6B to perform the specific action on the avatar object 6C.

Next, when the processor 210 determines that the avatar object 6B has performed a specific action on the avatar object 6C (YES in Step S3007), the processor 210 generates action execution information indicating the fact that the user 5B has performed the specific action (Step S3008). After that, the processor 210 transmits the action execution information to the server 600 via the network 2 (Step S3009).

Next, the server 600 generates scene transition information based on the action execution information received from the HMD set 110B (Step S3010). The scene transition information is information for transitioning the game provided in the virtual space 11B from a scenario scene to a game scene (example of second scene). Next, the server 600 transmits the scene transition information to the processor 210 of the HMD set 110B via the network 2 (Step S3011).

Next, the processor 210 of the HMD set 110B updates the posture and facial expression of the avatar object 6C based on the scene transition information received from the server 600 (Step S3012). Specifically, for example, in FIG. 33, the posture of the avatar object 6C is set to a standing state, and the facial expression of the avatar object 6C is set to an opened-eye state.

Next, the processor 210 generates a speech bubble object 3345A associated with the avatar object 6C in the virtual space 11B (Step S3013). The speech bubble object 3345A displays information indicating the fact that the avatar object 6C has joined the party of the avatar object 6B (e.g., "Avatar object 6C has joined party").

After that, the processor 210 updates the virtual space data on the virtual space 11B, and also updates the field-of-view region 15 of the avatar object 6B in association with the motion of the HMD 120 of the HMD set 110B. Next, the processor 210 updates field-of-view image data based on the updated virtual space data and the updated field-of-view region 15 of the avatar object 6B, and displays the field-of-view image on the HMD 120 based on the updated field-of-view image data (Step S3014).

After that, the processor 210 starts to display a game scene based on the scene transition information (Step S3015).

As described above, the information processing method according to at least one embodiment includes performing a specific action, for example, a shaking motion, with the virtual hand 2400 on the avatar object 6C, whose motion in the virtual space 11B can be controlled by a computer. The method further includes transitioning a game provided in the virtual space 11B from a scenario scene (first scene) to a game scene (second scene) based on the execution of the specific action. Hitherto, a user interface (e.g., "Press any button") for progressing the game after reproduction of the scenario scene has been displayed in order to start the game scene, and the user has pressed a predetermined button on the external controller 300 to start the game scene. In contrast, with the method according to at least one embodiment, the game scene is started based on the execution of the specific action on the avatar object 6C by the user 5B, and thus the user 5B can progress the game without impairing the sense of immersion into the virtual space 11B. In at least one embodiment, the description has been given by taking an exemplary case in which a system including the server 600 and the HMD set 110B executes the processing of at least one embodiment. However, the execution of the processing is not limited thereto, and the HMD set 110B may execute the processing automatically.

The information processing method for progressing the game according to at least one embodiment is not limited to the scene of starting a game, but is applicable to a scene of restarting the game in the middle of the game. For example, when a game to be played by a party organized by a plurality of avatars (e.g., avatar object 6B and avatar object 6C) is provided to the virtual space 11B, and a specific action has been determined to be performed on the avatar object 6C by the avatar object 6B after interruption of the game progress, the game may be restarted. Specifically, in a scene in which the party stays at an inn, in at least one embodiment, the avatar object 6C is still sleeping even in the morning. Under this state, the avatar object 6B may perform a specific action such as a shaking motion or a slapping motion on the avatar object 6C, to thereby cause the avatar object 6C to wake up and restart progress of the game. With such a method, progress of the game is restarted without impairing the sense of immersion of the user 5B into the virtual space 11B.

The order of processing steps defined in the respective steps in each of FIG. 23, FIG. 29, and FIG. 30 is just an example, and the order of those steps can appropriately be changed.

In the descriptions of the above-mentioned at least one embodiment and modification examples, whether or not the HMD 120 is worn is detected based on inclination information on the HMD 120 transmitted from the sensor 190 or event information transmitted from the wearing sensor 195. However, the manner of detection is not limited thereto. For example, the processor 210 of the user terminal may detect the motion of the HMD 120 with the HMD sensor 410 and/or the sensor 190, and identify the fact that the user has put on the HMD 120 or removed the HMD 120 when the motion has formed a predetermined locus. The processor 210 may detect whether or not the HMD 120 has moved with the HMD sensor 410 and/or the sensor 190, and identify the fact that the user is not wearing the HMD 120 when the position of the HMD 120 has not changed within a certain period of time. Further, the processor 210 may detect whether or not the HMD 120 is wearing the HMD 120 by detecting a relative positional relationship between the HMD 120 and the external controller 300. For example, when the HMD 120 and the external controller 300 are away from each other by a fixed distance or more, the processor 210 may determine that the user is not wearing the HMD 120.

In the description of the above-mentioned at least one embodiment and modification examples, it is assumed that the virtual space data representing the virtual space 11B is updated by the HMD set 110B, but the virtual space data may be updated by the server 600. Further, in at least one embodiment, the field-of-view image data corresponding to the field-of-view image is updated by the HMD set 110B, but the field-of-view image data may be updated by the server 600. In this case, the HMD set 110B displays the field-of-view image on the HMD 120 based on the field-of-view image data transmitted from the server 600.

The order of processing steps defined in the respective steps in each of FIG. 17 and FIG. 21 is just an example, and the order of those steps can appropriately be changed.

In at least one embodiment of this disclosure, a description has been given by taking the virtual space (VR space) into which the user is immersed by an HMD device as an example. However, a see-through HMD device may be adopted as the HMD device. In this case, a virtual experience in an augumented reality (AR) space or a mixed reality (MR) space may be provided to the user through output of a field-of-view image that is obtained by combining a part of an image forming the virtual space with the real space visually recognized by the user via the see-through HMD device. In this case, an action may be performed on a target object in the virtual space based on the motion of a hand of the user instead of the virtual hand. Specifically, the processor may identify coordinate information on the position of the hand of the user in the real space, and define the position of the target object in the virtual space in association with coordinate information on the target object in the real space. With this, the processor can grasp the positional relationship between the hand of the user in the real space and the target object in the virtual space 2, and execute processing corresponding to, for example, the above-mentioned control of collision between the hand of the user and the target object. As a result, performing an action on the target object based on the motion of the hand of the user is possible.

In order to implement various types of processing to be executed by the processor 210 of the HMD set 110 with use of software, a control program for executing various types of processing on a computer (processor) may be installed in advance into the storage 230 or the memory 220. Alternatively, the control program may be stored in a computer-readable storage medium, for example, a magnetic disk (HDD or floppy disk), an optical disc (e.g., CD-ROM, DVD-ROM, or Blu-ray (trademark) disc), a magneto-optical disk (e.g., MO), and a flash memory (e.g., SD card, USB memory, or SSD). In this case, the storage medium is connected to the computer 200, and thus the control program stored in the storage medium is installed into the storage 230. After that, the control program installed in the storage 230 is loaded onto the RAM, and the processor executes the loaded program. In this manner, the processor 210 executes the various types of processing.

The control program may be downloaded from a computer on the communication network 2 via the communication interface 250. Also in this case, the downloaded program is similarly installed into the storage 230.

This concludes description of at least one embodiment of this disclosure. However, the description of at least one embodiment of this disclosure is not to be read as a restrictive interpretation of the technical scope of this disclosure. At least one embodiment of this disclosure is merely given as an example, and is to be understood by a person skilled in the art that various modifications can be made to at least one embodiment of this disclosure within the scope of this disclosure set forth in the appended claims. Thus, the technical scope of this disclosure is to be defined based on the scope of this disclosure set forth in the appended claims and an equivalent scope thereof.

What is claimed is:

1. A method, comprising:
    defining a virtual space,
        the virtual space comprising a first avatar object and a second avatar object,
        the first avatar object being associated with a first user terminal,
        the first user terminal comprising a first head-mounted device (HMD) associated with a first user,
        the second avatar object being associated with a second user terminal,
        the second user terminal comprising a second HMD associated with a second user;
    defining a visual field in the virtual space in association with a motion of the second HMD;
    generating a visual-field image that corresponds to the visual field;
    displaying the visual-field image on the second HMD;
    receiving first information indicating that the first user is not wearing the first HMD;
    changing the visual-field image on the second HMD in response to the first information being received, wherein the changing the visual-field image comprises changing a posture of the first avatar object from a first posture prior to receiving the first information to a second posture after receiving the first information;
    receiving instructions from the second HMD for the second avatar object interacting with the first avatar object when the first avatar object has the changed posture; and
    sending a notification to the first user outside of the virtual space in response to the second avatar object interacting with the first avatar object when the first avatar object has the changed posture.

2. The method according to claim 1, further comprising displaying information indicating that the first user is not wearing the first HMD in the visual-field image in response to the first information being received.

3. The method according to claim 1, further comprising:
    displaying a face of the first avatar object in a first mode;
    receiving second information for identifying a real facial expression of the first user; and
    updating the face of the first avatar object to a second mode in response to the second information being received.

4. The method according to claim 3, wherein the first mode comprises a facial expression that is determined in advance irrespective of the real facial expression of the first user.

5. The method according to claim 3, further comprising:
    displaying the face of the first avatar object in the first mode in response to the first information being received; and
    displaying the face of the first avatar object in the second mode in response to failing to receive the first information.

6. The method according to claim 1,
    wherein the first user terminal comprises a wearing sensor, the wearing sensor being configured to detect whether the first user is wearing the first HMD, and
    wherein the method further comprises:
        outputting, by the first user terminal, the first information in response to detection by the wearing sensor that the first user is not wearing the first HMD;
        transmitting, by the first user terminal, the first information to the second user terminal; and
        receiving, by the second user terminal, the first information transmitted from the first user terminal.

7. The method according to claim 1, further comprising:
    receiving third information indicating that the first user has put on the first HMD again after the first user removed the first HMD; and
    updating the visual-field image on the second HMD in response to the third information being received.

8. The method according to claim 1, wherein the changing of the posture of the first avatar object comprises changing the first avatar object from a standing posture to a laying down posture.

* * * * *